US007652950B2

(12) United States Patent
Sinha et al.

(10) Patent No.: US 7,652,950 B2
(45) Date of Patent: Jan. 26, 2010

(54) RADIAL PROFILING OF FORMATION MOBILITY USING HORIZONTAL AND VERTICAL SHEAR SLOWNESS PROFILES

(75) Inventors: Bikash K. Sinha, West Redding, CT (US); Badarinadh Vissapragada, Tananager (NO)

(73) Assignee: Schlumberger Technology Corporation, Cambridge, MA (US)

( * ) Notice: Subject to any disclaimer, the term of this patent is extended or adjusted under 35 U.S.C. 154(b) by 387 days.

(21) Appl. No.: 11/145,487

(22) Filed: Jun. 3, 2005

(65) Prior Publication Data

US 2006/0285437 A1    Dec. 21, 2006

(51) Int. Cl.
*G01V 1/48* (2006.01)
*G01V 1/50* (2006.01)

(52) U.S. Cl. .............................. 367/31; 367/25; 367/32; 367/35; 181/105

(58) Field of Classification Search .................... 367/25, 367/31, 32, 35; 181/102, 105
See application file for complete search history.

(56) References Cited

U.S. PATENT DOCUMENTS

| 4,594,691 | A |   | 6/1986  | Kimball et al. | ............... 367/32 |
| 4,633,449 | A |   | 12/1986 | Ingram et al.  | ............... 367/75 |
| 4,698,793 | A |   | 10/1987 | Wu             | ............... 367/32 |
| 4,813,028 | A |   | 3/1989  | Liu            | ............... 367/31 |
| 4,831,600 | A |   | 5/1989  | Hornby et al.  | ............... 367/31 |
| 4,858,198 | A | * | 8/1989  | Weissman       | ............... 367/31 |
| 4,881,208 | A | * | 11/1989 | Liu            | ............... 367/35 |
| 4,964,101 | A | * | 10/1990 | Liu et al.     | ............... 367/31 |
| 5,081,611 | A |   | 1/1992  | Hornby         | ............... 367/25 |
| 5,229,939 | A |   | 7/1993  | Scheibner et al. | ........... 364/422 |
| 5,278,805 | A |   | 1/1994  | Kimball        | ............... 367/32 |
| 5,398,215 | A |   | 3/1995  | Sinha et al.   | ............... 367/31 |
| 5,475,650 | A |   | 12/1995 | Sinha et al.   | ............... 367/31 |
| 5,587,966 | A |   | 12/1996 | Kimball et al. | ............... 367/31 |
| 5,661,696 | A |   | 8/1997  | Kimball et al. | ............... 367/31 |
| 5,687,138 | A |   | 11/1997 | Kimball et al. | ............... 367/31 |
| 5,737,220 | A | * | 4/1998  | Miller         | ............... 702/14 |
| 5,784,333 | A |   | 7/1998  | Tang et al.    | ............... 367/30 |

(Continued)

FOREIGN PATENT DOCUMENTS

EP    0 936 477 A2    8/1999

(Continued)

OTHER PUBLICATIONS

Sinha, et al. "Radial Profiling of Formation Shear Velocity from Borehole Flexural Dispersions." 2001 IEEE Ultrasonics Symposium.*

(Continued)

*Primary Examiner*—Jack W Keith
*Assistant Examiner*—Scott A Hughes
(74) *Attorney, Agent, or Firm*—James McAleenan; Jody DeStefanis; Vincent Loccisano

(57) ABSTRACT

Methods and apparatus facilitating radial profiling of formation mobility are disclosed. Radial profiling of formation mobility aids in an optimal completion of a well for enhanced production. Some aspects of the present invention provide a technique for radial profiling of formation mobility based on inverting differences between a Stoneley radial profile of horizontal shear slowness and a dipole radial profile of vertical shear slowness for a reservoir interval.

9 Claims, 52 Drawing Sheets
(1 of 52 Drawing Sheet(s) Filed in Color)

U.S. PATENT DOCUMENTS

| | | | | |
|---|---|---|---|---|
| 5,838,633 | A | 11/1998 | Sinha | 367/31 |
| 5,987,385 | A | 11/1999 | Varsamis et al. | 702/6 |
| 5,999,484 | A | 12/1999 | Kimball et al. | 367/31 |
| 6,327,538 | B1 | 12/2001 | Chin | 702/18 |
| 6,351,991 | B1 | 3/2002 | Sinha | 73/152.01 |
| 6,415,648 | B1 | 7/2002 | Peeters | 73/38 |
| 6,526,354 | B2 | 2/2003 | Bose et al. | 702/14 |
| 6,546,339 | B2 | 4/2003 | Bevc et al. | 702/18 |
| 6,611,761 | B2 | 8/2003 | Sinha et al. | 702/6 |
| 6,614,716 | B2 | 9/2003 | Plona et al. | 367/31 |
| 6,631,327 | B2 | 10/2003 | Hsu et al. | 702/6 |
| 6,654,688 | B1 | 11/2003 | Brie et al. | 702/2 |
| 6,714,480 | B2 | 3/2004 | Sinha et al. | 367/31 |
| 6,718,266 | B1 | 4/2004 | Sinha et al. | 702/11 |
| 6,868,341 | B2 | 3/2005 | Valero | 702/11 |
| 6,920,082 | B2 | 7/2005 | Tang | 367/31 |
| 6,930,616 | B2 | 8/2005 | Tang et al. | 367/81 |
| 2003/0167835 | A1 | 9/2003 | Sinha et al. | 73/152.16 |
| 2004/0001389 | A1* | 1/2004 | Tang | 367/31 |
| 2005/0254343 | A1 | 11/2005 | Saiki et al. | 367/31 |

FOREIGN PATENT DOCUMENTS

| | | |
|---|---|---|
| WO | 2004/063772 A | 7/2004 |
| WO | 2005/116693 A | 8/2005 |

OTHER PUBLICATIONS

Backus, G. et al. "Uniqueness In the Inversion of Inaccurate Gross Earth Data." *Phil Trans Roy. Soc.* A266, (Mar. 1970): pp. 123-192.

Brie, A. et al. "Quantitative Formation Permeability Evaluation from Stoneley Waves." *SPE Reservoir Evaluation and Engineering* vol. 3, No. 2, (Apr. 2000): pp. 109-117.

Burridge and Sinha. "Inversion for formation shear modulus and radial depth of investigation using borehole flexural waves." *66th Annual International Meeting, Society of Exploration Geophysicists, Expanded Abstracts* (1996): pp. 158-161.

Chang et al. "Low-frequency tube waves in permeable rocks." *Geophysics* vol. 53, No. 4 (Apr. 1988): pp. 519-527.

Ekstrom, M.P. "Dispersion Estimation from Borehole Acoustic Arrays using a Modified Matrix Pencil Algorithm." presented at the *29th Asilomar Conference on Signals, Systems, and Computers*: pp. 449-453.

Gazis, D.C. "Three-Dimensional Investigation of the Propagation of Waves in Hollow Circular Cylinders, I. Analytical Foundation, II. Numerical Results." *The Journal of the Acoustical Society of America.* vol. 31 No. 5 (May 1959): pp. 568-578.

Harrison et al. "Acquisition and Analysis of Sonic Waveforms From a Borehole Monopole and Dipole Source for the Determination of Compressional and Shear Speeds and Their Relation to Rock Mechanical Properties and Surface Seismic Data." *Society of Petroleum Engineers* (1990): SPE 20557.

Hsu, C.J., and Sinah, B.K. "Mandrel effects on the dipole flexural mode in a borehole." *J. Acoust. Soc. Am.* vol. 104, No. 4 (Oct. 1998): pp. 2025-2039.

Jensen et al. "Evaluation of Permeabilities Determined From Repeat Formation Tester Measurements Made in the Prudhoe Bay Field." Presented at the 60th Annual Technical Conference and Exhibition of the Society of Petroleum Engineers, Las Vegas, NV (Sep. 22-25, 1985): SPE Paper 14400.

Liu et al., "Effects of an Elastic Membrane on Tube Waves in Permeable Formations." *J. Acoust. Soc. Am.* vol. 101, No. 6 (Jun. 1997): pp. 3322-3329.

Paillet, Frederick L. and Cheng, Chuen Hon. "Chapter 8—Acoustic Waveforms in Porous and Permeable Formations."*Acoustic Waves in Boreholes.* Boca Raton: CRC Press.,1991. pp. 189-217.

Sinha, B., "Sensitivity and Inversion of Borehole Flexural Dispersions for Formation Parameters." *Geophysical Journal International* vol. 128 (1997): pp. 84-96.

Sinha et al., "Stonely and flexural modes in pressurized boreholes." *Journal of Geophysical Research* vol. 100, No. B11 (Nov. 10, 1995): pp. 22,375-22,381.

Schmitt, D.P. "Effects of Radial Layering When Logging in Saturated Porous Formations." *J. Acoust. Soc. Am.* 84(6) (Dec. 1988): pp. 2200-2214.

White, J.E. "Chapter 5—Waves Along Cylindrical Boreholes." *Underground Sound—Applications of Seismic Waves.* New York: Elsevier, 1983. pp. 139-191.

Winkler et al. "Permeability and Borehole Stoneley Waves: Comparison Between Experiment and Theory." *Geophysics* Vo. 54. No. 1 (Jan. 1989): pp. 66-75.

Xiaoming Tang et al., "Fast inversion of formation permeability from Stoneley wave logs using a simplified Biot-Rosenbaum model." Geophysics Soc. Exploration Geophysicists, vol. 61, No. 3, May-Jun. 1996, p. 639-645.

International Search Report for International Application No. PCT/US2006/020676 dated Jan. 12, 2007.

Rao et al., "Acoustics of fluid-filled boreholes with pipe: Guided propagation and radiation." J. Acoust. Soc. Am 105(6), Jun. 1999; pp. 3057-3066.

Geerits et al. "Centroid phase slowness as a tool for dispersion correction of dipole acoustic logging data." Geophysics vol. 68, No. 1, Jan.-Feb. 2003: pp. 101-107.

Hsu, C., S. Kostek and D. Johnson. "Tube waves and mandrel modes: Experiment and theory." *J. Acout. Soc. Am.* vol. 102(6) (1997): pp. 3277-3289.

Jones, Leonie E.A. And Herbert F. Wang. "Ultrasonic Velocities in Cretaceous Shales from the Williston Basin." *Geophysics* vol. 46, No. 3 (1981): pp. 288-297.

Kimball, C.V. "Shear Slowness Measurement by Dispersive Processing of the Borehole Flexural Mode." Geophysics vol. 63, No. 2 (Mar.-Apr. 1998): pp. 337-344.

Kimball, C.V., Marzetta, T.L., "Semblance Processing of Borehole Acoustic Array Data." Geophysics vol. 49, No. 3 (Mar. 1984): pp. 274-281.

Kozak, M.Z., and Kozak, M.E. "Estimation of Formation Shear Slowness Using Phase Velocity and Semblance Method-Comparative Studies.".

Liu, H. "Borehole modes in a cylindrical fluid-saturated permeable medium." *J. Acoust. Soc. Am.* vol. 84.(1988): pp. 424-431.

McClellan, J.H. "Two-Dimensional Spectrum Analysis in Sonic Logging." ICASSP 86, IEEE (1986): pp. 3105-3111.

Meeker, T. and A. Meitzler. "Guided wave propagation in elongated cylinders and plates." *Physical Acoustics* vol. 1A. New York, NY: Academic Press, 1964.

Norris, A. "Stoneley-wave attenuation and dispersion in permeable formations." *Geophysics* vol. 54 No. 3.(1989): pp. 330-341.

Sayers, C.M. "The Elastic Anisotrophy of Shales."*J. Geophysics* vol. 99, No. B1 (1994): pp. 767-774.

Sinha, B. and S. Asvadurov. "Dispersion and radial depth of investigation of borehole modes." *Geophysical Prospecting* vol. 52 (2004): pp. 271-286.

Brie, A., T. Endo, D.L. Johnson and F. Pampuri. "Quantitative Formation Permeability Evaluation From Stoneley Waves." SPE 49131 (1998).

Kostek, Sergio, David Linton Johnson and Curtis J. Randall. "The interaction of tube waves with borehole fractures, Part I: Numerical models." *Geophysics* vol. 63, No. 3 (May-Jun. 1998): pp. 800-808.

Kostek, Sergio, David Linton Johnson, Kenneth W. Winkler and Brian E. Hornby. "The interaction of tube waves with borehole fractures, Part II: Analytical models." *Geophysics* vol. 63, No. 3 (May-Jun. 1998): pp. 809-815.

Pampuri, F., M. Rovellini, A. Brie, T. Fukusima. "Effective Evaluation of Fluid Mobility From Stonely Waves Using Full Biot Moel Inversion: Two Case Histories," SPE 49132(1998).

Cheng, et al., "Elastic wave propagation in fluid-filled borehole and synthetic acoustic logs." Geophysics, vol. 46, Jul. 1981.

Tang, et al., "Effects of a logging tool on the stoneley waves in elastic and porous boreholes." the Log Analyst, Sept.-Oct. 1993.

Norris, A.N., "The speed of a tube wave." J. Acoust. Soc. Am. 87(1) Jan. 1990.

Ellefsen, et al., "Estimating a shear modulus of a transversely isotropic rock." 1991 Ultrasonics Symposium.

Ellefsen, et al., "Elastic wave propagation along a Borehole in an Anisotropic Medium".

Tang, X.M. "Determining Shear-wave Transverse Isotrophy From Borehole Stoneley Waves." SEG Meeting. Sept. 2002.

Geertis et al. "The effect of tool on dipole logging." SEG Technical Program Expanded Abstracts — 1997 — pp. 313-316.

Norris, A. and B. Sinha. "Weak elastic anisotrophy and the tube wave." *Geophysics* vol. 58 No. 8(1993): pp. 1091-1098.

Sinha et al. "Radial Profiling of Formation Shear Velocity from Borehole Flexural Dispersions." 2001 IEEE Ultrasonics Symposium.

Sinha et al. "Optimal Well Completions Using Radial Profiling of Formation Shear Slowness." SPE Annual Technical Conference and Exhibition, Oct. 12, 2005, SPE 95837.

Lai J., E. Dowell and T. Tauchert. "Propagation of harmonic waves in a composite elastic cylinder," *J. Acoust. Soc. Am*. vol. 49(1971): pp. 220-228.

Bokov et al. "Tube-wave propagation in fluid-filled borehole generated by a single point force applied to the surrounding formation." J. Acoust. Soc. Am. 112(6) Dec. 2002.

Tang, Xiaoming. "Determining formation shear-wave transverse isotrophy from borehole Stoneley-wave measurements." Geophysics, vol. 68 (Jan.-Feb. 2003).

* cited by examiner

RADIAL PROFILING OF FORMATION MOBILITY USING HORIZONTAL AND VERTICAL SHEAR SLOWNESS PROFILES

RELATED APPLICATIONS

This application claims priority of U.S. patent application Ser. Nos. 11/125,564 and 11/125,634 filed May 10, 2005.

FIELD OF THE INVENTION

The present invention relates generally to investigations of earth formations surrounding a borehole. More particularly, the present invention relates to methods and apparatus for determining radial variations in mobility of formations surrounding a borehole.

BACKGROUND OF THE INVENTION

A well completion engineer needs a variety of information in order to optimally complete a well. Two of the most important pieces of information relative to well completion include the ratio of near field permeability to far field permeability, and the radial depth of the wellbore damage zone. If known, these two factors may enable a completion engineer to enhance production. Permeability is sometimes expressed in terms of fluid viscosity (i.e. a ratio of permeability to viscosity). The ratio of permeability to viscosity is generally referred to as "mobility." The radial depth of the wellbore damage zone may be determined by generating horizontal and vertical shear slowness profiles. Many logging tools and procedures have been developed over the years to aid with the formation evaluation process, including estimates of formation mobility.

One example of a logging device that has been used to obtain and analyze sonic logging measurements of formations surrounding an earth borehole is Schlumberger's Modular Sonic Imaging Platform (MSIP) tool. According to conventional use of the MSIP logging tool, one can present compressional slowness, $\Delta t_c$, shear slowness, $\Delta t_s$, and Stoneley slowness, $\Delta t_{st}$, each as a function of depth, z (slowness corresponds to the interval transit time typically measured by sonic logging tools).

An acoustic source in a fluid-filled borehole generates headwaves, as well as relatively stronger borehole-guided modes. A standard sonic measurement system includes a piezoelectric source and hydrophone receivers inside a fluid-filled borehole. The piezoelectric source may be either a monopole or a dipole source. The source bandwidth typically ranges from a 0.5 to 20 kHz. A monopole source primarily generates the lowest-order axisymmetric mode, also referred to as the Stoneley mode, along with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. The waves refracted along the borehole surface are known as compressional headwaves. The critical incidence angle is represented as $\theta_i = \sin^{-1}(V_f/V_c)$, where $V_f$ is the compressional wave speed through the borehole fluid and $V_c$ is the compressional wave speed through the formation. As a compressional headwave travels along an interface, it radiates energy back into the fluid that can be detected by the hydrophone receivers placed in the fluid-filled borehole. In relatively fast formations, the shear headwave can be similarly excited by a compressional wave at the critical incidence angle $\theta_i = \sin^{-1}(V_f/V_s)$, where $V_s$ is the shear wave speed through the formation. It is also worth noting that headwaves are excited only when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole to determine the formation compressional and shear wave speeds. However, refracted shear headwaves cannot be detected for slow formations (where the shear wave velocity is less than the borehole-fluid compressional wave velocity) with receivers placed in the borehole fluid. Therefore, formation shear velocities are obtained from the low-frequency asymptote of flexural dispersion for slow formations. There are standard processing techniques for the estimation of formation shear velocities in either fast or slow formations from an array of recorded dipole waveforms.

In a recently issued patent (U.S. Pat. No. 6,611,761 for "Sonic Well Logging for Radial Profiling," hereby incorporated by this reference) a technique is described for obtaining radial profiles of fast and slow shear slownesses using measured dipole dispersions in the two orthogonal directions that are characterized by the shear moduli $c_{44}$ and $c_{55}$ for a borehole parallel to the $X_3$-axis 102 (FIG. 1, the $X_3$-axis is a borehole 100 axis). The meanings of shear moduli $c_{44}$ and $c_{55}$ are generally known to those of skill in the art and are also defined below.

Another U.S. patent (U.S. Pat. No. 6,714,480 entitled "Determination of Anisotropic Moduli of Earth Formations" hereby incorporated by this reference) describes a technique for estimating the horizontal shear modulus $c_{66}$ ($c_{66}$ is generally known to those of skill in the art and is also defined below) of a TIV (transverse isotropy with a vertical axis of symmetry) formation using the zero frequency intercept of the Stoneley dispersion that yields the tube wave velocity. This technique assumes that the borehole Stoneley dispersion is insignificantly affected by the presence of the sonic tool structure or any possible near-wellbore alteration, such as super-charging in permeable formation, and shale swelling in overburden shales. However, recent observations reveal that in fast formations and boreholes with small diameters, both the sonic tool effect and near-wellbore alteration can have significant effects on the measured Stoneley dispersion.

To overcome these limitations in the estimation of horizontal shear modulus $c_{66}$ in the far-field of a TIV-formation with the TI-symmetry $X_3$-axis parallel to the borehole, principles described below provide procedures for obtaining radial profiles of horizontal shear slowness and estimates of the horizontal shear modulus $c_{66}$ outside any near-wellbore altered annulus. The far-field shear modulus $c_{66}$ may then be appropriately used to characterize formation TIV-anisotropy for subsequent application in the AVO (amplitude verses offset) analysis.

According to the prior art, formation mobility is estimated from an increase in Stoneley slowness (and or attenuation) over a certain bandwidth as the Stoneley wave propagates through a permeable interval. FIG. 1A is a schematic diagram of the deformation of the fluid-filled borehole 100 caused by the lowest-order axi-symmetric wave propagating along the borehole 100. The Stoneley mobility indicator is based on the difference between measured Stoneley slowness and theoretical Stoneley slowness for a non-permeable interval (S—Se). Chang et al., *Low-frequency tube waves in permeable rocks*, GEOPHYSICS, Vol. 53 No. 4, pp. 519-527 (April 1988).

However, there are a number of drawbacks associated with using this Stoneley mobility indicator to estimate permeability (or, equivalently, mobility). The primary disadvantage of using the Stoneley mobility indicator is misinterpretation of permeability zones. Changes in formation shear modulus caused by formation stresses or varying amounts of clay content can be misinterpreted as zones of higher permeability. This technique assumes that the hear modulus $c_{66}$ derived from the Stoneley data and the shear modulus ($c_{44}$ or $c_{55}$) derived from the dipole data are identical in the absence of formation mobility (as would be the case in an isotropic formation). FIG. 1B illustrates theoretical Stoneley and flexural dispersions for a range of formation slownesses. The illustrated results represent an isotropic and homogeneous formation in the absence of any tool effects. Consequently, radial profiles of horizontal shear slowness from the Stoneley dispersion data and vertical shear slowness from the dipole dispersion data would essentially overlay in the absence of any formation mobility. Any observed separation between these profiles in the far-field is taken as the Stoneley mobility indicator.

The general expression yielding the Stoneley slowness in this low-frequency limit is (Chang et al. (1988); Liu et al., *Effects of an Elastic Membrane on Tube Waves in Permeable Formations*, J. ACOUST. SOC. AM., Vol. 101 No. 6, pp. 3322-3329 (June 1997)):

$$S^2 = \rho_m \left( \frac{1}{K_m} + \frac{1}{G} + \frac{2}{a(W_o + W_{mc})} \right) \quad (1)$$

Elastic Frequency and Biot Effects where $$W_0 = -\frac{\mu}{k} C_D k_{c_2} \frac{H_0^{(l)}(k_{c_2} a)}{H_1^{(1)}(k_{c_2} a)} \quad (2)$$

and $$k_{c_2} = \sqrt{i\omega/C_D} \quad (3)$$

with
S Measured Stoneley slowness
k Matrix Permeability
η Pore fluid viscosity
$\rho_m$ Mud or borehole fluid density
$K_m$ Mud or borehole fluid bulk modulus
G Isotropic Formation shear modulus where c44=c55=c66
a Borehole radius
ω Angular frequency (2πf)
$k_{c2}$ The Biot slow-wave wavenumber
$C_D$ Slow wave diffusivity
$W_o$ Acoustic fluid mobility effects
$W_{mc}$ Acoustic mud cake membrane stiffness
$H_j^{(1)}(x)$ (outgoing) Hankel functions, j=0,1

The slowness, S, is complex-valued and frequency dependent; the real part of S is the conventional phase slowness and the imaginary part is simply related to the attenuation. The term $$\frac{2\rho}{a(W_o + W_{mc})}$$

represents the contribution of fluid mobility effects to the Stoneley slowness. The quantity $W_0$, which is a function of frequency, describes the permeability dependence. The membrane stiffness parameter, $W_{mc}$, describes how hard it is to force fluid in through the borehole wall, past the mudcake, which is assumed to flex in and out under the effect of an oscillating pressure. Large values of $W_{mc}$ imply that the mudcake seals the borehole. Intuitively, in such cases, the slowness and attenuation are not sensitive to permeability, and the low-frequency formula bears this out. No mudcake corresponds to $W_{mc}$=0, which maximizes the sensitivity of the Stoneley to permeability effects. However, as illustrated in FIG. 2, a permeable interval 104 affects Stoneley waves. The permeable interval 104 increases Stoneley slownesses at all frequencies and introduces attenuation of the Stoneley wave amplitude.

The S—$S_e$ technique derives from the approximation proposed by White. White, J. E., *Underground Sound—Application of Seismic Waves, Chapter 5—Waves Along Cylindrical Boreholes*, ELSEVIER, New York (1983), pp. 139-191. The general low-frequency equation can be written as:

$$S^2 = S_e^2 + \frac{2\rho_m}{a(W_o + W_{mc})} \quad (4)$$

FIG. 3 shows a correlation between (S—Se) and formation mobility for a few different values of mud compressional slowness. This type of correlation shows that one can infer formation mobility from the estimated (S—Se) within the framework of low-frequency approximation as discussed by Chang et al., 1988.

It would be useful to have accurate and quantitative radial profiles of the three shear slownesses characterized by the shear moduli $c_{44}$, $c_{55}$, and $c_{66}$ in the three orthogonal coordinate planes that can be employed in the evaluation of formations for the presence near-wellbore permeability impairment and/or producibility of hydrocarbons. Therefore, principles of the present invention provide methods and apparatus for radial profiling of formation mobility, and radial profiles of formation mobility aid in the optimal design of a well completion.

SUMMARY OF THE INVENTION

The present invention addresses the above-described deficiencies and others. Specifically, the present invention provides methods and apparatus for radial profiling of formation mobility. The methods and apparatus facilitate an accurate radial profile of formation mobility using the horizontal and vertical shear slowness profiles.

Radial profiling of formation mobility aids both in the well completion process to enhance production and in the determination of a productivity index. Comparing the near-wellbore mobility with that in the far-field yields an estimate of the relative decrease in the fluid mobility caused by any near-wellbore alteration. An accurate comparison of near and far-wellbore mobility can also help locate permeability barriers that may render steam-flooding ineffective in tertiary recovery projects.

Accordingly, some aspects of the present invention provide techniques for radial profiling of formation mobility based on inverting differences between a Stoneley radial profile of horizontal shear slowness and a dipole radial profile of vertical shear slowness in a reservoir interval. The horizontal shear slowness in a vertical well provides an estimate of the effective horizontal shear modulus $c_{66}$, whereas dipole shear slownesses yield estimates of the effective vertical shear moduli $c_{44}$ and $c_{55}$. A high porosity sand reservoir in the absence of any formation mobility and stresses would exhibit approximately the same magnitude of the three shear moduli. In the absence of formation stresses, the horizontal shear slowness increases with increasing formation mobility. By contrast, the vertical shear slowness is largely unaffected by the formation mobility.

Accordingly, if stress-induced changes in the three shear moduli are nearly the same, observed differences between the horizontal and vertical shear moduli indicate formation mobility changes as a function of radial position away from the borehole surface. Drawdown mobility measured by any of a number of techniques at an effective radial depth of investigation may provide a calibration coefficient, $F_C$, that relates the difference between the Stoneley horizontal shear slowness ($S_H$) and either fast or slow-dipole vertical shear slowness ($S_V$) to the formation mobility $M(r)$ at that radial position for a given lithology and mineralogy at that depth. The radial variation of formation mobility can then be obtained from differences between the Stoneley horizontal and dipole vertical shear slownesses at other radial positions. In the presence of formation stresses, it may be necessary to remove the stress-induced changes in the horizontal and vertical shear slownesses before estimating radial variation in formation mobility using the Stoneley and dipole radial profiles of shear slownesses.

One aspect of the invention provides a method of evaluating a subterranean formation, comprising estimating a radial profile of reservoir mobility by combining near wellbore log data with radial profiling of shear modulus data. Combining the near wellbore log data with shear modulus data may further comprise estimating near field mobility and extrapolating far field mobility from the near field mobility estimate based on the radial profile of shear modulus. Combining the near wellbore log data with shear modulus data may also comprise calculating a Stoneley radial profile of horizontal shear slowness in a reservoir interval, calculating a dipole radial profile of vertical shear in the reservoir interval, inverting differences between the Stoneley radial profile of horizontal shear slowness and the dipole radial profile of vertical shear slowness, and generating a calibration coefficient relating the difference between the Stoneley horizontal shear slowness and dipole vertical shear slowness, and formation mobility at a given radial position and depth based on near field mobility from a pretest.

According to some aspects of the method, the pretest comprises one or more of an NMR permeability test, a coring and uphole flow test, or a downhole modular dynamic testing drawdown test.

In addition, the radial profiling of shear modulus data may comprise estimating two vertical shear moduli from cross-dipole dispersion data.

The radial profiling of shear modulus data may also comprise estimating a horizontal shear modulus from borehole Stoneley data. Accordingly, the method of estimating the horizontal shear modulus comprise measuring Stoneley dispersion with an acoustic tool, and calculating the horizontal shear modulus from the measured Stoneley dispersion using a process that accounts for the presence of the acoustic tool in the borehole. The process that accounts for the presence of the acoustic tool may comprise modeling the acoustic tool as a heavy-fluid or with a resonance-impedance model.

Another aspect of the invention provides a method of radial profiling of formation mobility comprising calculating a Stoneley radial profile of horizontal shear slowness in a reservoir interval, calculating a dipole radial profile of vertical shear in the reservoir interval, and inverting differences between the Stoneley radial profile of horizontal shear slowness and the dipole radial profile of vertical shear slowness. The method may further comprise generating a calibration coefficient relating the difference between the Stoneley horizontal shear slowness and dipole vertical shear slowness, and formation mobility at a given radial position and depth based on drawdown mobility from a pretest. Drawdown mobility may be derived from a modular dynamic tester (MDT), NMR permeability, flow testing from a core sample, or spectroscopic analysis. Alternatively, the calibration coefficient relating the difference between the Stoneley horizontal shear slowness and dipole vertical shear slowness, and formation mobility at a given radial position and depth may be calculated by an algorithm, which may include performing:

$$F_C = \operatorname{Re} \frac{2\rho H_1^{(1)}(k_{c2}a)}{aC_D k_{c2} H_0^{(1)}(k_{c2}a)}$$

where:
 a is borehole radius;
 $H_j^{(1)}$ are outgoing Hankel junctions, j=0,1;
 $k_{c_2} = \sqrt{i\omega/C_D}$;
 $\rho$ is formation bulk density; and
 $C_D$ is slow wave diffusivity.

Another aspect of the invention provides a method of radial profiling of subterranean mobility. The method comprises selecting a depth interval in a reservoir with a vertical $X_3$-axis, obtaining a radial profile of horizontal shear slowness, obtaining radial profiles of vertical shear slownesses, determining a formation calibration coefficient, and computing radial variation in formation mobility as a function of radial position from a borehole surface. Obtaining the radial profile of horizontal shear slowness may comprise measuring Stoneley dispersion with an acoustic tool, and calculating the horizontal shear modulus from the measured Stoneley dispersion accounting for the presence of the acoustic tool by modeling the acoustic tool with a resonance-impedance model. Determining the formation calibration coefficient may comprises calculating:

$$F_C = \frac{(S_H^2 - S_V^2)}{M}$$

where:

$S_H$ and $S_V$ are horizontal and vertical shear slownesses, respectively, obtained from corresponding profiles at a radial dist r/a=2; and M is measured drawdown formation mobility from a pretest.

Another aspect of the invention provides an apparatus for evaluating a subterranean formation. The apparatus comprises a device that generates a radial profile of formation mobility surrounding a borehole, wherein the device estimates a radial profile of reservoir mobility by combining near wellbore log data with radial profiling of shear modulus data.

Combining of the device may comprise calculating a Stoneley radial profile of horizontal shear slowness in a reservoir interval, calculating a dipole radial profile of vertical shear in the reservoir interval, inverting differences between the Stoneley radial profile of horizontal shear slowness and the dipole radial profile of vertical shear slowness, and generating a calibration coefficient relating the difference between the Stoneley horizontal shear slowness and dipole vertical shear slowness, and formation mobility at a given radial position and depth based on near field mobility from a pretest.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

The accompanying drawings illustrate preferred embodiments of the present invention and are a part of the specification. Together with the following description, the drawings demonstrate and explain the principles of the present invention.

FIG. 15b illustrates radial slowness profiles of decreasing and increasing slownesses away from borehole shown in FIG. 15a.

Figure 1A:
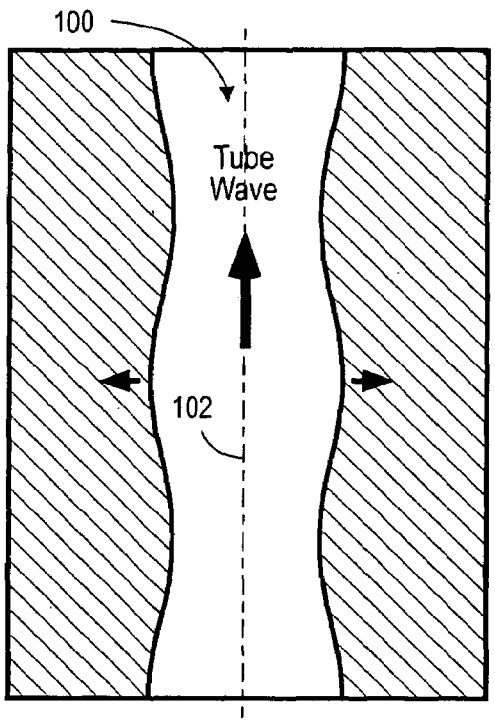
FIG. 1a is a schematic diagram of lowest-order axi-symmetric Stoneley wave propagation.
Figure 1B:
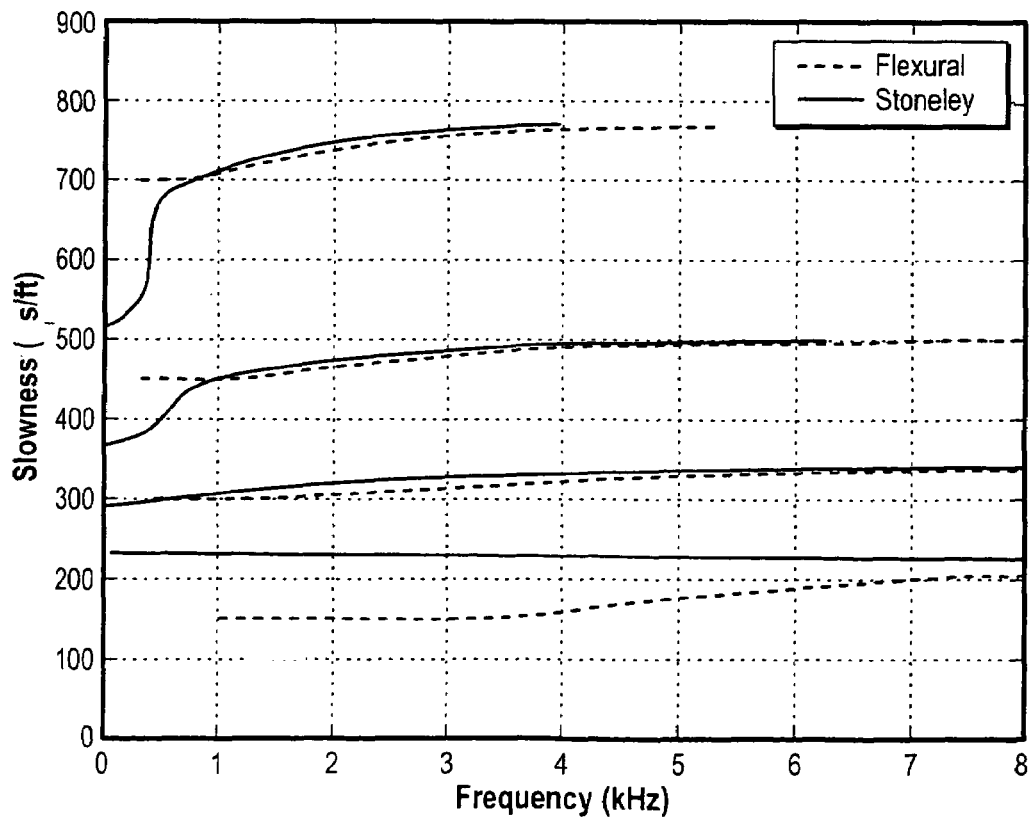
FIG. 1b illustrates Stoneley and flexural slowness dispersions for a range of formation slownesses in homogeneous and isotropic formations in the absence of any fluid mobility or stresses.

Throughout the drawings, identical reference characters and descriptions indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF THE PREFERRED EMBODIMENTS

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

As mentioned above, a radial profile of formation mobility can greatly aid in the optimization of well completions. The present invention contemplates methods and apparatus for radial profiling of formation mobility, and may include using horizontal and vertical shear slowness profiles to obtain the radial profile of formation mobility. Accordingly, the principles discussed below include a description of methods of radial profiling of formation mobility, followed by descriptions of generating radial profiles of shear slowness. The principles of the present invention are applicable to many oilfield operations, including logging and logging-while-drilling (LWD) operations.

As used throughout the specification and claims, the terms "borehole" or "downhole" refer to a subterranean environment, particularly in a wellbore. The words "including" and "having," as used in the specification, including the claims, have the same meaning as the word "comprising."

Sedimentary rocks frequently possess an anisotropic structure resulting, for example, from thin bedding, fine scale layering, the presence of oriented microcracks or fractures of the preferred orientation of nonspherical grains, or anisotropic minerals. This type of anisotropy is called formation intrinsic anisotropy. A dipole dispersion crossover is an indicator of stress-induced anisotropy dominating any intrinsic anisotropy that may also be present.

Figure 11:
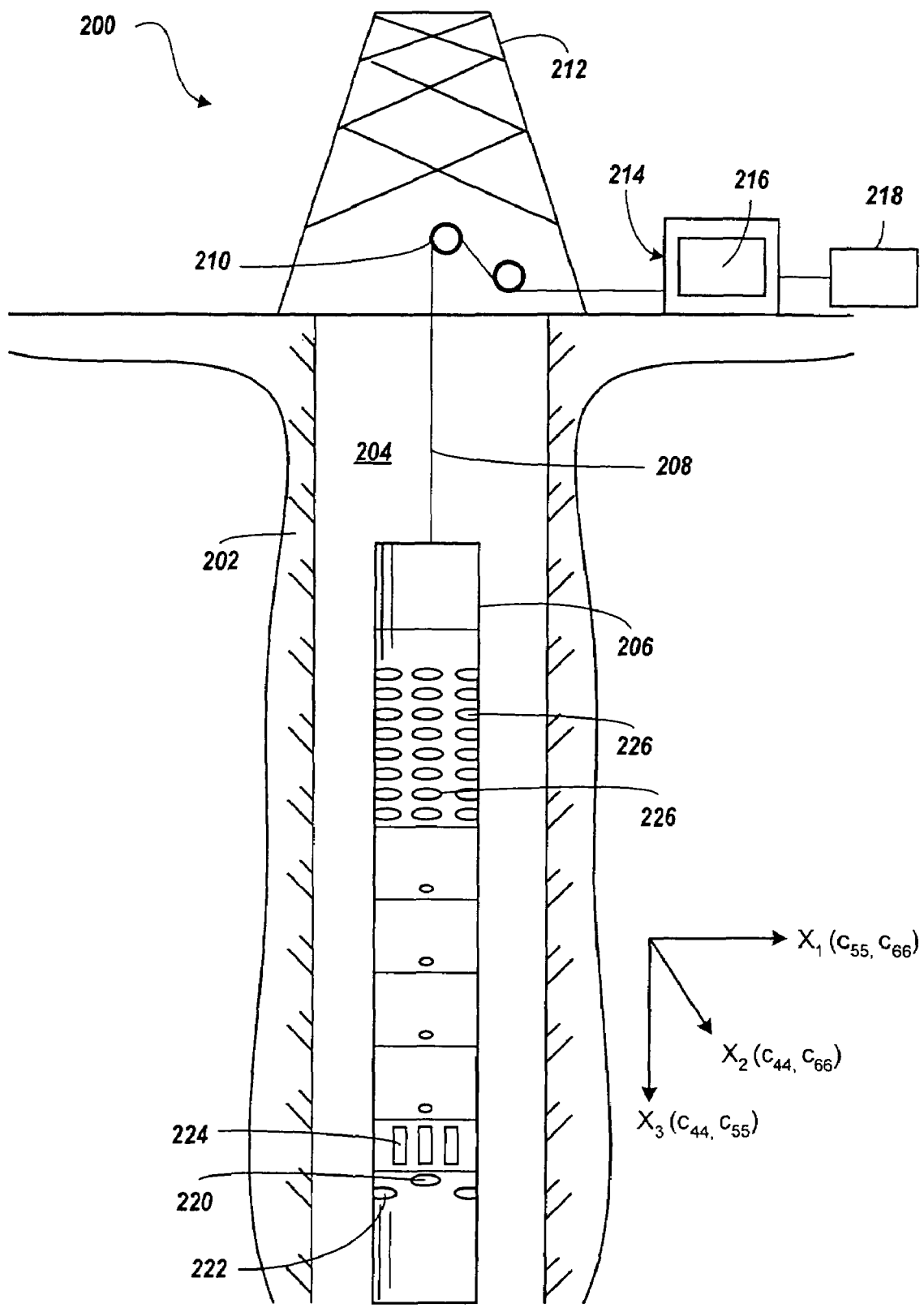
FIG. 11 is a diagram, partially in block form, of an apparatus that can be used to practice principles of the present invention.

As illustrated in FIG. 11 (and FIG. 15a), in an orthorhombic formation, the $X_3$-axis is assigned to be parallel to the borehole axis 102. The elastic constants, in reference to the borehole axes, take the form:

$$C = \begin{bmatrix} c_{11} & c_{12} & c_{13} & 0 & 0 & 0 \\ c_{12} & c_{22} & c_{23} & 0 & 0 & 0 \\ c_{13} & c_{23} & c_{33} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{66} \end{bmatrix}, \quad (5)$$

where the nine independent elastic moduli are $c_{11}$, $c_{12}$, $c_{13}$, $c_{22}$, $c_{23}$, $c_{33}$, $c_{44}$, $c_{55}$, and $c_{66}$. Formations with two orthogonal fracture systems or those subject to triaxial stresses (where the overburden stress $S_v$, maximum horizontal stress $S_{hmax}$, and minimum horizontal stress $S_{hmin}$ are different) exhibit orthorhombic symmetry. In addition, the presence of horizontal fluid mobility causes a reduction in the shear modulus $c_{66}$ resulting in an increase in the Stoneley slowness measured in a vertical borehole parallel to the $X_3$-axis.

Figure 15A:
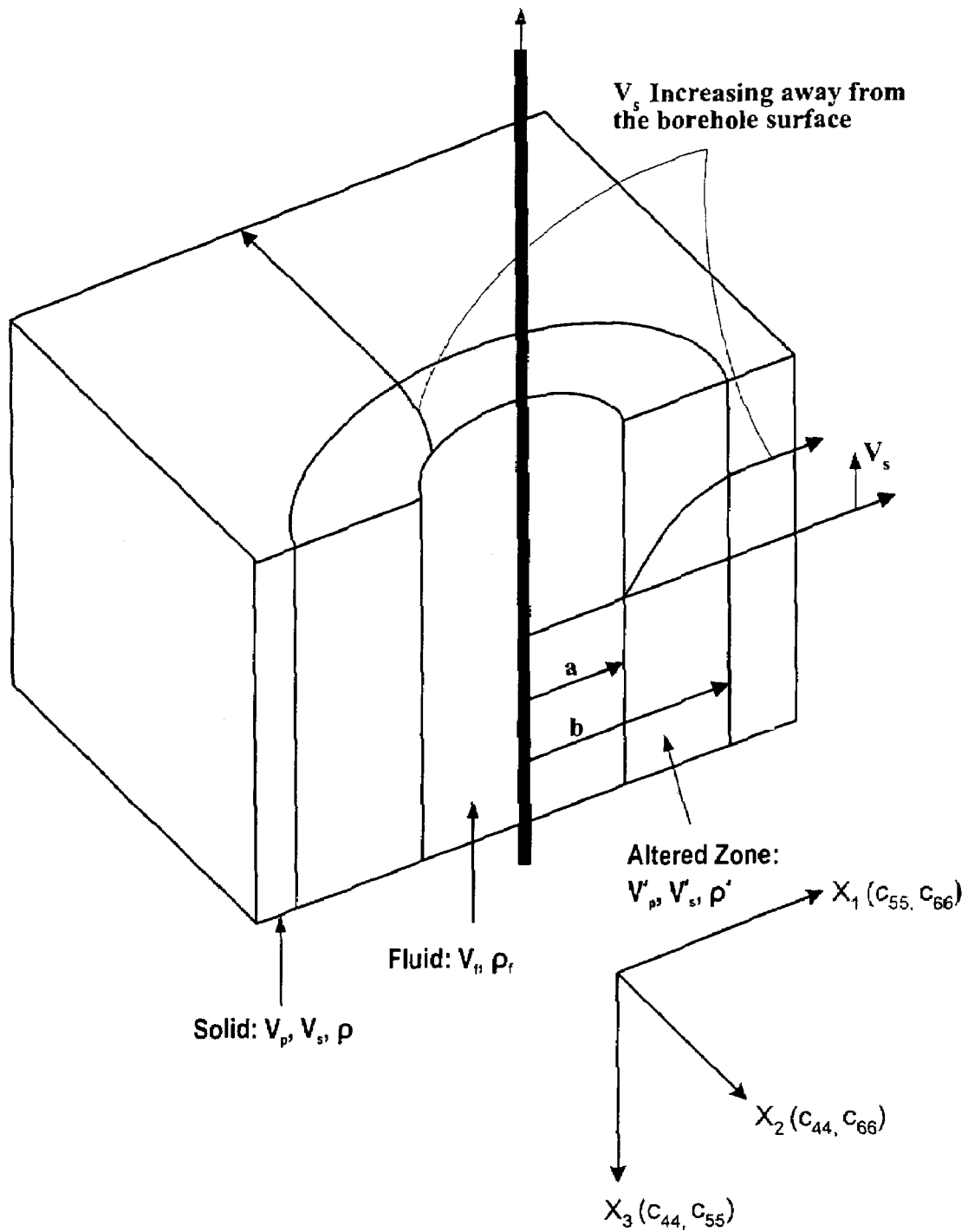
FIG. 15a illustrates a fluid-filled borehole in an elastic formation with a radially varying annulus.

In the case of a TI-formation having a symmetric $X_3$-axis parallel to the borehole axis 102 (FIG. 11), $c_{11}=c_{22}$; $c_{13}=c_{23}$; $c_{44}=c_{55}$; and $c_{66}=(c_{11}-c_{12})/2$. Consequently, the number of independent elastic constants for a TI-formation reduces to five. Examples of TI-formations include prestressed formations such that the horizontal stresses are the same and the overburden stress is different; or shaly formations with micro-layerings parallel to the $X_1$-$X_2$ plane (FIGS. 11 and 15a).

The three shear moduli $c_{44}$, $c_{55}$, and $c_{66}$ can be used to classify formation effective anisotropy as well as to estimate relative magnitudes of principal stresses. The radial profile of effective shear modulus $c_{66}$ in the horizontal plane can be estimated from the borehole Stoneley data. In addition, radial profiles of vertical shear moduli $c_{44}$ and $c_{55}$ can be estimated from the borehole cross-dipole data (e.g. U.S. Pat. No. 6,611,761, incorporated herein by this reference).

The effective horizontal shear modulus $c_{66}$ is affected by formation stresses, formation mobility, and micro-layerings in shale and/or the amount of clay in the formation. In contrast, the effective vertical shear moduli $c_{44}$ and $c_{55}$ are affected by formation stresses, but only marginally affected by formation mobility and microlayerings.

Monopole Stoneley and cross-dipole sonic data can be used to estimate the three formation shear moduli. The two vertical shear moduli ($c_{44}$ and $c_{55}$) can be directly estimated from the zero-frequency asymptotes of cross-dipole dispersions. These estimates are independent of any near-wellbore alteration, sonic tool effects, and mud compressional slowness. The third shear modulus $c_{66}$ can be estimated from the Stoneley data. However, it may be necessary to remove any near-wellbore alteration and tool effects for estimating horizontal shear modulus $c_{66}$ using the Stoneley data.

The lowest-order axi-symmetric Stoneley mode is affected by the formation mobility. In contrast, borehole flexural modes are marginally affected by formation mobility. The presence of a radially altered annulus changes the Stoneley slownesses at all frequencies. In contrast, only high-frequency flexural slownesses are affected in the presence of near-wellbore alteration.

A sand reservoir, in the absence of earth stresses and having low fluid mobility, behaves like an isotropic formation, and all three shear moduli are nearly equal. In contrast, the effective shear modulus $c_{66}$ in the borehole cross-sectional plane is smaller than the vertical shear moduli $c_{44}$ or $c_{55}$ in a sand reservoir exhibiting high mobility. Typically, formation mobility less than 10 md/cp is considered to be low, and more than 10 md/cp is considered to be high. In addition, the shear modulus $c_{66}$ is also smaller than the vertical shear moduli $c_{44}$ and $c_{55}$ in the presence of normal-fault stress regime characterized by a larger overburden than horizontal stresses.

Radial profiles of formation shear moduli correlate to measured drawdown mobility. Drawdown mobility may be measured in any of a number of ways including, but not limited to: using Schlumberger's Modular Dynamics Tester (MDT—the MDT measures formation fluid pressure response to provide drawdown mobility) tool, nuclear magnetic resonance (NMR) derived permeability, core permeability estimates, and spectroscopic analysis. An optimal completion of a well for enhanced production may require both the identification of depth intervals and radial extent of near-wellbore alteration in the reservoir.

In a high porosity sand reservoir, high mobility intervals are characterized by a horizontal shear slowness $c_{66}$ that is larger than the vertical shear slownesses $c_{44}$ and $c_{55}$. In addition, the effective horizontal shear modulus $c_{66}$ is larger than moduli $c_{44}$ and $c_{55}$ whenever horizontal stress magnitudes are larger than the overburden stress. In an overlying shale interval, $c_{66}$ is expected to be larger than $c_{44}$ or $c_{55}$, provided that the horizontal stresses are not larger than the overburden stress.

The borehole flexural dispersion is negligibly affected by formation mobility. Therefore, it is assumed that the vertical shear modulus ($c_{44}$ or $c_{55}$) that largely control the flexural dispersion can be used as the reference shear modulus to define the Stoneley dispersion in the absence of formation mobility.

Figure 4:
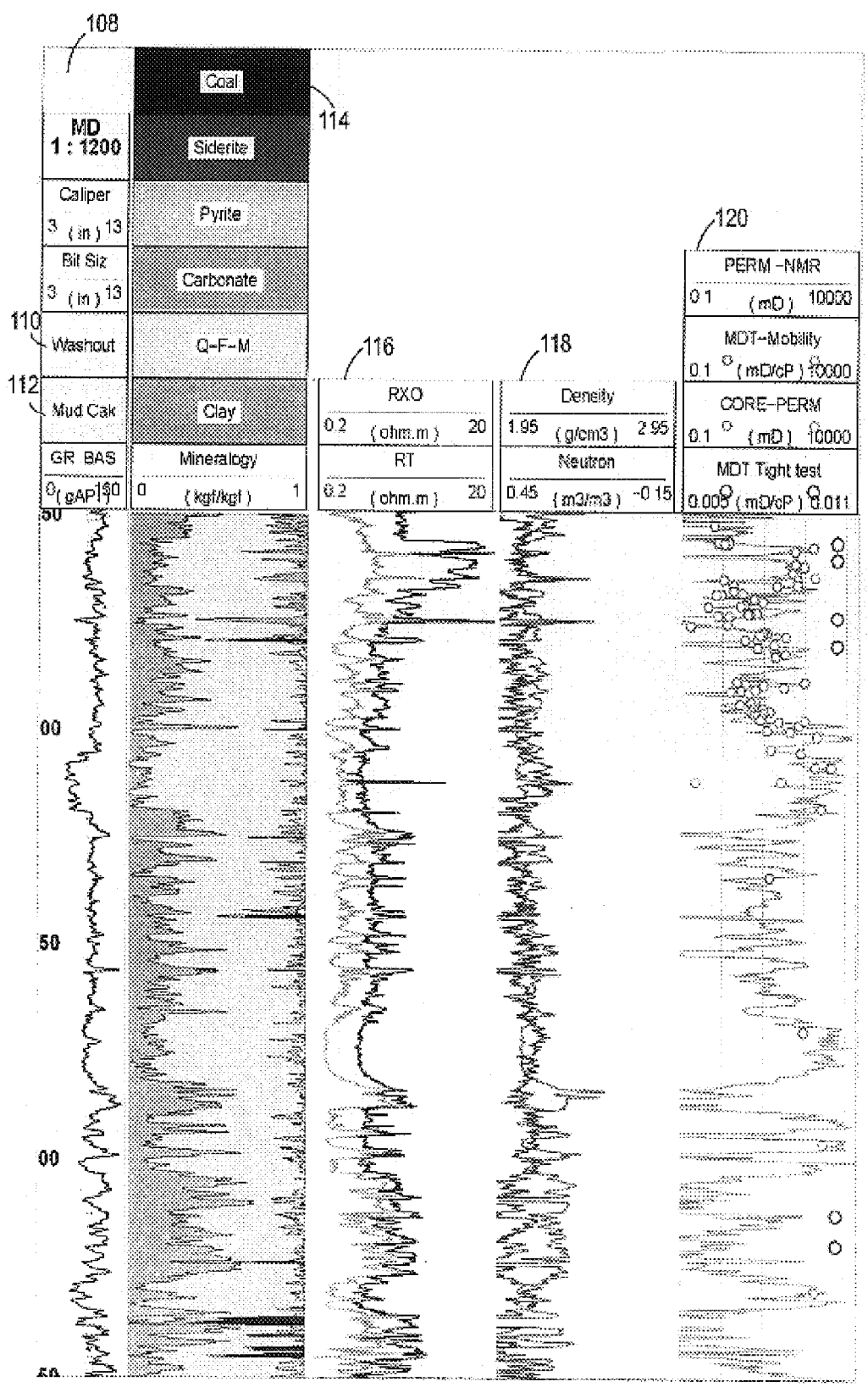
FIG. 4 illustrates a composite log of mineralogy, resistivity, porosity, and mobility as a function of depth for a formation.

FIG. 4 is a composite log of mineralogy, resistivity, porosity, and mobility for a given formation. The first depth track 108 contains the gamma-ray and caliper with shading identifying washout 110 and mud-cake 112 intervals. The second track 114 displays volumetric lithology of the given formation. The third track 116 shows the near (in green) and far-field (in blue) resistivity logs as an indicator of fluid invasion. The fourth track 118 contains the porosity (in blue) and the formation mass density (in red) logs. The fifth track 120 contains the NMR derived permeability (in green) together with drawdown mobility from the MDT tool and core permeability (in blue circles). The black circles identify depths where drawdown tests indicate tight tests.

Figure 5A:
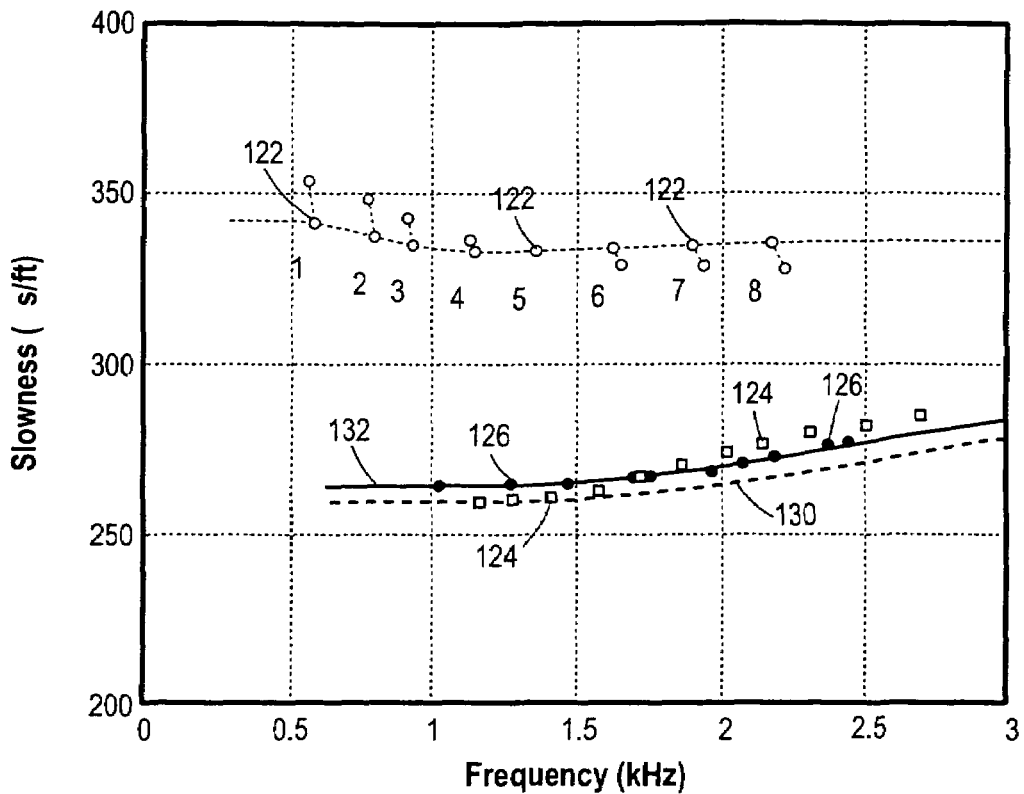
FIG. 5a is a chart illustrating measured fast and slow-dipole dispersions, along with a Stoneley dispersion, for the formation of FIG. 4.
Figure 5B:
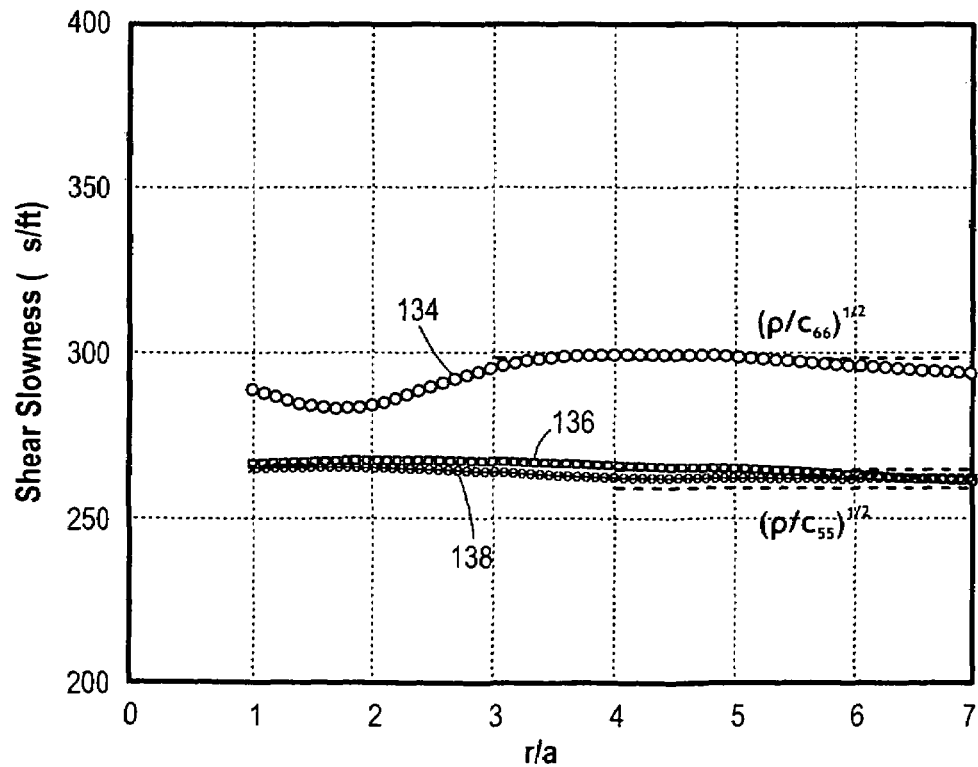
FIG. 5b is a chart illustrating radial profiles of horizontal shear slowness and vertical fast and slow-shear slownesses, for the formation of FIG. 4.

Consider a frame at depth A in a predominantly sand interval. FIG. 5A shows the measured Stoneley (circles 122), fast-shear (squares 124), and slow-shear (dots 126) slownesses together with the corresponding reference dispersions 128, 130, 132, respectively, for equivalent homogeneous and isotropic formations. The reference Stoneley and dipole dispersions account for the sonic tool effects and help in removing the tool bias on the interpretation of sonic data. FIG. 5B illustrates radial profiles of the Stoneley (circles 134), fast (squares 136), and slow-dipole (x's 138) slownesses. Significant differences between the Stoneley 134 and slow-dipole 138 shear slowness are an indicator of a significant amount of near-wellbore mobility. In contrast, larger differences between the Stoneley 134 and fast-dipole 136 radial profiles of shear slownesses at larger radial distances indicate that the far-field mobility is even larger than that present in the near-wellbore region.

Figure 6:
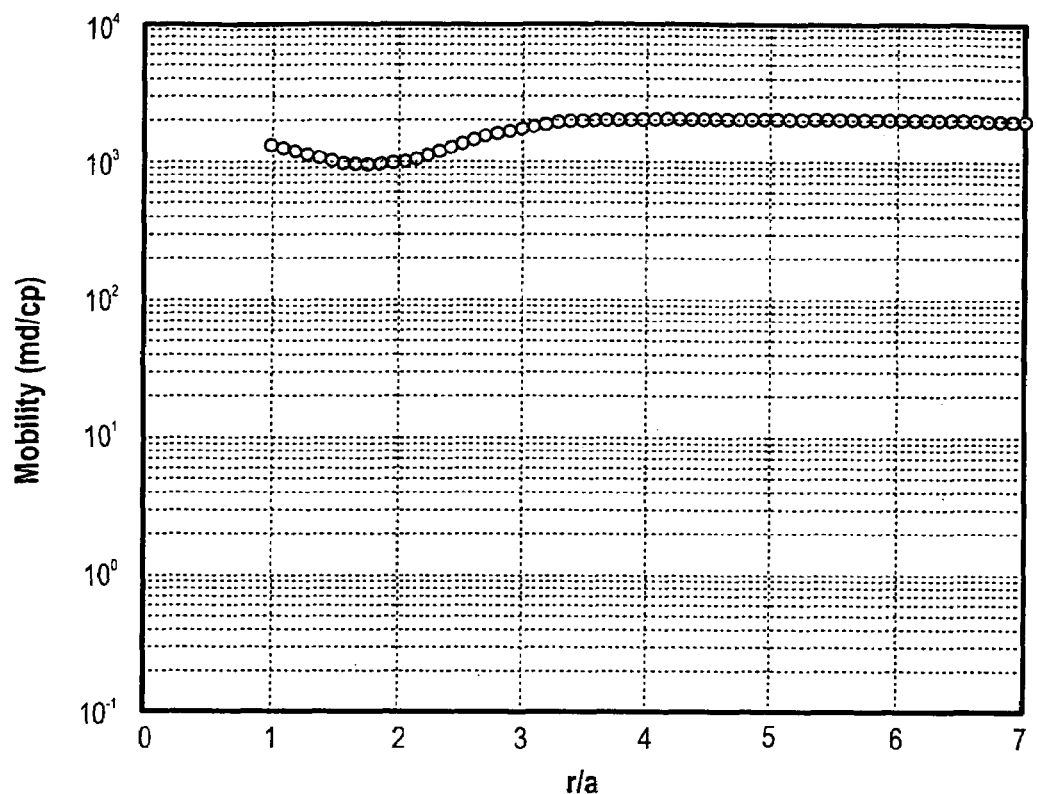
FIG. 6 is a chart illustrating a radial profile of the formation mobility.

Using a measured pretest drawdown mobility of 1000 md/cp at an effective radial position of r/a=2 (r/a is the normalized radial distance), a formation calibration coefficient $F_C$ may be used to obtain the radial profile of formation mobility shown in FIG. 6. According to FIG. 6, the far-field mobility is about 2000 md/cp when the measured drawdown mobility is about 1000 md/cp at r/a=2. The measured drawdown mobility (or permeability) can be estimated from the existing techniques, such those described by Jensen et al. Jensen et al., *Evaluation of Permeabilities Determined From Repeat Formation Tester Measurements Made in the Prudhoe Bay Field*, SPE PAPER 14400, p. 3, Eq. (4). Presented at the 60th Annual Technical Conference and Exhibition of the Society of Petroleum Engineers, Las Vegas, Nev. (Sep. 22-25, 1985).

Figure 7A:
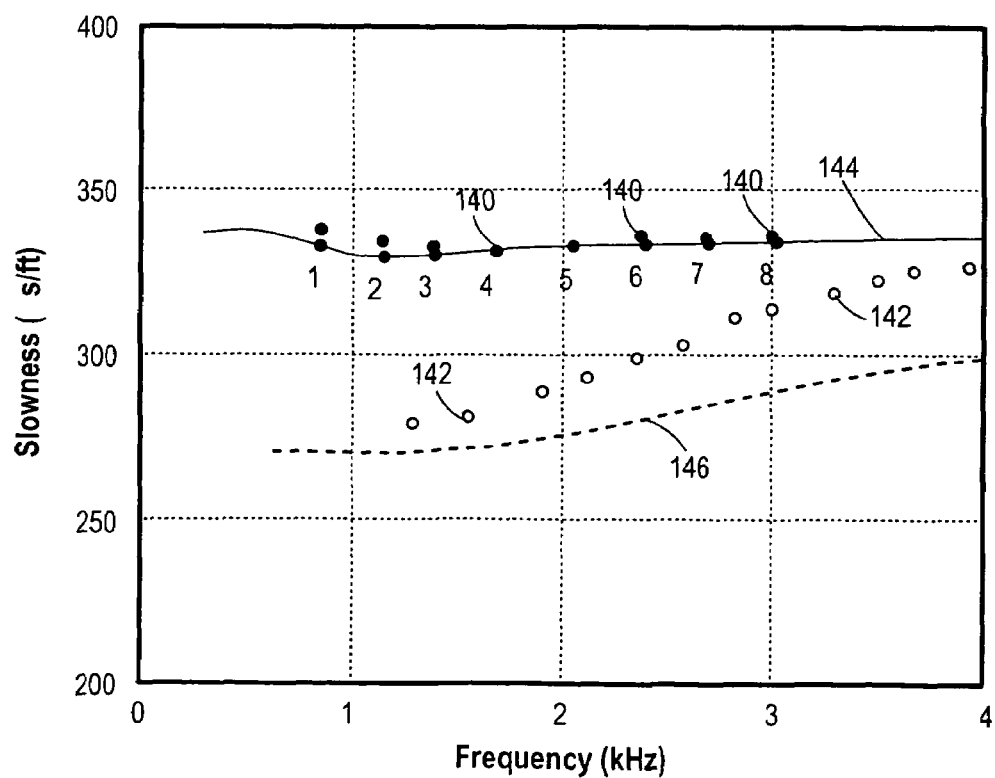
FIG. 7a is a chart illustrating measured dipole dispersion and a Stoneley dispersion.
Figure 7B:
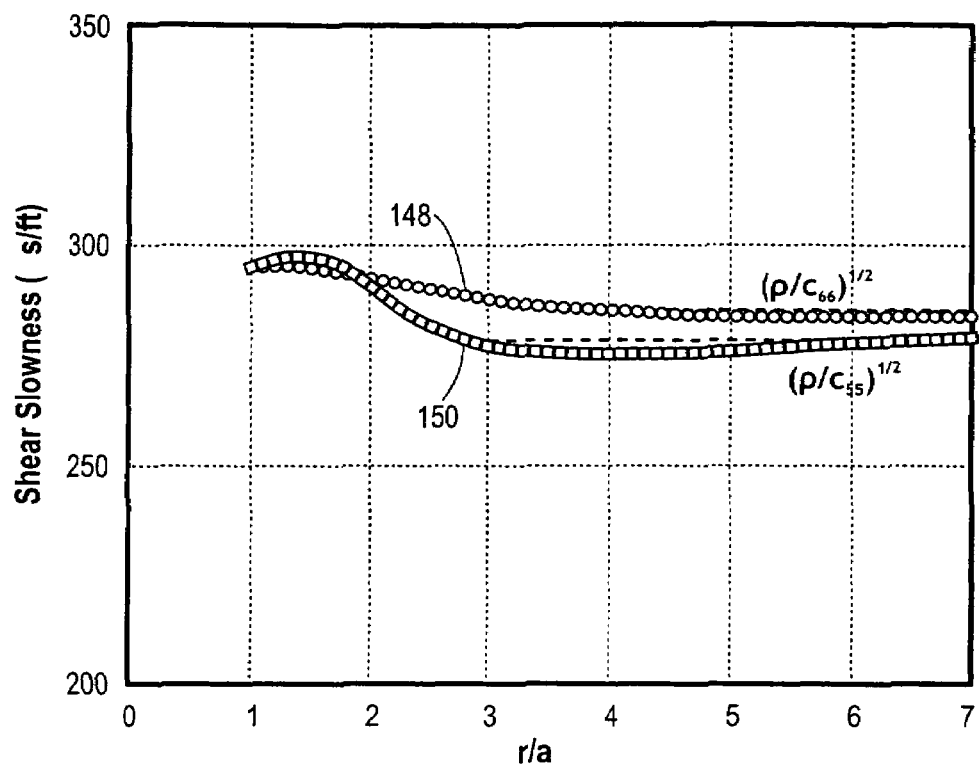
FIG. 7b is a chart illustrating radial profiles of horizontal shear slowness along with vertical fast and slow-shear slownesses.
Figure 8:
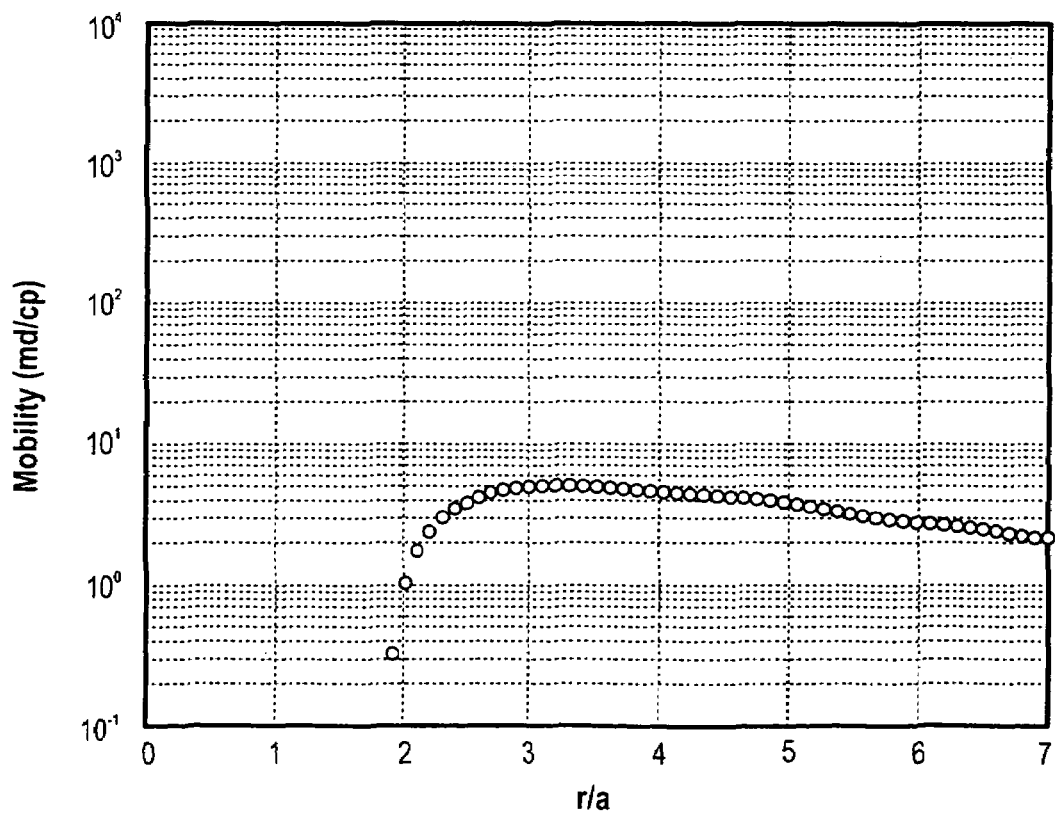
FIG. 8 illustrates a radial profile of the formation mobility obtained from differences between the Stoneley horizontal shear slowness and the vertical fast-dipole shear slowness at various radial positions.

Referring next to FIG. 7A, considering a frame in a tight shaly sand at depth B, the dots 140 and circles 142 denote the measured Stoneley and dipole dispersions, respectively. Likewise, the solid curve 144 and dashed curve 146 represent the reference Stoneley and dipole dispersions, respectively, for equivalent homogeneous and isotropic formations. The reference Stoneley and dipole dispersions 144, 146 account for the sonic tool effects and help in removing the tool bias on the interpretation of sonic data. Note that there is no evidence of any azimuthal shear slowness anisotropy at this depth. The circles 148 and squares 150 shown in FIG. 7B represent radial profiles of horizontal and vertical shear slownesses, respectively. The pretest drawdown mobility, estimated to be 1 md/cp at r/a=2, may be used to calculate the formation calibration coefficient $F_C$. FIG. 8 is a radial profile of formation mobility at depth B. Note that there is an increase in formation mobility to about 5 md/cp at r/a=3, followed by a decreasing trend as r/a increases. The mobility profile mimics differences in squares of the horizontal shear slowness and vertical shear slowness ($S_H^2 - S_V^2$). The dipole radial profile of vertical shear slowness shows an increase of about 10% in the damaged near-wellbore region. In addition, differences between the Stoneley and dipole shear slowness profiles are negligibly small implying a substantial reduction in fluid mobility. This is consistent with negligibly small permeability over a radial distance of about eight inches leading to a conclusion of tight formation during the drawdown test.

Figure 9A:
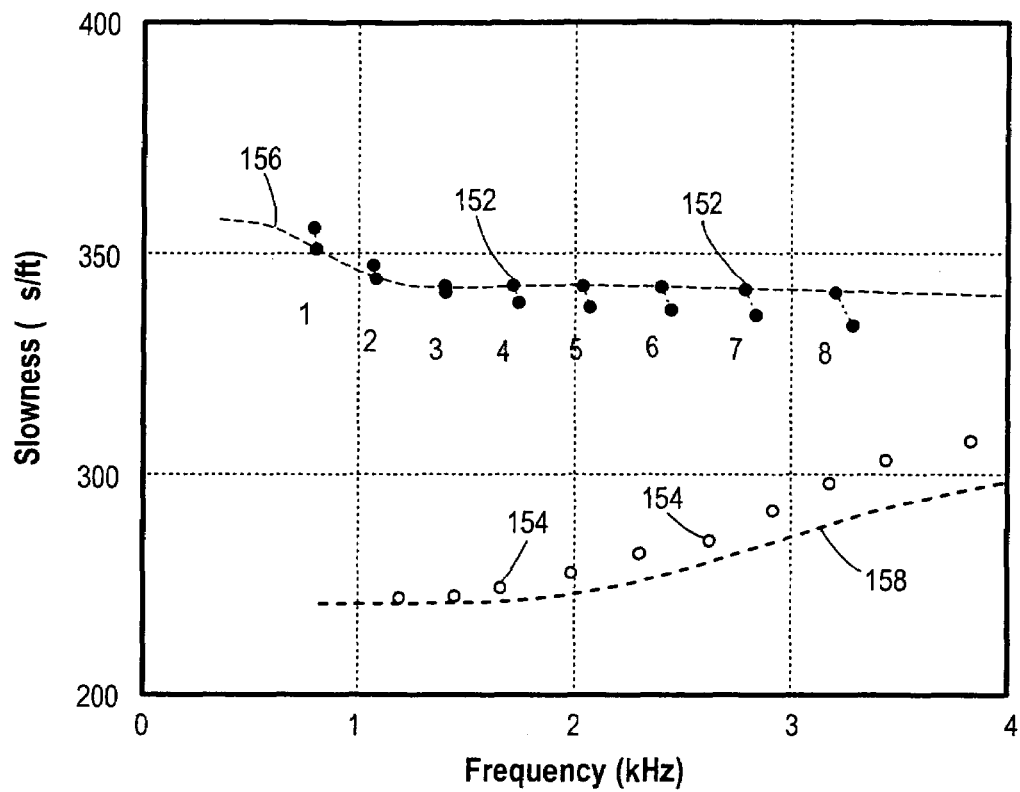
FIG. 9a is a chart illustrating measured and equivalent homogeneous isotropic formation dipole and Stoneley dispersions for a formation.
Figure 9B:
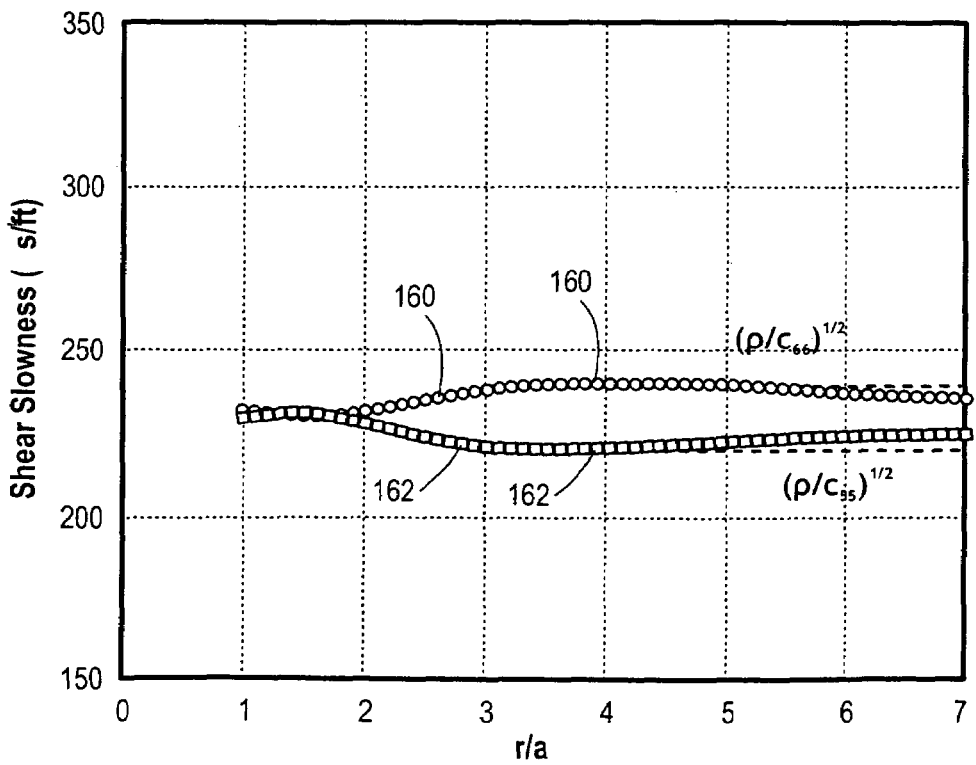
FIG. 9b is a chart illustrating radial profiles of horizontal shear slowness and vertical fast and slow-shear slownesses for a formation.
Figure 10:
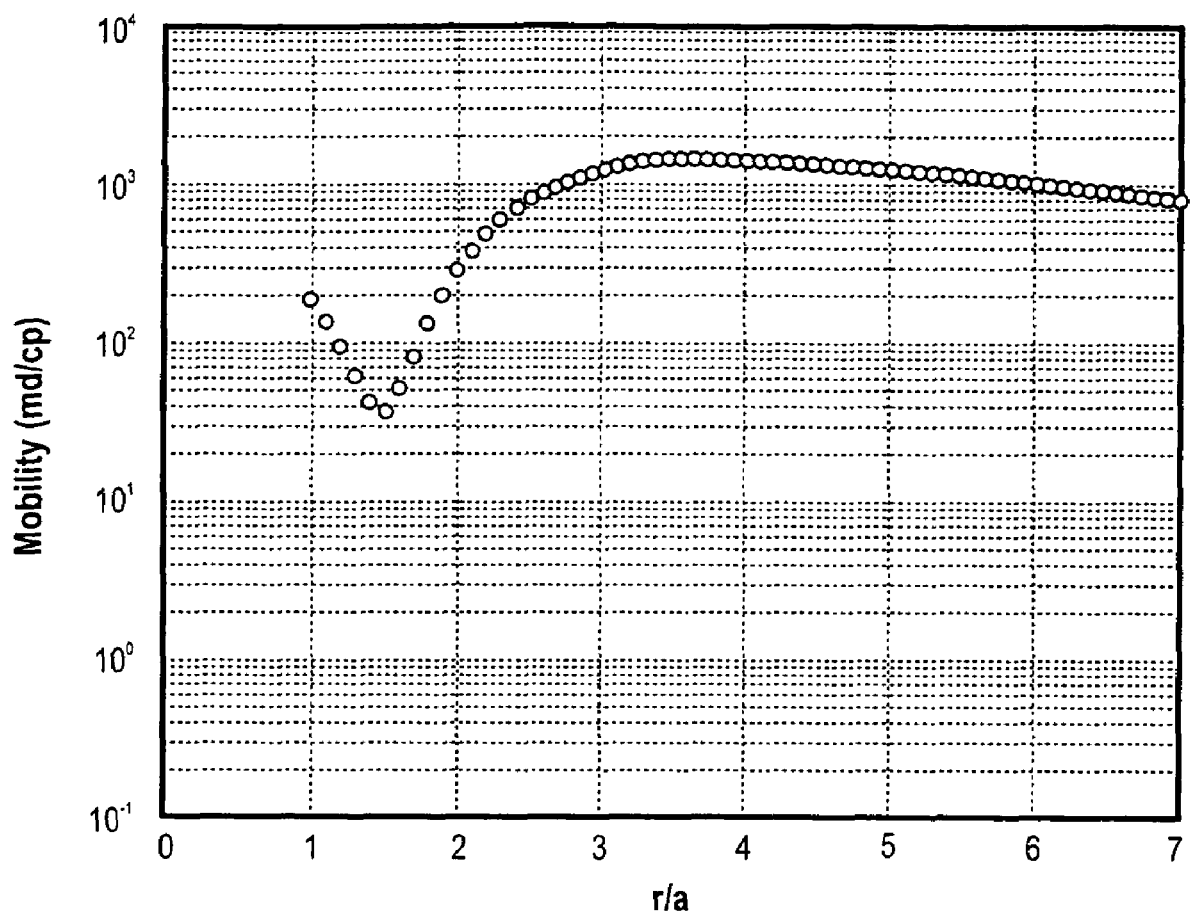
FIG. 10 is a chart illustrating a radial profile of formation mobility obtained from differences between Stoneley horizontal shear slowness and the vertical fast-dipole shear slownesses at various radial positions.

Consider next a frame in a tight shaly sand at a depth C. According to FIG. 9a, the dots 152 represent measured Stoneley dispersions and the circles 154 represent dipole dispersions. The solid curve 156 and dashed curve 158 represent the reference Stoneley and dipole dispersions, respectively, for equivalent homogeneous and isotropic formations. The reference Stoneley and dipole dispersions account for the sonic tool effects and aid in the removal of the tool bias from the interpretation of sonic data. Again, there is no evidence of any azimuthal shear slowness anisotropy at depth C. The circles 160 and the squares 162 shown in FIG. 9b represent radial profiles of horizontal and vertical shear slownesses, respectively. The pretest drawdown mobility is approximately 300 md/cp at an effective depth of r/a=2. The pretest drawdown mobility is used to calculate the formation calibration coefficient $F_C$. The dipole radial profile of vertical shear slowness shows an increase of about 10% in the damaged near-wellbore region, whereas the horizontal shear slowness is increasing with larger radial distances, implying an increase in the far-field mobility. FIG. 10 displays the radial profile of formation mobility at depth C. The far-field mobility is about 1500 md/cp at r/a=4, when the pretest drawdown mobility is estimated to be 300 md/cp at r/a=2.

Analyses of several frames in the reservoir interval according indicate that the far-field mobility calculated according to principles of the present invention is two to ten times larger than the near-field mobility measured according to conventional techniques (NMR-derived permeability, pretest drawdown mobility, core data, etc.). This range of increase in far-field mobility is consistent with earlier studies wherein well-test derived permeability (e.g., analysis of DST data) or permeabilities obtained from formation tester "build-up" analyses (under suitable conditions) are compared with the near-field permeability estimates. Jensen et al. 1985.

The radial profiles of the horizontal and vertical shear slownesses can also successfully predict depths identified as tight formations where drawdown mobility can not be estimated. Some depths exhibit tight formation because of mobility impairment caused by near-wellbore damage. Other depths may exhibit tightness because of high clay content, causing the Stoneley shear slownesses to be smaller than dipole shear slownesses (as is observed in a transversely-isotropic shale in the absence of significant formation stresses).

Therefore, as shown and described above, methods apparatus for radial profiling of formation mobility according to principles of the present invention may include selecting a depth interval in a reservoir with a vertical $X_3$-axis and obtaining a radial profile of horizontal shear slowness $S_H$. The radial profile of horizontal shear slowness $S_H$ may be obtained in any of a number of ways, some of which are described in detail below. The radial profile of horizontal shear slowness is characterized by the effective shear modulus $c_{66}$ for a borehole parallel to the $X_3$-axis in an orthorhombic formation. Thus, the horizontal shear slowness is given by:

$$S_H^2 = \left(\frac{\rho}{c_{66}}\right) \quad (6)$$

In addition, one may obtain radial profiles of vertical shear slownesses $S_{V1}$ and $S_{V2}$. The radial profiles of vertical shear slownesses $S_{V1}$ and $S_2$ may be found by any technique. For example, the radial profiles of vertical shear slowness may be generated as described in U.S. Pat. No. 6,611,761, which is incorporated by this reference. U.S. Pat. No. 6,611,761 describes in detail a technique for obtaining radial profiles of the fast and slow shear slownesses using measured dipole dispersions in two orthogonal directions that are characterized by the shear moduli $c_{44}$ and $c_{55}$ for a borehole parallel to an $X_3$-axis in an orthorhombic formation. Similarly, the vertical shear slownesses $S_{V1}$ and $S_{V2}$ are given by:

$$S_{V1}^2 = \left(\frac{\rho}{c_{44}}\right), \quad (7)$$

$$S_{V2}^2 = \left(\frac{\rho}{c_{55}}\right). \quad (8)$$

The formation calibration coefficient $F_c$ may be calculated according to:

$$F_C = \frac{(S_H^2 - S_V^2)}{M}, \quad (9)$$

where:

$S_H$ and $S_V$ are the horizontal and vertical shear slownesses obtained from the corresponding profiles at a radial distance r/a=2;

"a" is the borehole radius; and

M denotes the measured drawdown formation mobility from a pretest.

Alternatively, in the absence of any measured formation drawdown mobility from a pretest, the formation calibration coefficient $F_C$ may also be estimated using the equation given below (Brie, A. et al., *Quantitative Formation Permeability Evaluation From Stoneley Waves*, SPE RESERVOIR EVALUATION AND ENGINEERING, Vol. 3 No. 2, pp. 109-117 (April 2000)):

$$F_C = \text{Re} \frac{2\rho H_1^{(1)}(k_{c2}a)}{aC_D k_{c2} H_0^{(1)}(k_{c2}a)} \quad (10)$$

where $$k_{c2} = \sqrt{i\omega/C_D}, \quad (11)$$

$\rho$ is the formation bulk density, and $C_D$ is the slow wave diffusivity given by:

$$C_D = M \frac{K_f}{\phi} \left[ \frac{1 + \frac{K_f}{\phi\left(K_d + \frac{4}{3}G\right)} \cdots \times}{\left\{1 + \frac{1}{K_S}\left(\frac{4}{3}G\left(1 - \frac{K_d}{K_S}\right) - K_d - \phi\left(K_d - \frac{4}{3}G\right)\right)\right\}} \right]^{-1} \quad (12)$$

where:
the mobility M is defined by the ratio of formation permeability K and pore fluid viscosity μ, $$M = \frac{K}{\mu}, \tag{13}$$

φ is the porosity,
$K_f$ is the borehole fluid compressional modulus,
G is the vertical shear modulus ($c_{44}$ or $c_{55}$), and
$K_s$ and $K_d$, respectively, denote bulk modulus of the solid grain and drained state of the formation. The estimation of $F_C$ is done at a relatively low frequency (600 to 900 Hz) that effectively determines a fixed radial depth of investigation.

The radial variation in formation mobility M may be calculated as a function of radial position (r/a) from the borehole surface according to the equation:

$$M = \frac{(S_H^2 - S_V^2)}{F_C}. \tag{14}$$

As mentioned above, the shear modulus may be calculated by a number of techniques, and examples of horizontal shear modulus calculation are described below. The methods described below include procedures and apparatus for obtaining radial profiles of horizontal shear slowness and estimating a horizontal shear modulus $c_{66}$ outside any near-wellbore altered annulus. Therefore, the limitations of the prior art related to the estimation of horizontal shear modulus $c_{66}$ in the far-field of an orthorhombic or TI-formation with the TI-symmetry $X_3$-axis parallel to the borehole are reduced or overcome. However, conventional methods of obtaining shear moduli that do not account near-wellbore condition (or for the tool itself) may also be used.

Turning next to FIG. 11 a logging system 200 is shown that may be used according to embodiments of the invention. A subsurface formation 202 is traversed by a borehole 204 which may be filled with drilling fluid or mud. A logging tool 206 is suspended from an armored cable 208 and may have optional centralizers (not shown). The cable 208 extends from the borehole over a sheave wheel 210 on a derrick 212 to a winch forming part of surface equipment 214. Well known depth gauging equipment (not shown) may be provided to measure cable displacement over the sheave wheel 210. The tool 206 may include any of many well known devices to produce a signal indicating tool orientation. Processing and interface circuitry within the tool 206 amplifies, samples and digitizes the tool's information signals for transmission and communicates them to the surface equipment 214 via the cable 208. Electrical power and control signals for coordinating operation of the tool 206 are generated by the surface equipment 214 and communicated via the cable 208 to circuitry provided within the tool 206. The surface equipment includes a processor subsystem 216 (which may include a microprocessor, memory, clock and timing, and input/output functions—not separately shown), standard peripheral equipment (not separately shown), and a recorder 218.

The logging device 206 may be, for example, an MSIP logging tool. It will be understood by those of skill in the art having the benefit of this disclosure, however, that any suitable logging device, including any LWD device, can also be utilized.

Figure 12:
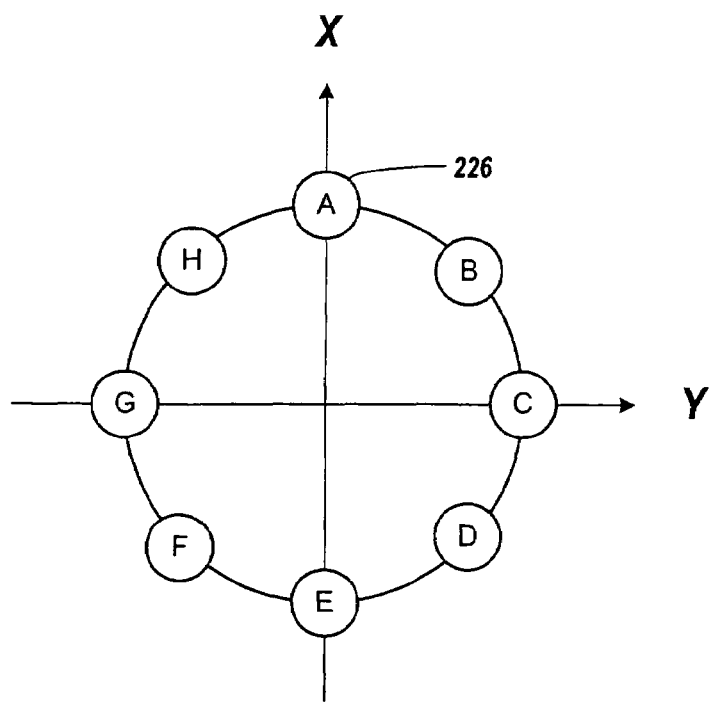
FIG. 12 is a cross sectional view of the tool illustrated in FIG. 11 showing the placement of hydrophones that can be used at a receiver station according to one embodiment of the present invention.

The logging tool 206 includes multi-pole transmitters such as crossed dipole transmitters 220, 222 (only one end of dipole 220 is visible in FIG. 11) and a monopole transmitter 224, capable of exciting compressional, shear, Stoneley, and flexural waves. A plurality of receivers is arranged on the logging tool spaced from the transmitters. For example, FIG. 11 shows thirteen spaced receiver stations, each receiver station comprising multiple receiver hydrophones 226 mounted azimuthally at regular intervals around the circumference of the tool 206. According to some embodiments, there may be eight receiver hydrophones 226 spaced at forty-five degree intervals around the tool 206 as shown in FIG. 12. The eight receiver hydrophones 226 are shown at locations A-H. According to the embodiment of FIG. 12, in an X-Y plane, an X-dipole component of a received signal may be obtained by subtracting the signals received at A and E (i.e., A-E), and a Y-dipole component can be obtained by subtracting the signals received at C and G (i.e., C-G). The other receivers may also be used to obtain X and Y-dipole components. With eight receivers 226-at each receiver station as shown in FIG. 11, there are a total of one-hundred and four receiver elements. The receiver stations are also configurable for monopole reception. Other configurations, such as a DSI tool with four receivers at each of eight receiver stations, are also possible.

The transmitter electronics contain a power amplifier and switching circuitry capable of driving the two crossed-dipole transmitter elements and the monopole element from a programmable waveform. Separate waveforms with appropriate shape and frequency content can be used for dipole, Stoneley and compressional measurements. The receiver electronics processes the signals from the thirty-two individual receiver elements located at the eight receiver stations, which are spaced six inches apart. At each station, four receivers 226 are mounted as shown in FIG. 12 which allows measurement of the dipole and crossed-dipole waveforms by calculating the difference between outputs from opposite receivers, as previously described. A monopole signal can be produced by summing the outputs of the receivers 226. The receiver electronics multiplexes, filters, amplifies, and channels the signals from the thirty-two receiver elements to eight parallel signal paths. These eight parallel analog signals are passed to an acquisition electronics cartridge where eight 12-bit analog-to-digital converters digitize the signals from the receiver electronics. A telemetry circuit passes the digitized information to the earth's surface via the cable 208.

Figure 2:
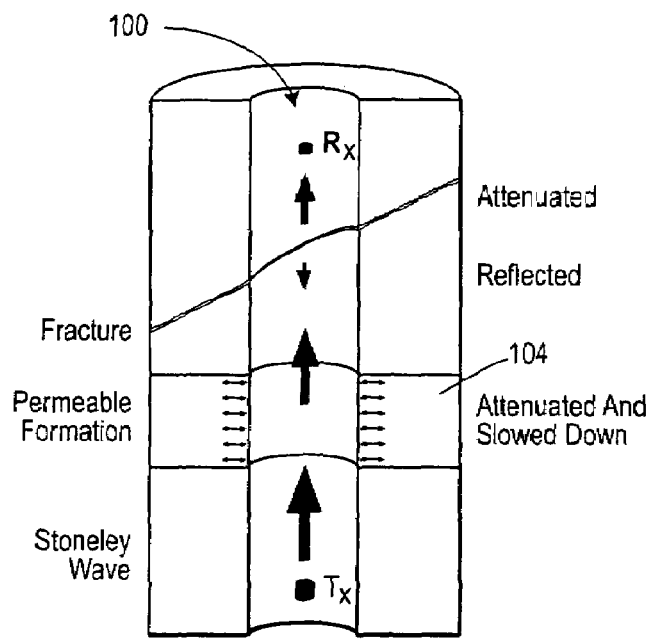
FIG. 2 is a cross-sectional schematic diagram of a permeable interval on Stoneley waves.
Figure 3:
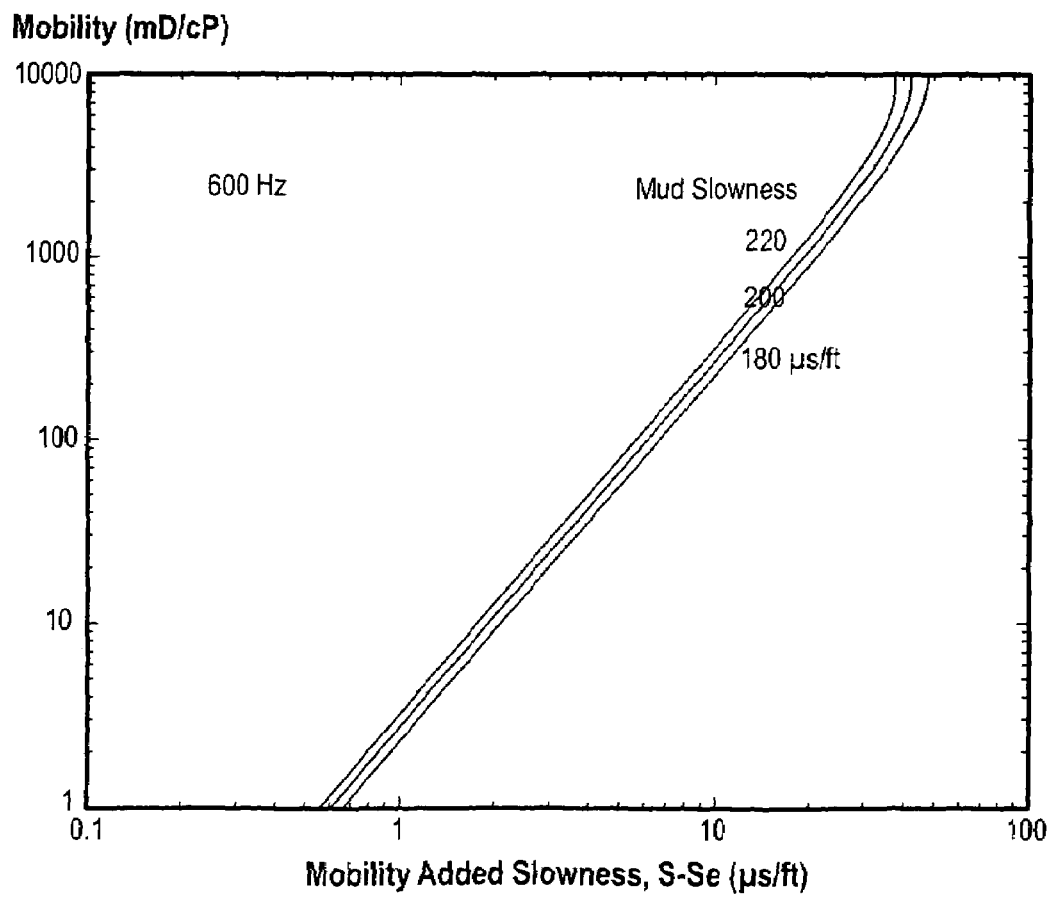
FIG. 3 is a chart illustrating how differences in Stoneley slownesses ($S-S_e$) at a chosen frequency (600 Hz in this FIG.) in the low-frequency approximation framework can be calibrated to yield the formation mobility for different values of mud slownesses.
Figure 13:
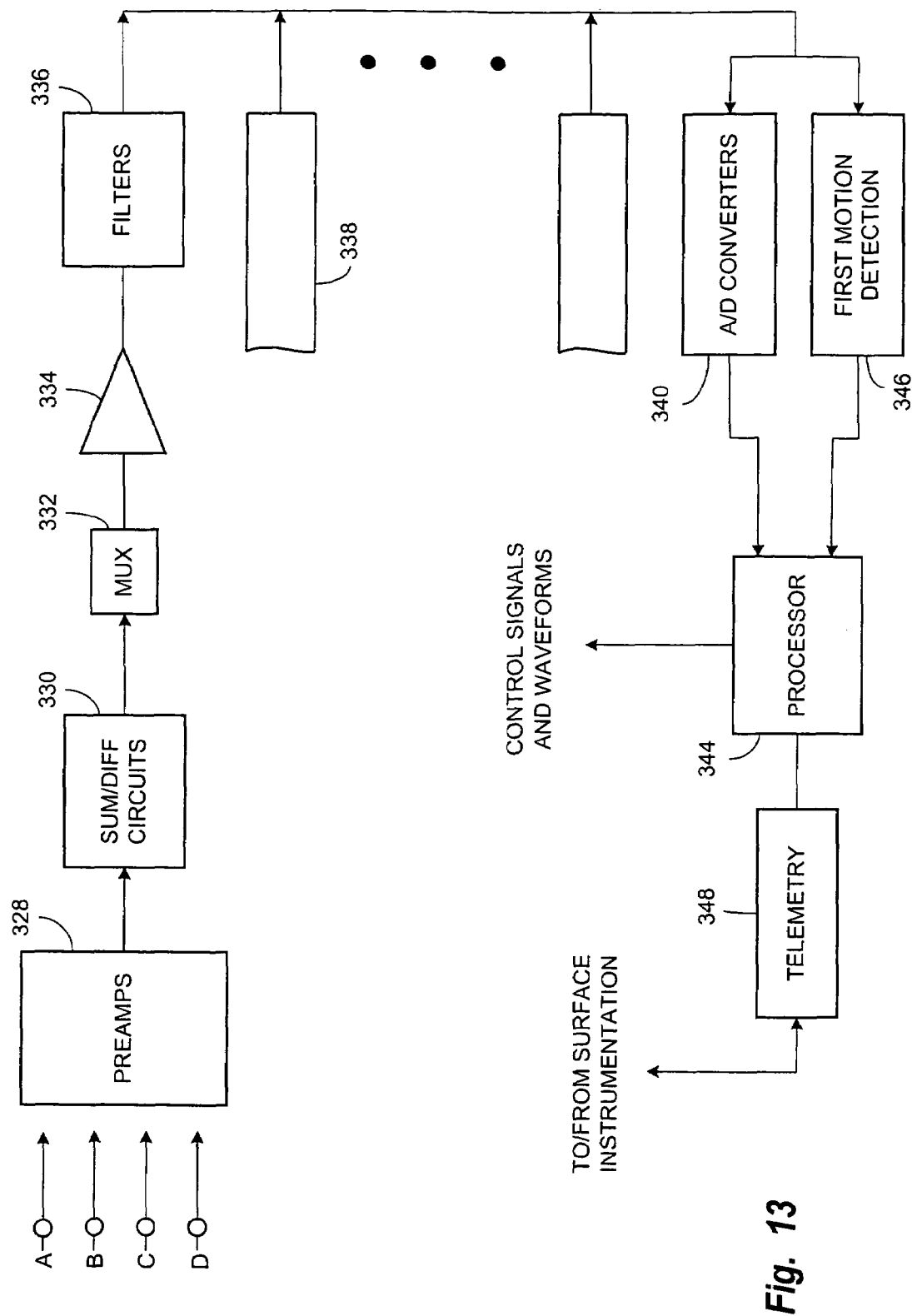
FIG. 13 is a block diagram of a portion of the electronics of the apparatus shown in FIG. 11.

FIG. 13 illustrates an example of an acquisition signal path in block diagram form for one of the eight (or other suitable number of) receiver stations, as described in Harrison et al., supra. Each receiver 226 (FIG. 11) has its own charge preamplifier (represented at 328). The odd numbered receiver pairs are aligned with the upper dipole transmitter 220 (FIG. 11), and even numbered receiver pairs are aligned with the lower dipole transmitter 222 (FIG. 2). The output of the receivers 226 (FIG. 11) passes into both a summing circuit (for monopole measurements) and a differencing circuit (for dipole measurements), as represented at 330. Under software control, the sum or difference is selected by a multiplexer stage 332 and the signal is passed to one of eight programmable gain amplifier stages 334 and filters 336. Other similar channels are represented by block 338. The eight parallel analog signals are passed to eight parallel 12-bit A/D converters 340, where simultaneous waveform digitization is performed. After the signals are digitized, the eight waveforms are passed to a memory module associated with a downhole processor 344. The processor 344 provides control signals and waveforms to the transmitter and receiver electronics. An alternate path directs the eight analog receiver signals into threshold crossing detection circuitry or digital first motion detection, as represented at block 346. This first motion detection circuitry detects the time of all up or down going threshold crossings. The digitized waveform data and the threshold crossing time data are passed to the surface using telemetry circuitry 348. One of ordinary skill in the art having the benefit of this disclosure will understand that more advanced tool implementations, including those with additional transmitters, receivers, and/or longer transmitter-to-receiver (T/R) spacings, and more powerful processing capabilities, can be used consistent with the principles described herein.

According to principles described herein, the sonic tool structure is replaced by a model, for example a resonance-impedance model or a heavy fluid model, to account for sonic tool bias. The resonance-impedance model describes measured Stoneley dispersions across a wide range of borehole diameters and formation slownesses. The resonance-impedance model may replace tool structure by an equivalent surface impedance placed concentrically with the borehole axis. The surface impedance may be imposed at the actual tool diameter. The tool compressibility is described by a frequency-dependent complex function that simulates the observed fluid-resonance in the vicinity of receiver mounts and associated attenuation with the borehole Stoneley mode in a variety of formations. The resonance-impedance model tool parameters may be obtained by calibrating the model predictions with measured Stoneley dispersions in a test well of known parameters. A further simplification of the equivalent structure with a frequency-dependent compressibility leads to a column with an appropriate surface impedance condition at the interface between the tool and borehole fluid. This equivalent structure can be introduced into an open hole and the fundamental eigenmodes associated with the lowest-order axi-symmetric Stoneley mode of the composite structure can be calculated using a mode-search routine. These eigenmodes constitute the reference solution for a chosen homogeneous and isotropic formation. The kernels in the perturbation integral used in the Stoneley radial profiling (SRP) algorithm are then computed in terms of these eigenmodes. The sonic tool bias is generally small in large-diameter holes and slow formations. However, the tool bias can be significant in small-diameter holes and fast formations. Radial depths of investigation of data kernel for borehole Stoneley modes in the presence of a tool structure are, generally, larger than that for an empty borehole. The magnitude of data kernel is a measure of sensitivity of Stoneley dispersions to changes in the formation horizontal shear modulus $c_{66}$ of a TIV-formation. The sensitivity of borehole Stoneley dispersion to formation horizontal shear slowness in the presence of a tool structure is, generally, larger at low frequencies and smaller at high frequencies than those for an empty borehole. Radial profile of the horizontal shear slowness enables an estimate of $c_{66}$ outside any near-wellbore altered annulus for subsequent application in the AVO analysis.

According to one aspect of the invention, a Backus-Gilbert (B-G) inversion technique is used to finding the horizontal radial profile of horizontal shear slowness (or equivalently, horizontal shear velocity) radial profile from a set of discrete points on the measured Stoneley dispersion curve in the presence of an equivalent column with a surface-impedance condition and placed concentric with the borehole axis. Given perturbations in the formation material properties or shear modulus, a theoretical model predicts the corresponding changes in the Stoneley velocity dispersions. From synthetically generated (or measured) Stoneley wave velocities at a few discrete frequencies, a reasonable initial guess of the formation horizontal shear slowness can be made. In addition, one may take the far-field compressional slowness, formation mass density, borehole diameter, mud compressional slowness, and mass density to define the initial parameters that define the 'unperturbed' or 'reference' state, which is used to calculate the Stoneley mode solution for a homogeneous and equivalent isotropic reference state in the presence of an equivalent column with a prescribed surface-impedance condition representing the detailed MSIP tool structure. The surface-impedance column radius is the same as the MSIP tool radius. Differences between the actual (or measured) and the reference velocities at several axial wavenumbers constitute the input data to the inversion procedure. The eigensolution associated with the resonance-impedance model is used as the reference solution to calculate the kernels in the perturbation integral that relate fractional changes in the equivalent isotropic shear modulus to fractional changes in the Stoneley velocities at various wavenumbers. The sum of the inverted perturbation and the background profile yields the actual formation property profile. The detailed description below includes an outline of the Backus-Gilbert (B-G) methodology for accurate, and then for inaccurate, data. Next, a perturbation model is briefly described, which yields the 'data kernels' used in applying the B-G technique. Third, cylindrical equations of motion for a fluid and a solid medium are presented. Subsequently, a procedure is described for obtaining the modal dispersion as well as modal amplitude distributions that constitute the eigensolution in the chosen reference state. Fourth, a theoretical validation of the Stoneley Radial Profiling of horizontal shear slowness algorithm using synthetic Stoneley dispersions for a radially homogeneous; radially decreasing; and radially increasing shear slownesses from the borehole surface is presented. Next the results are applied to the measured Stoneley dispersion obtained from known well data. The B-G inversion technique is applied again to the same set of field data assuming an empty borehole. Comparison with the inappropriate empty borehole model in such fast formations may be made to study differences in the radial profiles of horizontal shear slowness obtained in the two cases.

B-G Inverse Theory

Supposing perturbation data of the form:

$$\gamma_i = \frac{\Delta V_i}{V_i} = \int_a^\infty G_i(r) \frac{\Delta \mu(r)}{\mu} r\, dr, \quad (15)$$

for $$i = 1, \ldots, N,$$

where i denotes the axial wavenumber, $G_i(r)$ is known in terms of the eigensolution in the reference state, and $\gamma_i$ denotes the difference between the measured and reference Stoneley slownesses at the selected wavenumber.

It is required to estimate $\Delta \mu(r)/\mu$ assuming that Eq. (15) represents all the information known, except for some estimates of the errors in the $\Delta V_i/V_i$. Although $\Delta \mu(r)/\mu$ cannot be found pointwise, certain spatial averages of it can be found in the form:

$$\int_a^\infty A(r) \frac{\Delta \mu(r)}{\mu} dr, \quad (16)$$

where

-continued $$\int_a^\infty A(r)dr = 1,$$

and A(r) is a linear combination, $$A(r) = \sum_{i=1}^N a_i G_i(r), \quad (17)$$

of the data kernels $G_i(r)$. Backus and Gilbert (1970) suggest that by suitable choice of the coefficients $a=(a_1, \ldots, a_N)^T$ one may concentrate A(r) near any desired point $r_0$ by minimizing the spread:

$$S(r_0, A) = \int_a^\infty (r - r_0)^2 A^2(r) dr \quad (18)$$

In terms of a condition (16) becomes:

$$\sum_{i=1}^N a_i u_i = 1, \quad (19)$$

where $$u_i = \int_a^\infty G_i(r) dr.$$

and the spread becomes:

$$S(r_0, A) = \sum_{i,j} S_{ij}(r_o) a_i a_j, \quad (20)$$

$$S_{ij}(r_0) = \int_a^\infty (r - r_0)^2 G_i(r) G_j(r) dr$$

From (19), (20), this problem is identified as the classical type:

$$\text{minimize} \sum_{i=1}^N S_{ij}(r_0) a_i u_i = 1 \text{ subject to } \sum u_i a_i = 1 \quad (21)$$

or, in matrix notation:

$$\text{minimize } a^T S(r_0) a \text{ subject to } u^T a = 1 \quad (22)$$

Geometrically, as s varies at $a^T S(r_0)a$ represents a family of concentric multidimensional ellipsoids, and $u^T a=1$ a hyperplane in the space of vectors a. The solution, obtained from $S(r_0)a=\lambda u$, and $u^T a=1$ where $\lambda$ is a LaGrange multiplier, is:

$$a = a(r_0) = \frac{1}{u^T S^{-1}(r_0) u} S^{-1}(r_0) u \quad (23)$$

The spread $s_{min}(r_0)$ at $a(r_0)$ is given by:

$$s_{min}(r_0) = a(r_0)^T S(r_0) a(r_0) = (u^T S^{-1}(r_0) u)^{-1} \quad (24)$$

and $s_{min}(r_0)$ can be shown to be a true minimum. Finally, again writing $\gamma$ for the vector $(\Delta V_1/V_1, \ldots, \Delta V_N/V_N)^T$, one arrives at:

$$a(r_0) = \frac{u^T S^{-1}(r_0) \gamma}{u^T S^{-1}(r_0) u} \quad (25)$$

This is the average value of $\Delta\mu/\mu$ which is most localized around $r_0$. Notice that from (20) and (23) $a(r_0)$ and $s_{min}(r_0)$ are independent of $\Delta V_i/V_i$.

For inaccurate data, assume that the data $$\gamma_i = \frac{\Delta V_i}{V_i}$$

is subject to errors $\Delta\gamma_i$, that mean values $\bar\gamma_i$ of the $\gamma_i$ are the true values, and that:

$$\gamma_i = \bar\gamma_i + \Delta\gamma_i, \overline{\Delta\gamma_i} = 0 \; i=1, \ldots, N \quad (26)$$

Assuming that after some analysis of the data, the covariance matrix E of the $\Delta\gamma_i$ is known:

$$E_{ij} = \overline{\Delta\gamma_i \Delta\gamma_j} i, j=1, \ldots, N \quad (27)$$

From (25), $a(r_0)$ is linear in the $\gamma_i$. Therefore:

$$\overline{a(r_0)} = \frac{u^T S^{-1}(r_0) \bar\gamma}{u^T S^{-1}(r_0) u} = a^T(r_0) \bar\gamma \quad (28)$$

Upon writing:

$$a(r_0) - \overline{a(r_0)} = \Delta a(r_0), \quad (29)$$

e is defined by:

$$e = \overline{[\Delta a(r_0)]^2} = a^T(r_0) E a(r_0) \quad (30)$$

which may be interpreted as a measure of the error committed in estimating $a(r_0)$ from the $\gamma_i$. If s is minimized, e may be unacceptably large, and if e is minimized, s may be unacceptably large. Backus and Gilbert show that there is a trade-off between e and s, and that this leads to the problem of minimizing:

$$a^T E a + \alpha a^T S a, \text{ with } u^T a = 1, \quad (31)$$

where $\alpha$ is another Lagrange multiplier. If $\alpha$ is regarded as a parameter, this is a problem of the kind already solved with $S(r_0)$ replaced by $E+\alpha S(r_0)$. Thus defining:

$$W(\alpha, r_0) = E + \alpha S(r_0), \quad (32)$$

the e versus s trade-off parametrized by $\alpha$ is:

$$a(\alpha, r_0) = \frac{W(\alpha, r_0)^{-1} u}{u^T W(\alpha, r_0)^{-1} u} \quad (33)$$

$$s(\alpha, r_0) = a^T(\alpha, r_0) S(r_0) a(\alpha, r_0),$$

$$e(\alpha, r_0) = a^T(\alpha, r_0) E a(\alpha, r_0),$$

Perturbation Equations for Normal Modes

Turning next to the problem of finding the $G_t$ for a system comprising a fluid-filled right-circular cylindrical borehole within an isotropic elastic half-space, according to one aspect of the invention, Sinha (Sinha, B., *Sensitivity and Inversion of Borehole Flexural Dispersions for Formation Parameters*, GEOPHYSICAL JOURNAL INTERNATIONAL, Vol. 128, pp. 84-96 (1997)) may be followed using normal mode theory in combination with Hamilton's principle to obtain the necessary perturbation equations. Let x be the position vector and t the time. In addition, let the z axis run along the axis of the borehole. The other two coordinates will be either Cartesian x, y or cylindrical r, ϕ orthogonal to z. The mass densities of the solid and of the fluid are denoted by $\rho$ and $\rho_f$, respectively, and the Lamé parameters of the solid by $\lambda$ and $\mu$, and the bulk modulus of the fluid by $\kappa$. In general let $\mu_k$, k=1, ..., K denote any of the elastic constants. Let the displacement and velocity fields u and v belong to a normal mode of vibration and have the forms:

$$u = \hat{u}(\mu, \omega; x) \sin[\omega(t-t_0)],$$

$$v = \hat{v}(\mu, \omega; x) \cos[\omega(t-t_0)]. \quad (34)$$

The kinetic energy $\tau$ may be expressed as:

$$\tau = 2 \int_D T dx \sin^2[\omega(t-t_0)], \quad (35)$$

$$= \int_D \frac{1}{2} \omega^2 \rho |\hat{u}|^2 dx \sin^2[\omega(t-t_0)],$$

and the potential (strain) energy $\upsilon$ as:

$$\upsilon = 2 \int_D V dx \cos^2[\omega(t-t_0)], \quad (36)$$

where $\tau$ and $\upsilon$ are the kinetic- and strain-energy densities, respectively, time averaged over a period. (The functions $\sin^2$ and $\cos^2$ average to ½ over each quarter period.) The Lagrangian £ is defined to be $\tau-\upsilon$, and the corresponding density L=$\tau-\upsilon$. Then Hamilton's principle states that $$\int_{t_1}^{t_2} \pounds \, dt$$

is stationary for variations of the displacement field, which leave the initial (t=$t_1$) and final (t=$t_2$) states unperturbed. This leads to:

$$\frac{\Delta T}{\Delta u} - \frac{\Delta V}{\Delta u} = 0 \quad (37)$$

in the absence of any surface integrals that vanish in view of the boundary conditions imposed on the eigensolution in the reference (or unperturbed) state. On the other hand, the theory of normal modes implies that:

$$\frac{1}{P} \int_0^P \pounds \, dt = 0 \quad (38)$$

where P is a period. This leads to:

$$\int_D T dx = \int_D V dx. \quad (39)$$

But T depends explicitly on $\omega$ and $\rho$ only through the factor $\omega^2 \rho$, and V is a sum of terms $V_k$, where $V_k$ depends upon $\mu_k$ only through the factor $\mu_k$. It follows, by varying the quantities $\omega$, $\rho$, the $\mu_k$, and u in Eq. (39) so that u always remains a normal mode with frequency $\omega$, that:

$$\int_D \left( \frac{2\Delta\omega}{\omega} + \frac{\Delta\rho}{\rho} \right) T + \frac{\Delta T}{\Delta u} \Delta u \, dx = \sum_{k=1}^K \int_D \frac{\Delta\mu_k}{\mu_k} V_k + \frac{\Delta V}{\Delta u} \Delta u \, dx \quad (40)$$

But on using (37), (38), and the fact that $\omega$ is independent of x, we see that:

$$\frac{\Delta\omega}{\omega} = \frac{-\int_D \frac{\Delta\rho}{\rho} T dx + \sum_{k=1}^K \int_D \frac{\Delta u_k}{u_k} V_k dx}{2 \int_D T dx} \quad (41)$$

For the problem at hand, and guided by the Sinha-Kostek-Norris (Sinha et al., *Stoneley and flexural modes in pressurized boreholes*, J. GEOPHYS.RES., Vol. 100, pp. 22,375-22,381, (1995)) alteration model known to those of skill in the art having the benefit of this disclosure, only the shear modulus $\mu$ is perturbed away from its background uniform value. The unperturbed solution is the Stoneley mode of wave propagation guided by the borehole. Then:

$$\frac{\Delta\omega}{\omega} = \frac{I_\mu}{2 I_0} \quad (42)$$

$\Delta$
where $$I_\mu = \int_D \frac{\Delta\mu}{\mu} V_\mu dx, \quad I_0 = \int_D T dx \quad (43)$$

with

-continued $$V_\mu = \frac{1}{2}\mu(e_{r\theta}e_{r\theta}^* + e_{\theta z}e_{\theta z}^* + e_{zr}e_{zr}^*) + \tag{44}$$

$$\frac{1}{3}\mu[(e_{zz} - e_{rr})(e_{zz}^* - e_{rr}^*) + (e_{rr} - e_{\theta\theta})(e_{rr}^* - e_{\theta\theta}^*) +$$

$$(e_{\theta\theta} - e_{zz})(e_{\theta\theta}^* - e_{zz}^*)],$$

$$T = \frac{1}{2}\omega^2\rho(u_r r_r^* + u_\theta u_\theta^* + u_z u_z^*)$$

At a given wavenumber $k_i$, $$\frac{\Delta\omega_i}{\omega_i} = \frac{\Delta V_i}{V_i} = \int_a^{\infty} G_i(r)\frac{\Delta\mu(r)}{\mu(r)}r\,dr, \quad \text{for } i = 1, \ldots, N, \tag{45}$$

where $\tag{46}$ $$G_i(r) = \frac{N_i(r)}{D_i},$$

$$N_i(r) = \frac{1}{2}\mu(e_{r\theta}e_{r\theta}^* + e_{\theta z}e_{\theta z}^* + e_{zr}e_{zr}^*) + \tag{47}$$

$$\frac{1}{3}\mu\{(e_{zz} - e_{rr})(e_{zz}^* - e_{rr}^*) + (e_{rr} - e_{\theta\theta})(e_{rr}^* - e_{\theta\theta}^*)\}$$

$$D_i = \omega^2\left[\int_0^a \rho_f(u_r^f u_r^{f*} + u_z^f u_z^{f*})r\,dr\right] + \tag{48}$$

$$\omega^2\left[\int_a^{\infty} \rho_b(u_r u_r^* + u_\theta u_\theta^* + u_z u_z^*)r\,dr\right],$$

where $\rho_b$ and $\rho_f$ are the formation and borehole liquid mass densities, respectively. $u_r^f$ and $u_z^f$ are the displacement components in the borehole liquid, and $u_r$, $u_\theta$, and $u_z$ are the corresponding displacement components in the formation. These displacement components are obtained from the eigensolution of the Stoneley mode at a given wavenumber. Note that, $u_{74}=0$, for the axi-symmetric borehole Stoneley mode. These displacement components are then used to compute all the dynamic strains $e_{rr}$, $e_{\theta\theta}$, and $e_{zz}$, that appear in Eq. (47).

Next the following integrals are defined, which are needed in Eq. (20) for defining the spread function $S_{ij}(r_0)$:

$$S_{ij}^1 = \int_a^{\infty} r^2 G_i(r)G_j(r)\,dr, \tag{49}$$

$$S_{ij}^2 = \int_a^{\infty} r^2 G_i(r)G_j(r)\,dr,$$

$$S_{ij}^3 = \int_a^{\infty} G_i(r)G_j(r)\,dr.$$

where $i,j=1, 2, \ldots N$, and N is the number of wavenumber points on the measured dispersion.

The quantities $u_i$ (as defined in Eq. (19)), $S_{ij}^1$, $S_{ij}^2$, and $S_{ij}^3$ (as defined in Eq. (49)) are computed in the fortran code together with the borehole Stoneley dispersion in the chosen reference state.

Equations of Motion for a Resonance-Impedance Model

Below is a brief review of the equations of motion for a cylindrical structure, which are the building blocks of the resonance-impedance model for the acoustic tool in an openhole. Subsequently, the results are specialized for the lowest axi-symmetric Stoneley mode.

Figure 14:
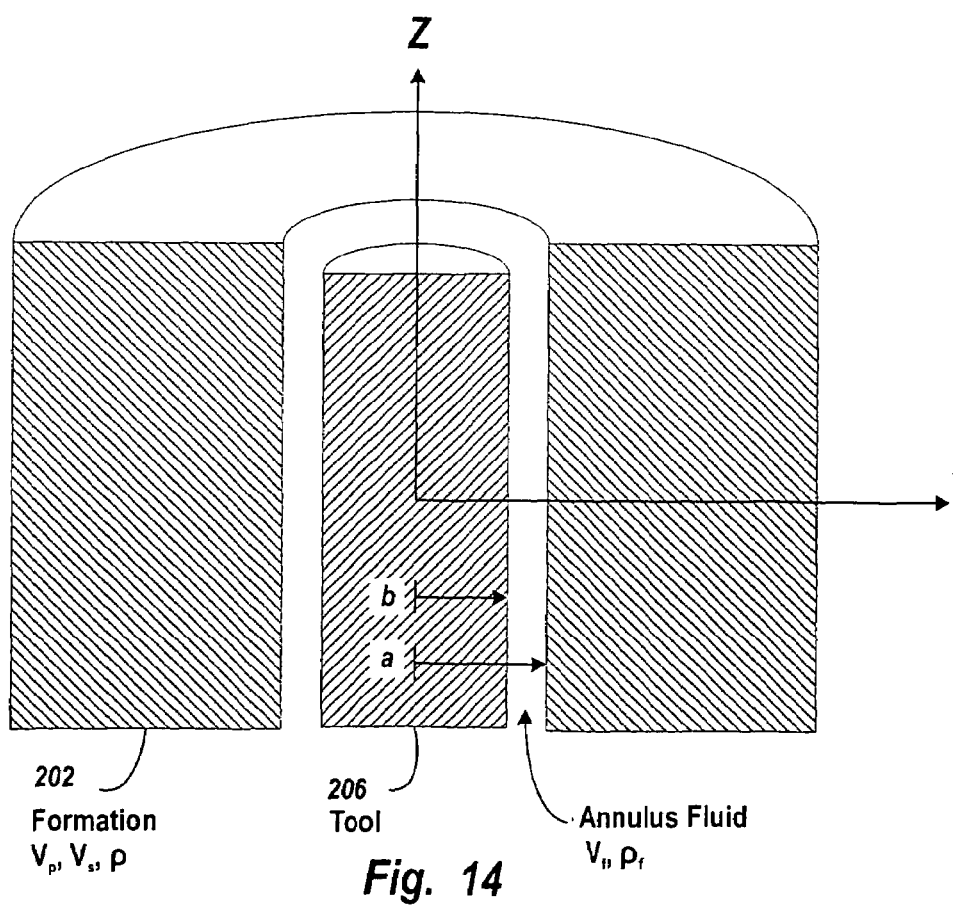
FIG. 14 is a schematic diagram of a Resonance-Impedance Model (RIM) of an acoustic tool for simulating Stoneley waves in a fluid-filled borehole of radius a according to principles of the present invention.

When referring to the coordinate system shown in FIG. 14, the equations of motion for harmonic waves in cylindrical structures may be given by:

$$\rho\ddot{u}_r = \frac{\partial\tau_{rr}}{\partial r} + \frac{1}{r}\frac{\partial\tau_{r\theta}}{\partial\theta} + \frac{\partial\tau_{rz}}{\partial z} + \frac{\partial\tau_{rr}}{\partial r} + \frac{\tau_{rr} - \tau_{\theta\theta}}{r}, \tag{50}$$

$$\rho\ddot{u}_\theta = \frac{1}{r}\frac{\partial\tau_{\theta\theta}}{\partial\theta} + \frac{\partial\tau_{z\theta}}{\partial z} + \frac{\partial\tau_{r\theta}}{\partial r} + 2\frac{\tau_{r\theta}}{r},$$

$$\rho\ddot{u}_z = \frac{\partial\tau_{rz}}{\partial r} + \frac{1}{r}\frac{\partial\tau_{z\theta}}{\partial\theta} + \frac{\partial\tau_{zz}}{\partial z} + \frac{\tau_{rz}}{r},$$

where $\tau_{rr}$, $\tau_{\theta\theta}$, $\tau_{zz}$, $\tau_{rz}$, $\tau_{r\theta}$, and $\tau_{z\theta}$ are the stress components $u_r$, $u_\theta$ and $u_z$ are the displacement components and $\rho$ is the mass density of the material of the cylindrical structure at hand.

The constitutive relations for a homogeneous, elastic and isotropic material are:

$$T_{rr} = \lambda\Delta + 2\mu\epsilon_{rr}, \quad T_{\theta\theta} = \lambda\Delta + 2\mu\epsilon_{\theta\theta},$$

$$T_{zz} = \lambda\Delta + 2\mu\epsilon_{zz}, \quad T_{r\theta} = 2\mu\epsilon_{r\theta},$$

$$T_{z\theta} = 2\mu\epsilon_{z\theta}, \quad T_{rz} = 2\mu\epsilon_{rz}, \tag{51}$$

where $\Delta = \partial u_r/\partial r + u_r/r + (1/r)\partial u_\theta/\partial\theta + \partial u_z/\partial z$; $\epsilon_{rr}$, $\epsilon_{\theta\theta}$, $\epsilon_{r\theta}$, $\epsilon_{z\theta}$ and $\epsilon_{rz}$ are the strain components, and $\lambda$ and $\mu$ are the Lamé constants for the material of the cylindrical structure at hand.

The strain-displacement relations in cylindrical coordinates take the form:

$$\varepsilon_{rr} = \frac{\partial u_r}{\partial r}, \quad \varepsilon_{\theta\theta} = \frac{1}{r}\frac{\partial u_\theta}{\partial\theta} + \frac{u_r}{r} \tag{52}$$

$$\varepsilon_{zz} = \frac{\partial u_z}{\partial z}, \quad \varepsilon_{r\theta} = \frac{1}{2}\left[\frac{1}{r}\frac{\partial u_r}{\partial\theta} + \frac{\partial u_\theta}{\partial r} + \frac{u_\theta}{r}\right],$$

$$\varepsilon_{z\theta} = \frac{1}{2}\left[\frac{1}{r}\frac{\partial u_z}{\partial\theta} + \frac{\partial u_\theta}{\partial z}\right], \quad \varepsilon_{rz} = \frac{1}{2}\left[\frac{\partial u_z}{\partial r} + \frac{\partial u_r}{\partial r}\right],$$

An eigensolution to any linear elastodynamic problem can be expressed in terms of a scalar potential $\phi$ and a vector potential H $$u = \nabla\phi + \nabla\times H, \tag{53}$$

where $\nabla\cdot H$ is arbitrary, and $$V_1^2\nabla^2\phi = -\omega^2\phi,$$

$$V_2^2\nabla^2 H = -\omega^2 H. \tag{54}$$

The displacement components in cylindrical coordinates can be expressed in terms of these scalar and vector potentials:

$$u_r = \frac{\partial\phi}{\partial r} + \frac{1}{r}\frac{\partial H_z}{\partial\theta} - \frac{\partial H_\theta}{\partial z} \tag{55}$$

$$u_\theta = \frac{1}{r}\frac{\partial\phi}{\partial\phi} + \frac{\partial H_r}{\partial z} - \frac{\partial H_z}{\partial z}$$

$$u_z = \frac{\partial\phi}{\partial z} + \frac{\partial H_\phi}{\partial r} + \frac{H_\theta}{r} - \frac{1}{r}\frac{\partial H_r}{\partial\theta}$$

Substituting these displacement components into the constitutive relations and the stress equations of motion, we can write Eq. (55) in the following form in terms of the scalar potential $\phi$ and the three components of vector potential H:

$$-\frac{\omega^2}{V_1^2}\phi = \frac{\partial^2 \phi}{\partial r^2} + \frac{1}{r}\frac{\partial \phi}{\partial r} + \frac{1}{r^2}\frac{\partial^2 \phi}{\partial \theta^2} + \frac{\partial^2 \phi}{\partial z^2}, \quad (56)$$

$$-\frac{\omega^2}{V_2^2}H_r = \frac{\partial^2 H_r}{\partial r^2} + \frac{1}{r}\frac{\partial H_r}{\partial r} +$$
$$\frac{1}{r^2}\left(\frac{\partial^2 H_r}{\partial \theta^2} - 2\frac{\partial H_\theta}{\partial \theta} - H_r\right) + \frac{\partial^2 H_r}{\partial z^2},$$

$$-\frac{\omega^2}{V_2^2}H_\theta = \frac{\partial^2 H_\theta}{\partial r^2} + \frac{1}{r}\frac{\partial H_\theta}{\partial r} +$$
$$\frac{1}{r^2}\left(\frac{\partial^2 H_\theta}{\partial \theta^2} + 2\frac{\partial H_r}{\partial \theta} - H_\theta\right) + \frac{\partial^2 H_\theta}{\partial z^2},$$

$$-\frac{\omega^2}{V_2^2}H_z = \frac{\partial^2 H_z}{\partial r^2} + \frac{1}{r}\frac{\partial H_z}{\partial r} + \frac{1}{r^2}\frac{\partial^2 H_z}{\partial \theta^2} + \frac{\partial^2 H_z}{\partial z^2}.$$

A solution of Eq. (56) may be written in the form:

$$\phi = f(r)\cos n\theta e^{i\zeta z},$$
$$H_r = h_r(r)\sin n\theta e^{i\zeta z},$$
$$H_\theta = h_\theta(r)\cos n\theta e^{i\zeta z},$$
$$H_z = h_z(r)\sin n\theta e^{i\zeta z}, \quad (57)$$

which satisfied Eq. (56) provided:

$$\frac{\partial^2 f}{\partial r^2} + \frac{1}{r}\frac{\partial f}{\partial r} + \left(a^2 - \frac{n^2}{r^2}\right)f = 0, \quad (58)$$

$$\frac{\partial^2 h_z}{\partial r^2} + \frac{1}{r}\frac{\partial h_z}{\partial r} + \left(\beta^2 - \frac{n^2}{r^2}\right)h_z = 0, \quad (59)$$

$$\frac{\partial^2 h_r}{\partial r^2} + \frac{1}{r}\frac{\partial h_r}{\partial r} + \frac{1}{r^2}(-n^2 h_r + 2nh_\phi - h_r) + \beta^2 h_r = 0, \quad (60)$$

$$\frac{\partial^2 h_\theta}{\partial r^2} + \frac{1}{r}\frac{\partial h_\theta}{\partial r} + \frac{1}{r^2}(-n^2 h_\theta + 2nh_r - h_\theta) + \beta^2 h_\theta = 0, \quad (60)$$

where $$a^2 = \frac{\omega^2}{V_1^2} - \zeta^2, \beta^2 = \frac{\omega^2}{V_2^2} - \zeta^2. \quad (62)$$

where $V_1$ and $V_2$ are the compressional and shear wave velocities, respectively. Subtracting and adding Eqs. (60) and (61) we obtain:

$$\frac{\partial^2 h_1}{\partial r^2} + \frac{1}{r}\frac{\partial h_1}{\partial r} + \left(\beta^2 - \frac{(n+1)^2}{r^2}\right)h_1 = 0, \quad (63)$$

$$\frac{\partial^2 h_2}{\partial r^2} + \frac{1}{r}\frac{\partial h_2}{\partial r} + \left(\beta^2 - \frac{(n+1)^2}{r^2}\right)h_2 = 0,$$

where:

$$2h_1 = h_r - h_\theta, \quad 2h_2 = h_r + h_\theta. \quad (64)$$

Solutions to Eqs. (58), (59), (63), and (64), respectively, may be written in the form:

$$f = AJ_n(ar) + BY_n(ar), \quad (65)$$

and $$h_z = h_3 = A_3 J_n(\beta r) + B_3 Y_n(\beta r), \quad (66)$$

$$2h_1 = h_r - h_\theta = 2A_1 J_{n+1}(\beta r) + 2B_1 Y_{n+1}(\beta r), \quad (67)$$

$$2h_2 = h_r + h_\theta = 2A_2 J_{n-1}(\beta r) + 2B_2 Y_{n-1}(\beta r), \quad (68)$$

where $J_n$ and $Y_n$ are nth order Bessel functions of the first and second kind. Since $\nabla \cdot H$ is arbitrary, one of the $h_i$ can be eliminated. Following Gazis (known to those of skill in the art having the benefit of this disclosure in "*Three-dimensional investigation of the propagation of waves in hollow circular cylinders, I. Analytical foundation, and II. Numerical Results,*" J. Acoust. Soc. Am., vol. 31, pp. 568-577, 1959), setting $h_2 = 0$, and from Eqs. (67) and (68), we have:

$$h_r = h_1, h_\theta = -h_1. \quad (69)$$

The solution for the displacement components can now be written:

$$u_r = \left(\frac{\partial f}{\partial r} + \frac{n}{r}h_3 + i\zeta h_1\right)\cos n\theta e^{i\zeta z}, \quad (70)$$

$$u_\theta = \left(\frac{-n}{r}f + i\zeta h_1 - \frac{\partial h_3}{\partial r}\right)\sin n\theta e^{i\zeta z},$$

$$u_z = \left(i\zeta f - \frac{\partial h_1}{\partial r} - (n+1)\frac{h_1}{r}\right)\cos n\theta e^{i\zeta z}.$$

Substitution of Eqs. (65)-(69) into (70) yields the following expressions for the displacement components in the mth cylindrical layer that can be employed to satisfy the appropriate boundary conditions:

$$u_r = \left[\left\{\frac{n}{r}J_n(\alpha_{(m)}r) - \alpha_{(m)}J_{n+1}(\alpha_{(m)}r)\right\}A^{(m)} + \right. \quad (71)$$
$$\left\{\frac{n}{r}Y_n(\alpha_{(m)}r) - \alpha_{(m)}Y_{n+1}(\alpha_{(m)}r)\right\}B^{(m)} +$$
$$i\zeta J_{n+1}(\beta_{(m)}r)A_1^{(m)} + i\zeta Y_{n+1}(\beta_{(m)}r)B_1^{(m)} +$$
$$\left.\frac{n}{r}J_n(\beta_{(m)}r)A_3^{(m)} + \frac{n}{r}Y_n(B_{(m)}r)B_1^{(m)}\right]\cos n\theta e^{i(wt+\zeta z)},$$

$$u_\theta = \left[-\frac{n}{r}J_n(a_{(m)}r)\right]A^{(m)} + \left[-\frac{n}{r}Y_n(a_{(m)}r)\right]B^{(m)} + \quad (72)$$
$$[i\zeta J_{n+1}(\beta_{(m)}r)]A_1^{(m)} + [i\zeta Y_{n+1}(\beta_{(m)}r)]B_1^{(m)} +$$
$$\left\{-\frac{n}{r}J_n(\beta_{(m)}r) + \beta_{(m)}J_{n+1}(B_{(m)}r)\right\}A_3^{(m)} +$$
$$\left\{-\frac{n}{r}Y_n(\beta_{(m)}r) + \beta Y_{n+1}(B_{(m)}r)\right\}B_3^{(m)}\right]\cos n\theta e^{i(tw+\zeta z)}$$

$$u_z = [\{i\zeta J_n(a_{(m)}r)\}A^{(m)} + \{i\zeta Y_n(a_{(m)}r)\}B^{(m)} - \quad (73)$$
$$[\beta_{(m)}J_{(n)}(\beta_{(m)}r)]A_1^{(m)} - \{\beta_{(m)}Y_n(\beta_{(m)}r)\}B_1^{(m)}]\cos n\theta e^{i(wt+\zeta z)}$$

where the index m denotes the mth cylindrical layer parameter and:

$$a_{(m)}^2 = \frac{\omega^2}{V_{1(m)}^2} - \zeta^2, \beta_{(m)}^2 = \frac{\omega^2}{V_{2(m)}^2} - \zeta^2, \quad (74)$$

with $V_{1(m)}$ and $V_{2(m)}$ the compressional and shear wave velocities for the mth cylindrical layer.

At this point, it should be noted that the solution given by Eqs. (71)-(73) is valid for a solid annulus. The corresponding solution for a solid rod is simply obtained by discarding the terms containing $Y_n(\alpha r)$ or $Y_n(\beta r)$ which diverge as $r \to 0$. On the other hand, the wave solution in a solid formation of infinite radial extent takes the form:

$$u_r = \left[\left\{\frac{n}{r}H_n(\alpha r) - \alpha H_{n+1}(\alpha r)\right\}A^{(m)} + [i\zeta H_{n+1}(\beta r)]A_1^{(m)} + \left[\frac{n}{r}H_n(\beta r)\right]A_3^{(m)}\right]\cos n\theta\, e^{i(wt+\zeta z)} \quad (75)$$

$$u_\theta = \left[\left\{-\frac{n}{r}H_n(\alpha r)\right\}A^m + [i\zeta H_{n+1}(\beta r)]A_1^{(m)} + \left[-\frac{n}{r}H_n(\beta r) + \beta H_{n+1}(\beta r)\right]A_3^{(m)}\right]\sin n\theta\, e^{i(wt+\zeta z)}, \quad (76)$$

$$u_z = [\{i\zeta H_n(\alpha r)\}A^{(m)} - \{\beta H_n(\beta r)\}A_1^{(m)}]\cos n\theta\, e^{i(wt+\zeta z)}, \quad (77)$$

where $H_n(x)$ is the outgoing Hankel functions of the second kind consistent with the exp(iωt) given by:

$$H_n(x) = J_n(x) - iY_n(x). \quad (78)$$

The corresponding displacement components in an inviscid fluid take the reduced form:

$$u_r^f = \left\{\left[\frac{n}{r}J_n(\alpha^f r) - \alpha^f J_{n+1}(\alpha^f r)\right]A^{(m)} + \left[\frac{n}{r}Y_n(\alpha^f r) - \alpha^f Y_{n+1}(\alpha^f r)\right]\beta^{(m)}\right\} \times \cos n\theta\, e^{i(wt+\zeta z)}, \quad (79)$$

$$u_\theta^f = \left\{-\frac{n}{r}[J_n(\alpha^f r)A^{(m)} + Y_n(\alpha^f r)\beta^{(m)}]\right\}\sin n\theta\, e^{i(wt+\zeta z)}, \quad (80)$$

$$u_z^f = i\xi[J_n(\alpha^f r)A^{(m)} + Y_n(\alpha^f r)\beta^{(m)}]\cos n\theta\, e^{i(wt+\zeta z)} \quad (81)$$

where:

$$\alpha^f = \frac{\omega^2}{V_f^2} - \zeta^2, \quad (82)$$

$V_f$ the compressional wave velocity in the fluid, and the superscript "f" refers the quantity to the fluid medium.

Note that the solution given by Eqs. (74)-(81) is valid for a liquid annulus between the rigid column of radius b, and borehole surface at r=a. The surface-impedance condition at r=b can be expressed as:

$$\frac{u_r^f}{\tau_{rr}^f} = \frac{b}{2}\mathrm{real}(C_{tool}), \quad (83)$$

where the frequency-dependent tool compressibility $C_{tool}$ is given by:

$$C_{tool} = C\left[1 + \left(1 - \frac{1}{C_{inf}}\right)\frac{\omega_o^2}{\omega^2 - \omega_o^2 + 2i\omega\gamma}\right], \quad (84)$$

and the acoustic tool parameters C, $C_{inf}$, $\omega_o$, and $\gamma$ determined from a calibration experiment are given by:

$$C = 1.1 \times 10^{-10}, (1/Pa), \quad (85)$$

$$C_{inf} = 0.315, \quad (86)$$

$$\omega_o = 2\pi \times 960 \,(\mathrm{radians/sec}), \quad (87)$$

$$\gamma = 2990, (\mathrm{radians/sec}) \quad (88)$$

and ω is the wave frequency in (radians/sec). Note that $C_{inf}$ and C are defined by $$C_{inf} = \frac{C_\infty}{C_o} \quad (89)$$

$$C = C_\infty \quad (90)$$

(see Eq. (85))

where $C_\infty$ and $C_o$ denote the tool compressibility in the high and low frequency limits, respectively.

The acoustic wave solution for a liquid column is obtained by discarding the terms containing $Y_{0,1}(\alpha^f r)$ which diverge as r→0, Eqs. (79)-(81). On the other hand, the wave solution in a fluid medium of infinite radial extent takes the form:

$$u_r^f = \alpha^f H_{n+1}(\alpha^f r)D_1^{(m)}\cos n\theta\, e^{i(wt+\zeta z)}, \quad (91)$$

$$u_\theta^f = \left\{-\alpha^f H_{n+1}(\alpha^f r) + \frac{n}{r}H_n(\alpha^f r)\right\}D_1^{(m)}\sin n\theta\, e^{i(wt+\zeta z)}, \quad (92)$$

$$u_z^f = i\zeta H_n(\alpha^f r)D_1^{(m)}\cos n\theta\, e^{i(wt+\zeta z)}, \quad (93)$$

The classical boundary conditions at a fluid-solid interface are given by:

$$[T_{rr}^{(1)}, T_{r\theta}^{(1)}, T_{rz}^{(1)}, u_r^{(1)}]_{r=a} = [T_{rr}^{(2)}, T_{r\theta}^{(2)}, T_{rz}^{(2)}, u_r^{(2)}]_{r=a}, \quad (94)$$

where the superscripts 1 and 2 refer to the media on either side of the surface of discontinuity r=a. However, it should be noted that the shear stress $\tau_{rz}^{(1)}$ and $\tau_{r\theta}^{(1)}$ in an inviscid fluid are identically equal to zero. At a solid-solid interface, the continuity conditions are:

$$[T_{rr}^{(1)}, T_{r\theta}^{(1)}, T_{rz}^{(1)}, u_r^{(1)}, u_\theta^{(1)}, u_z^{(1)}]_{r=a} = [T_{rr}^{(2)}, T_{r\theta}^{(2)}, T_{rz}^{(2)}, u_r^{(2)}, u_\theta^{(2)}, u_z^{(2)}]_{r=a} \quad (95)$$

whereas the normal stress components are set equal to zero at traction-free surfaces. The unknown amplitudes associated with different cylindrical layers are determined by satisfying the boundary conditions at the relevant interfaces.

The solution to a cylindrically layered system can be obtained by satisfying appropriate boundary conditions at all the liquid-liquid, liquid-solid or solid-solid interfaces. These conditions can be expressed in terms of a matrix equation LC=0, where the vector c denotes the unknown amplitude coefficients. For nontrivial solutions of this matrix equation, we require that the determinant of coefficient matrix L be zero. The Appendix illustrates how these boundary conditions lead to the matrix equation for the case of a surface impedance condition prescribed at the tool radius b, placed in a fluid-filled borehole of radius a surrounded by an infinite formation. The surface-impedance condition at r=b, is given by:

$$\left[\frac{u_r^f}{T_{rr}^f}\right]_{r=b+} = \frac{b}{2} \, \text{real} \, (C_{tool}), \quad (96)$$

and the other three boundary conditions at r=a are:

$$[T_{rr}^{(1)}, T_{rz}^{(1)}, u_r^{(1)}]_{r=a-} = [T_{rr}^{(2)}, T_{rz}^{(2)}, u_r^{(2)}]_{r=a+} \quad (97)$$

These results have been specialized for the lowest axi-symmetric Stoneley mode (n=0) in the presence of a and acoustic tool (e.g. MSIP tool) with a complex surface-impedance condition at the tool radius b in a borehole of radius a.

Theoretical Validation

A newly developed semi-analytical method based on a standard spectral integration technique has been used to generate synthetic waveforms using the Resonance-Impedance Model (RIM) of the an acoustic tool (e.g. MSIP). Synthetic waveforms at an array of receivers have been processed by the Ekstrom's modified matrix pencil algorithm to isolate both the dispersive and nondispersive arrivals for three cases: (a) radially homogeneous; (b) radially decreasing; and (c) radially increasing compressional and shear slownesses away from the borehole surface. Synthetic Stoneley dispersions have been used as input to the SRP algorithm and the inverted profiles have been compared with the input profiles.

FIG. 14 is a schematic of a column of radius b with an appropriate surface-impedance condition that constitute the resonance-impedance model of the acoustic tool. The annulus of thickness (a–b) is filled with the borehole mud. The resonance-impedance model with the calibrated parameters yield approximately the same amount of tool bias in the Stoneley dispersion as that predicted by the 3D finite-difference simulation of the detailed tool structure (MSIP) in both fast and slow formations. A fast or slow formation refers to the formation shear wave speed being faster or slower than the compressional wave speed in the borehole fluid.

TABLE Ia

| Radially increasing velocities | | | |
|---|---|---|---|
| Radial coordinate cm | $V_p$ m/s | $V_s$ m/s | ρ kg/m³ |
| 4.6 to 10 | 1500 | 0 | 1000 |
| 10 to 13 | 2040 | 1020 | 2000 |
| 13 to 16 | 2100 | 1050 | 2000 |
| 16 to 19 | 2160 | 1080 | 2000 |
| 19 to 22 | 2220 | 1110 | 2000 |
| 22 to 25 | 2280 | 1140 | 2000 |
| 25 to 28 | 2340 | 1170 | 2000 |
| 28 to infinity | 2400 | 1200 | 2000 |

TABLE Ib

| Radially decreasing velocities | | | |
|---|---|---|---|
| Radial coordinate cm | $V_p$ m/s | $V_s$ m/s | ρ kg/m³ |
| 4.6 to 10 | 1500 | 0 | 1000 |
| 10 to 13 | 2760 | 1380 | 2000 |
| 13 to 16 | 2700 | 1350 | 2000 |
| 16 to 19 | 2640 | 1320 | 2000 |
| 19 to 22 | 2580 | 1290 | 2000 |
| 22 to 25 | 2520 | 1260 | 2000 |
| 25 to 28 | 2460 | 1230 | 2000 |
| 28 to infinity | 2400 | 1200 | 2000 |

TABLE Ib-continued (header shown above combined into TABLE Ib)

Table Ia and Ib, respectively, contain a summary of the material constants of the six annuli chosen to represent the altered zone surrounding the borehole with radially increasing and decreasing compressional and shear velocities away from the borehole.

The borehole fluid is water with the compressional velocity $V_f$=1500 m/s, and mass density $\rho_f$=1000 kg/m³. Results for a homogeneous formation are obtained assuming that the compressional velocity $V_p$=2400 m/s, and shear velocity $V_s$=1200 m/s for radial position r=10 cm to infinity. However, note that the surface-impedance condition is prescribed at radius=4.6 cm.

In addition, we compare radial depths of investigation of data kernel $G_i$ at various frequencies of borehole Stoneley modes using the Resonance-Impedance Model with those for an empty borehole. The data kernel $G_i$ is a measure of the sensitivity of borehole Stoneley dispersions to changes in the formation horizontal shear modulus at various radial positions.

Figure 15B:
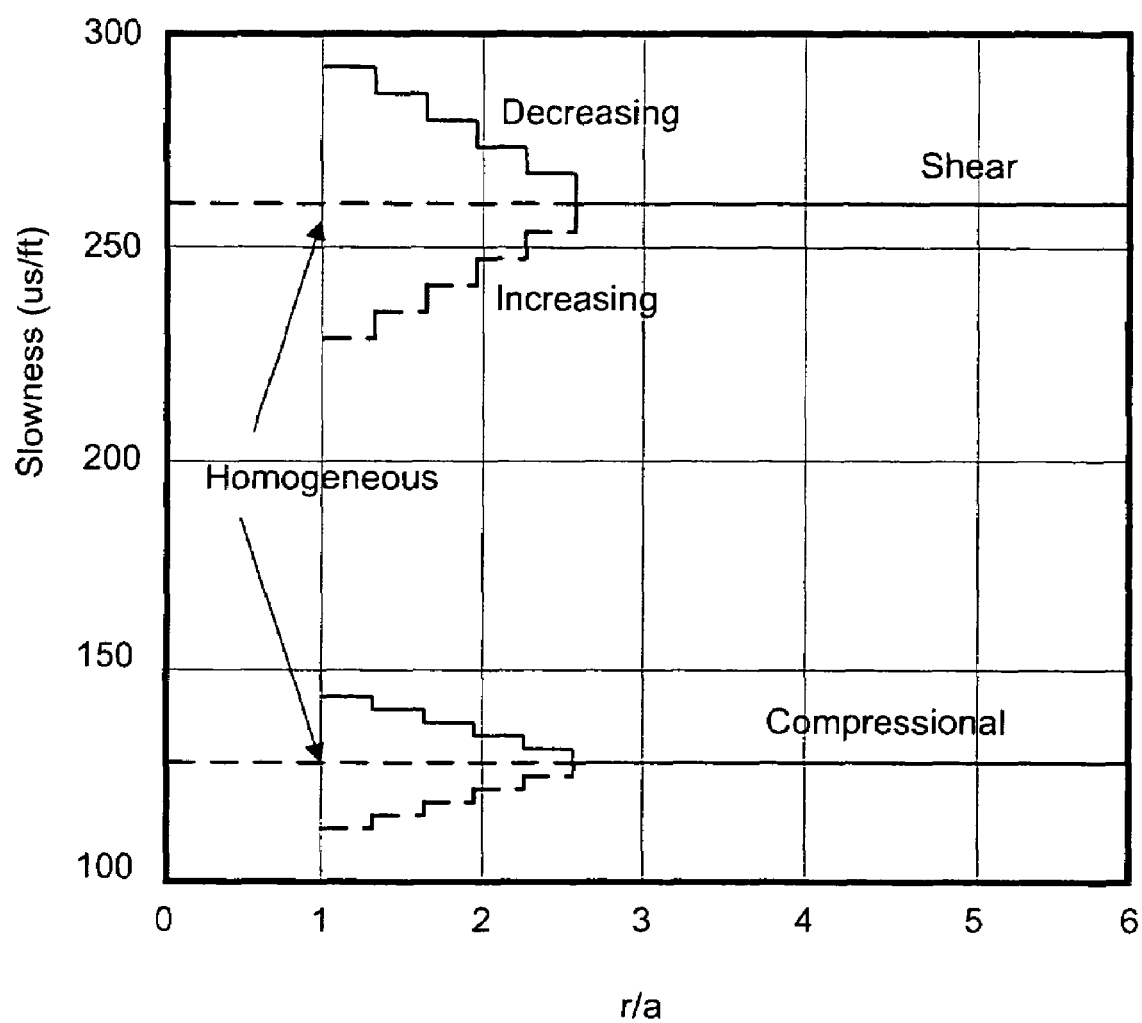

FIG. 15a is a schematic diagram of a borehole of radius a with an altered annulus of thickness (b–a) that exhibits increasing velocity away from the borehole surface. FIG. 15b displays both increasing and decreasing compressional and shear slowness profiles used in generating the synthetic data for testing the SRP algorithm.

Figure 16A:
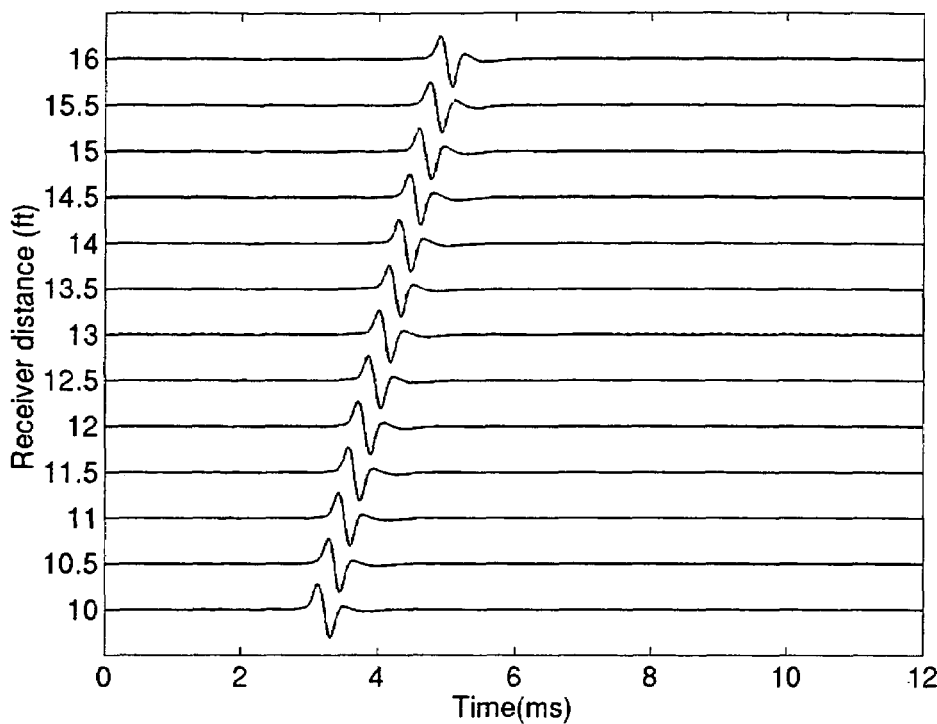
FIGS. 16a-16d illustrate a sequence of data acquisition and processing results to obtain a Stoneley radial profile of horizontal shear slowness using the RIM model for an acoustic tool in a radially homogeneous formation.
Figure 16B:
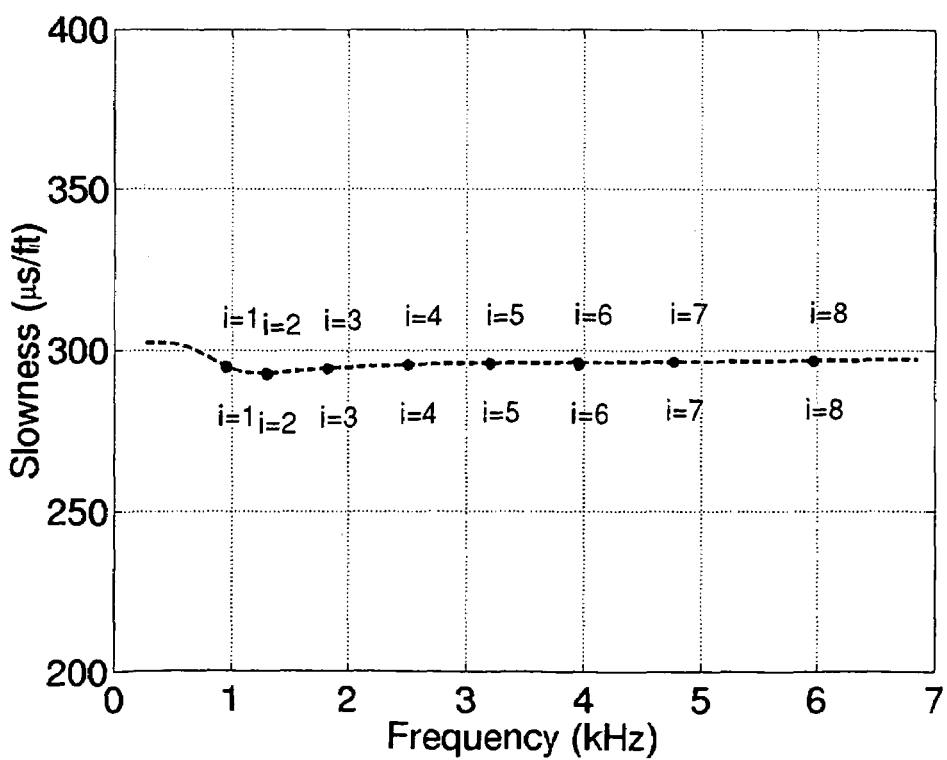
Figure 16C:
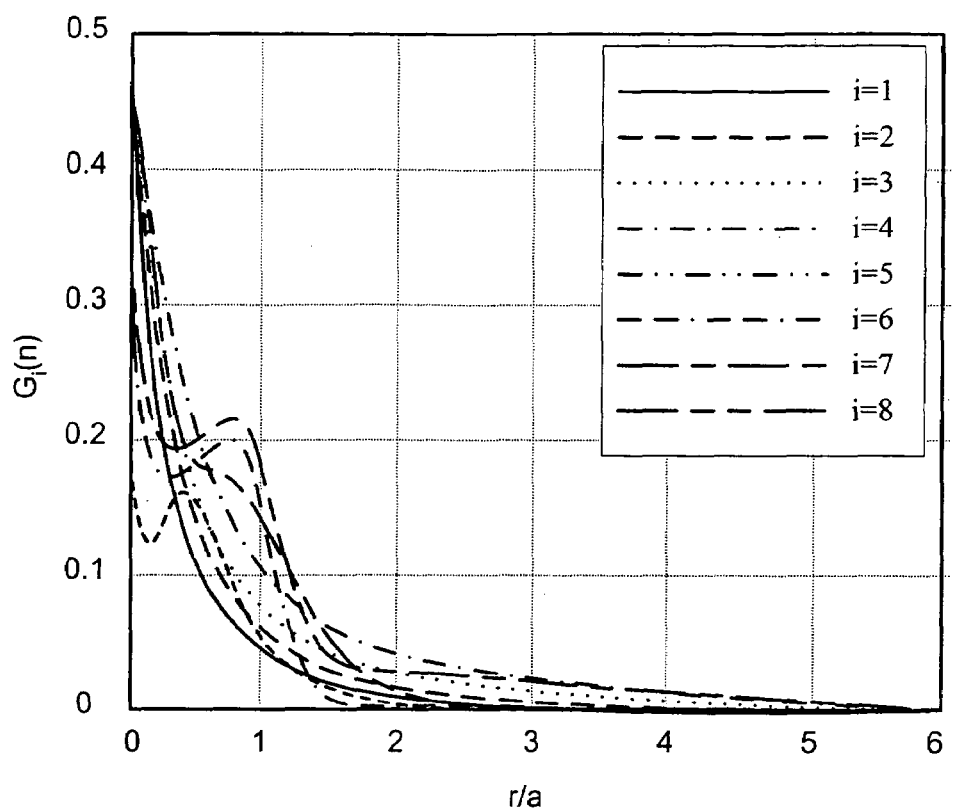
Figure 16D:
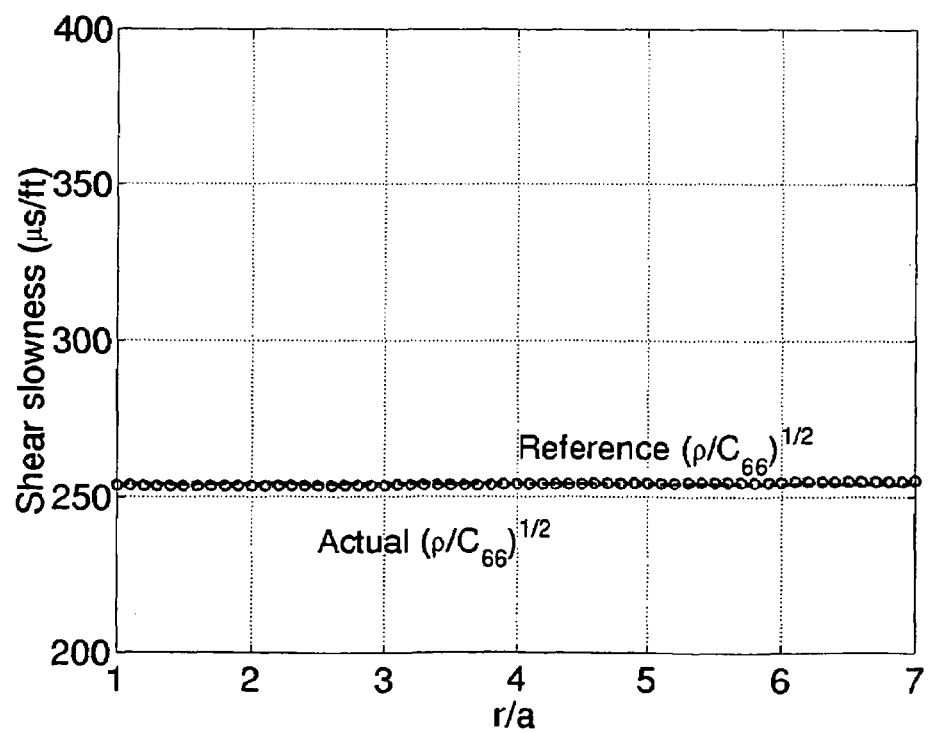

FIG. 16a illustrates synthetic waveforms at an array of thirteen receivers calculated for a radially homogeneous formation using the Resonance-Impedance Model of the MSIP tool. The reference Stoneley dispersion (dashed line (FIG. 16b)) is calculated from a mode-search routine together with eight discrete points from the synthetic dispersion calculated from the waveforms shown in FIG. 16a. The discrete dispersion points are arbitrarily selected over a reasonable bandwidth in different examples considered herein. FIG. 16c displays radial distributions of data kernels at the eight selected frequencies. FIG. 16d compares the inverted radial profile of horizontal shear slowness with that of the uniform shear slowness profile used in generating the synthetic Stoneley dispersion. Excellent agreement is observed between the inverted shear slowness profile and the constant shear slowness of 254 μs/ft assumed in the radially homogeneous formation.

Figure 17A:
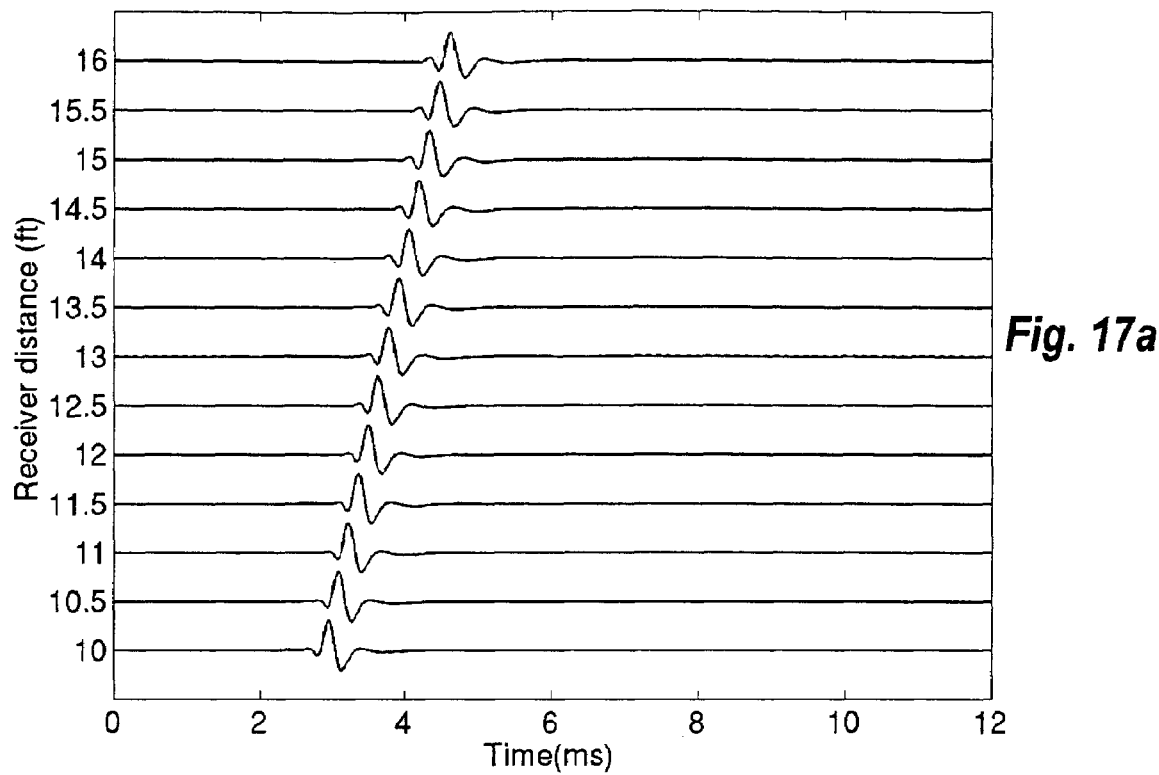
FIGS. 17a-17d illustrate a sequence of data acquisition and processing results to obtain a Stoneley radial profile of horizontal shear slowness using the RIM model for an acoustic tool in a formation with radially increasing compressional and shear slownesses.
Figure 17B:
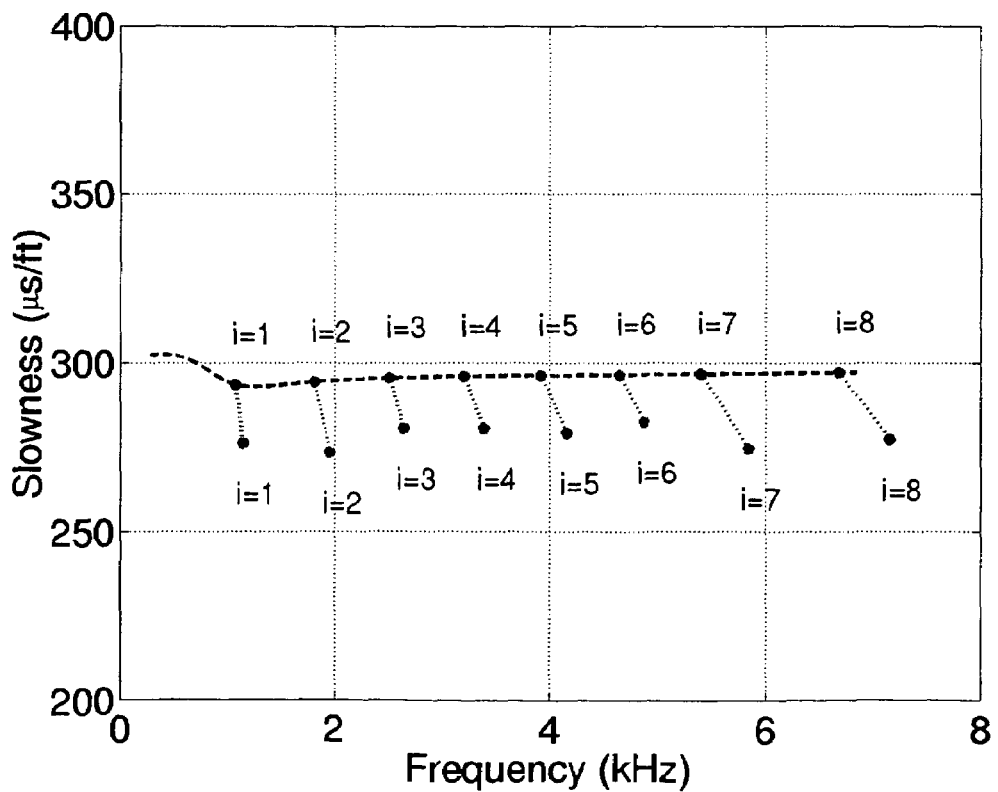
Figure 17C:
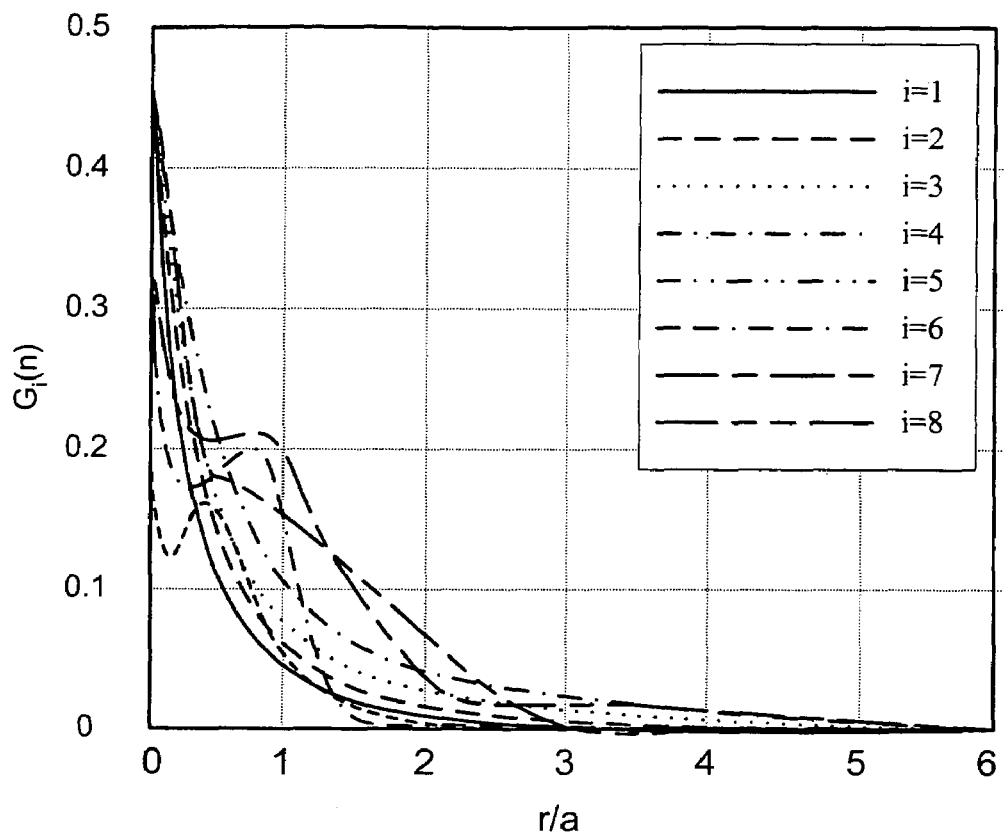
Figure 17D:
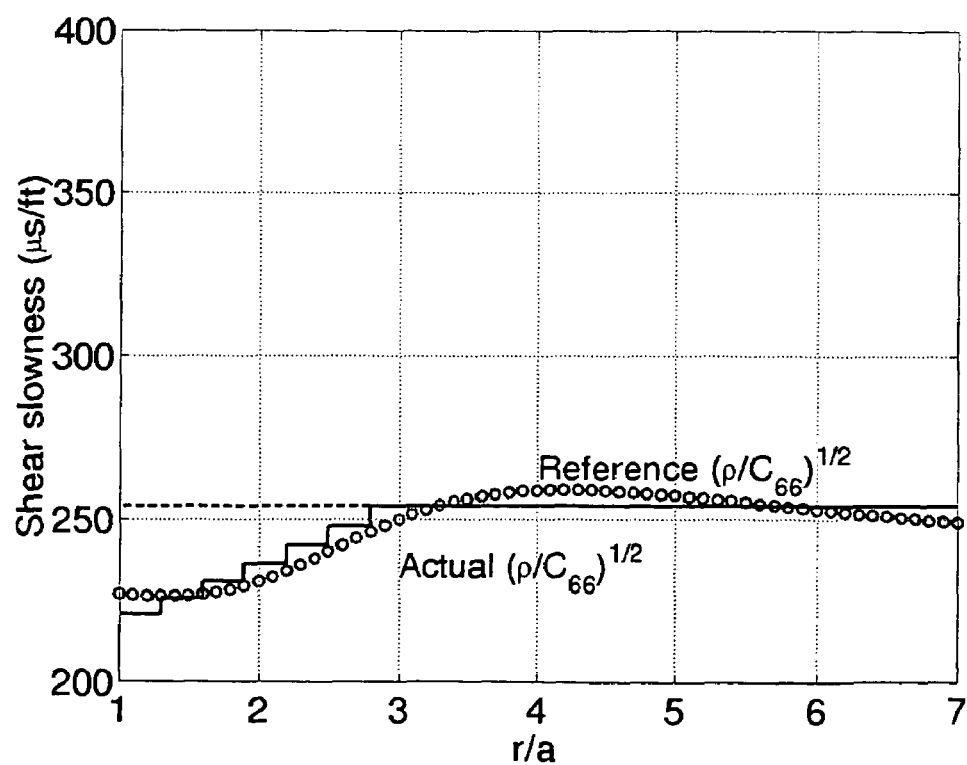

FIG. 17a displays synthetic waveforms at an array of thirteen receivers computed for a formation with radially increasing compressional and shear slownesses using the RIM of the MSIP tool. FIG. 17b shows the reference Stoneley dispersion calculated from a mode-search routine (dashed line) together with eight discrete points from the synthetic Stoneley dispersion obtained from the waveforms shown in FIG. 17a. Radial distributions of data kernels are illustrated in FIG. 17c at the eight selected frequencies. A comparison of the inverted radial profile of shear slowness shown in FIG. 17d is made with that of the stair-case profile used in obtaining the synthetic Stoneley dispersion data. Generally good agreement is observed between the inverted and input stair-case shear slowness profiles. Differences in the far-field are probably caused by some residual error in the input dispersion data. Note that a stair-case profile is likely to introduce some unknown errors in the synthetic waveforms as well.

Figure 18A:
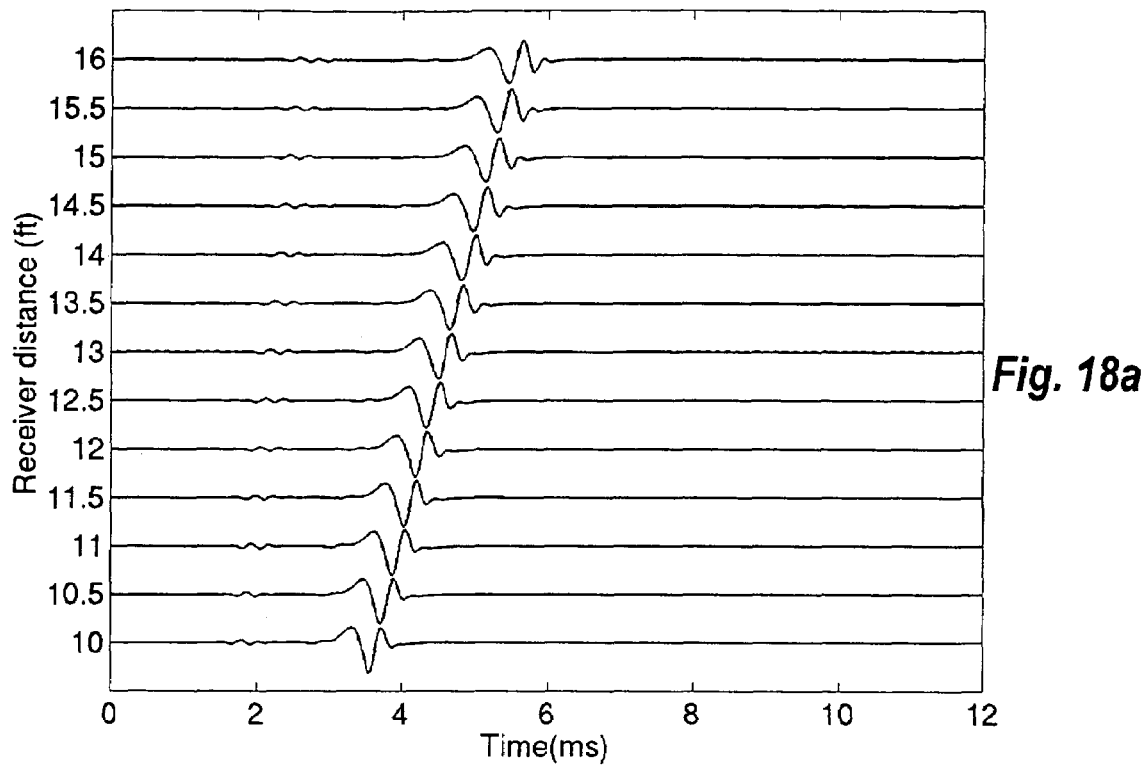
FIGS. 18a-18d illustrate a sequence of data acquisition and processing results to obtain a Stoneley radial profile of horizontal shear slowness using the RIM model for an acoustic tool in a formation with radially decreasing compressional and shear slownesses.
Figure 18B:
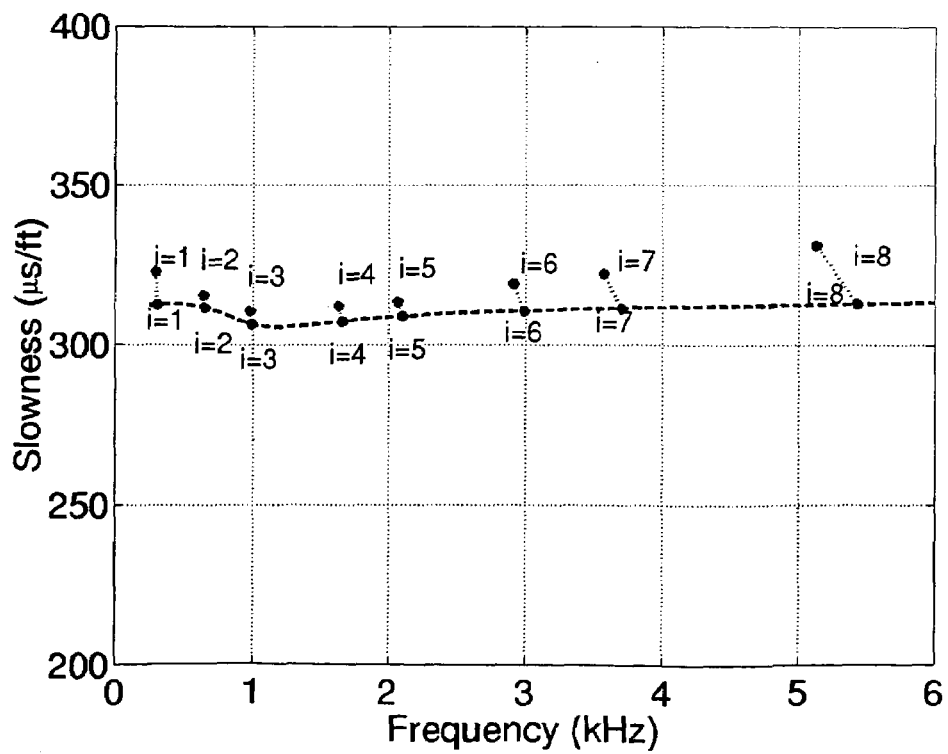
Figure 18C:
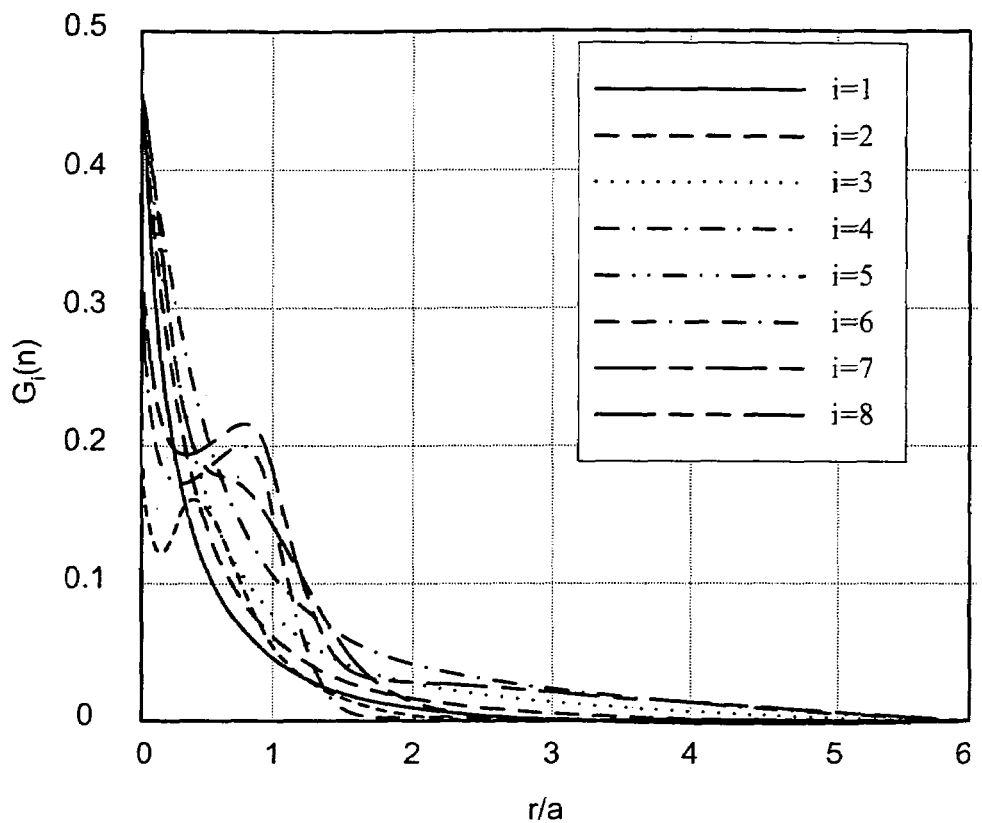
Figure 18D:
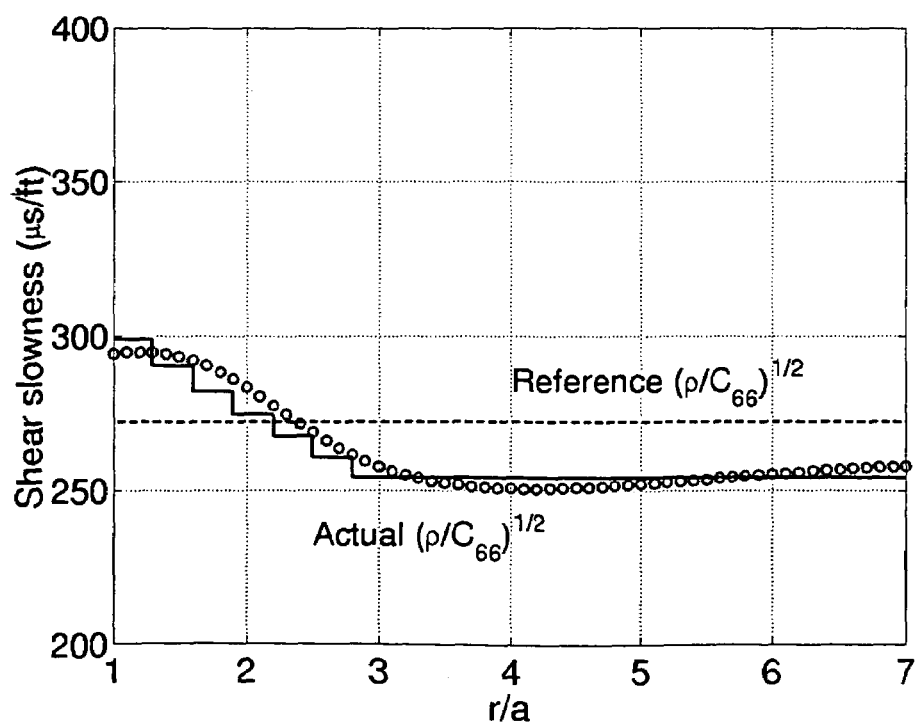

Next, results from the SRP algorithm are analyzed for the case of radially decreasing compressional and shear slownesses away from the borehole surface. FIG. 18*a* displays synthetic waveforms at an array of thirteen receivers computed for a formation with radially decreasing compressional and shear slownesses away from the borehole surface. FIG. 18*b* illustrates the reference Stoneley dispersion (dashed line) used to obtain the radial profile of shear slowness from the SRP algorithm. The eight discrete points in FIG. 18*b* denote the input data from the synthetic Stoneley dispersion calculated from the waveforms shown in FIG. 18*a*. FIG. 18*c* shows radial distributions of data kernels at the eight input frequencies selected for the SRP algorithm. Finally, one compares in FIG. 18*d* the inverted shear slowness profile with that of the stair-case profile used to obtain the synthetic Stoneley dispersion. Again, good agreement is observed between the inverted and synthetic profiles of shear slowness away from the borehole surface to within the uncertainty caused by errors in the input dispersion data. Note that a stair-case profile is difficult to simulate with a sparse sampling of the input dispersion data that has some errors in them as well. Thus the SRP algorithm is well validated against synthetic data.

Computational Results: Field Data

The SRP algorithm is applied as described below to measured Stoneley dispersions using acoustic data obtained from a well with known characteristics. Computational results for two different configurations are compared to study the acoustic tool effects on the borehole Stoneley modes. The two configurations include: (A) a concentric column with a surface-impedance condition to simulate the acoustic tool structure; and (B) an empty borehole.

The parameters for the formation at different depths appearing in the investigation are given in Table II. The geometrical parameters, consistent with an acoustic tool geometry (MSIP) are as follows: tool radius is b=4.6 cm (1.85 in) and the borehole radius is denoted by a. The borehole mud mass density $\rho_f$=1107.23 kg/m$^3$; and the mud compressional slowness is 212 µs/ft.

TABLE II

Material properties in the chosen reference state

| Depth ft | Diameter inches | $V_P$ m/s | ρ kg/m$^3$ |
|---|---|---|---|
| 590 | 9.3 | 346 | 2310 |
| 724.5 | 9.6 | 346 | 2580 |
| 792 | 9.7 | 326 | 2530 |
| 920 | 9.3 | 346 | 2590 |
| 1108.5 | 9.6 | 346 | 2641 |
| 1217.5 | 10 | 336 | 2620 |

Figure 19A:
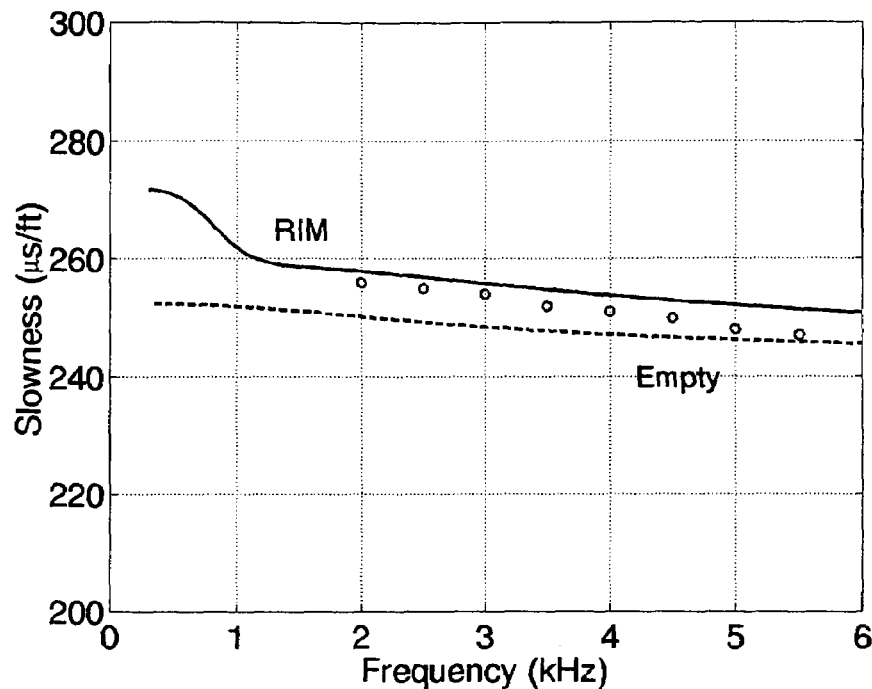
FIGS. 19a-19d illustrate a sequence of data acquisition and processing results to obtain a Stoneley radial profile of horizontal shear slowness using the RIM model for an acoustic tool in a well of known parameters at a depth of 590 feet.
Figure 19B:
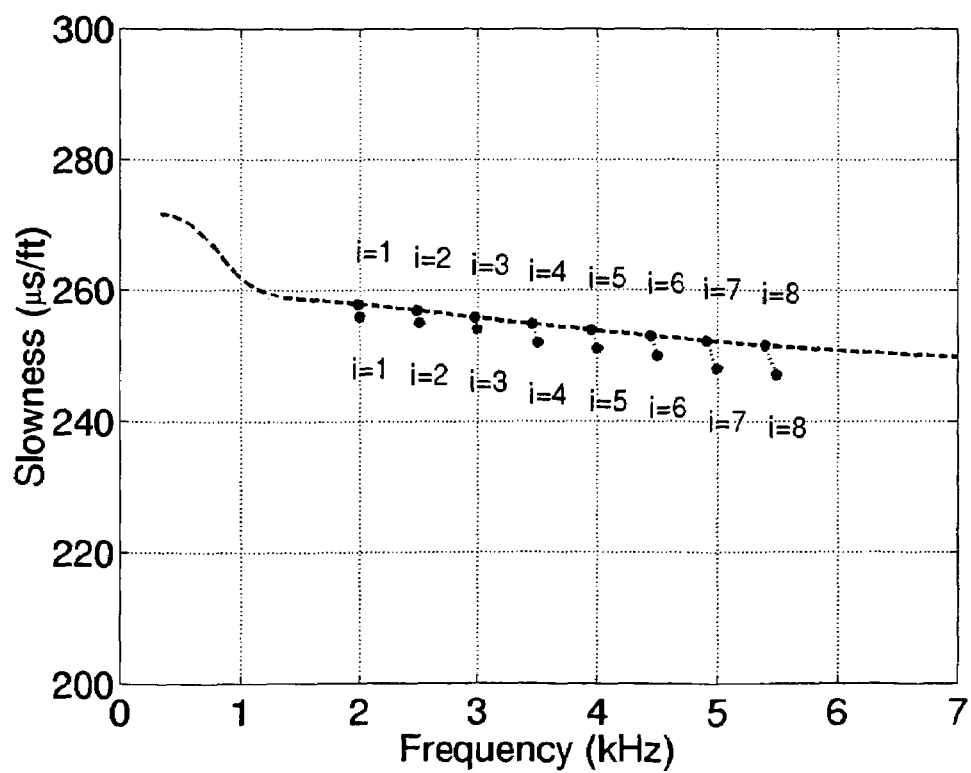
Figure 19C:
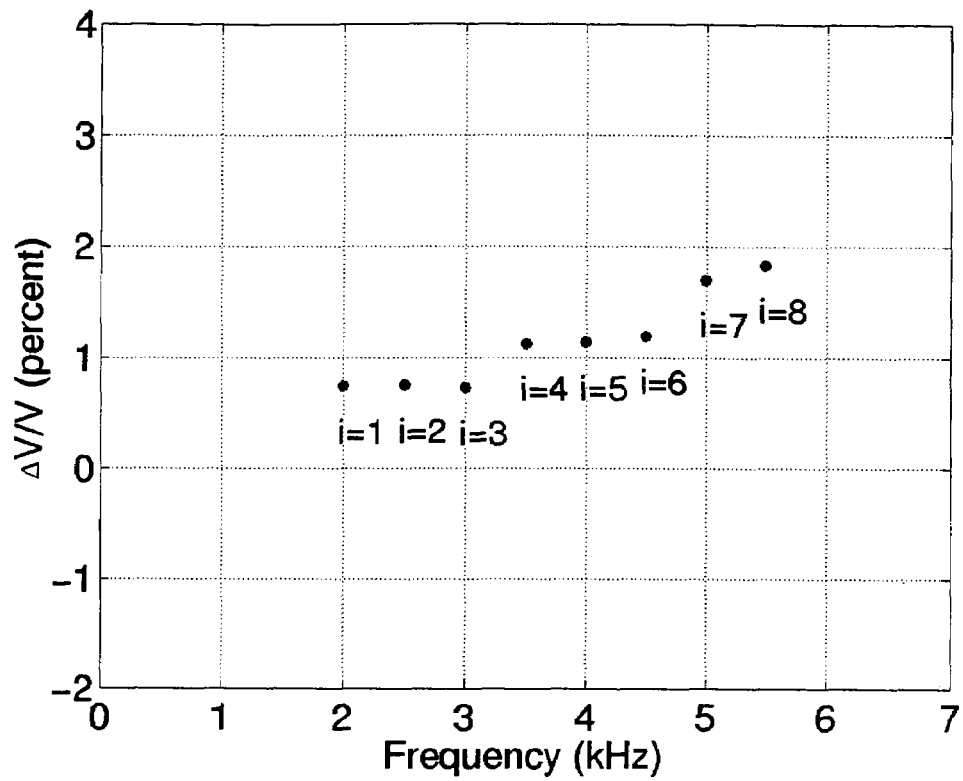
Figure 19D:
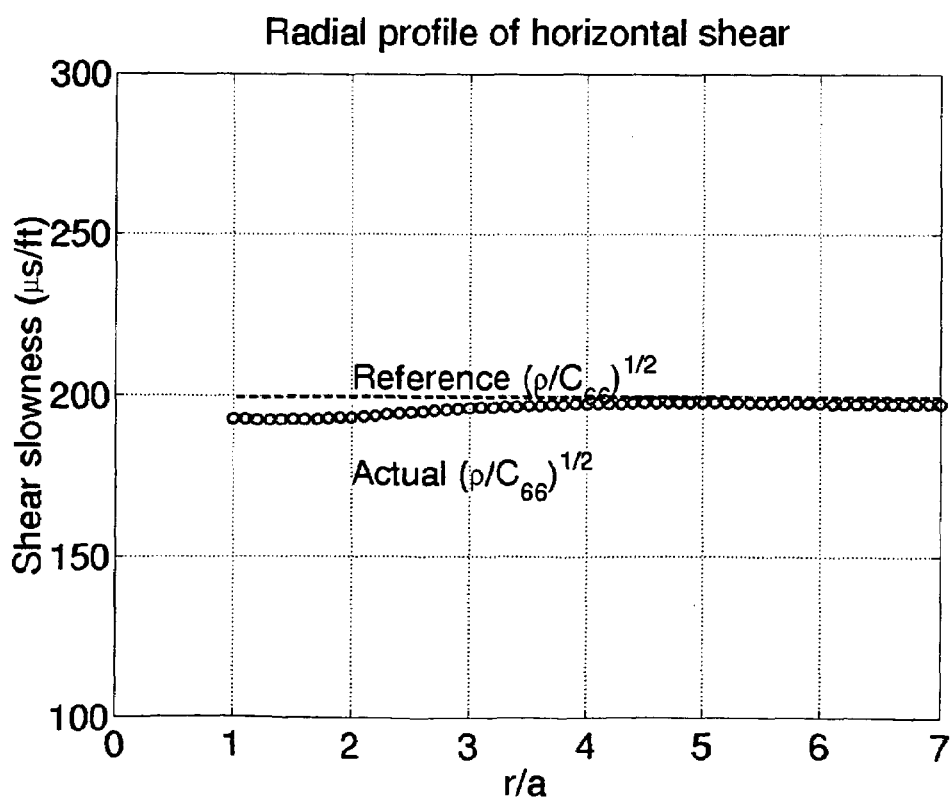

FIG. 19*a* compares Stoneley dispersions of an empty borehole (shown by a dashed curve) with that for the RIM (shown by a solid curve) in an homogenous and equivalent isotropic formation. The formation parameters are for a depth of 590 ft. The presence of MSIP tool causes the Stoneley slowness to be slower than an empty borehole over the entire bandwidth. However, it should be noted that differences between the RIM and empty borehole model become small with increasing borehole diameters and formation slownesses. Table II contains the formation parameters in the selected reference state at various depths considered in the well study. FIG. 19*b* displays the measured Stoneley dispersions by discrete points i=1, 2, 3, . . . 8; and the dashed line denotes the RIM dispersion in the reference state. FIG. 19*c* shows fractional differences between the measured and reference dispersions at eight selected frequencies. FIG. 19*d* displays the inverted radial profile of the formation horizontal shear slowness using the resonance-impedance model for the MSIP tool structure at depth 590 ft.

Figure 20A:
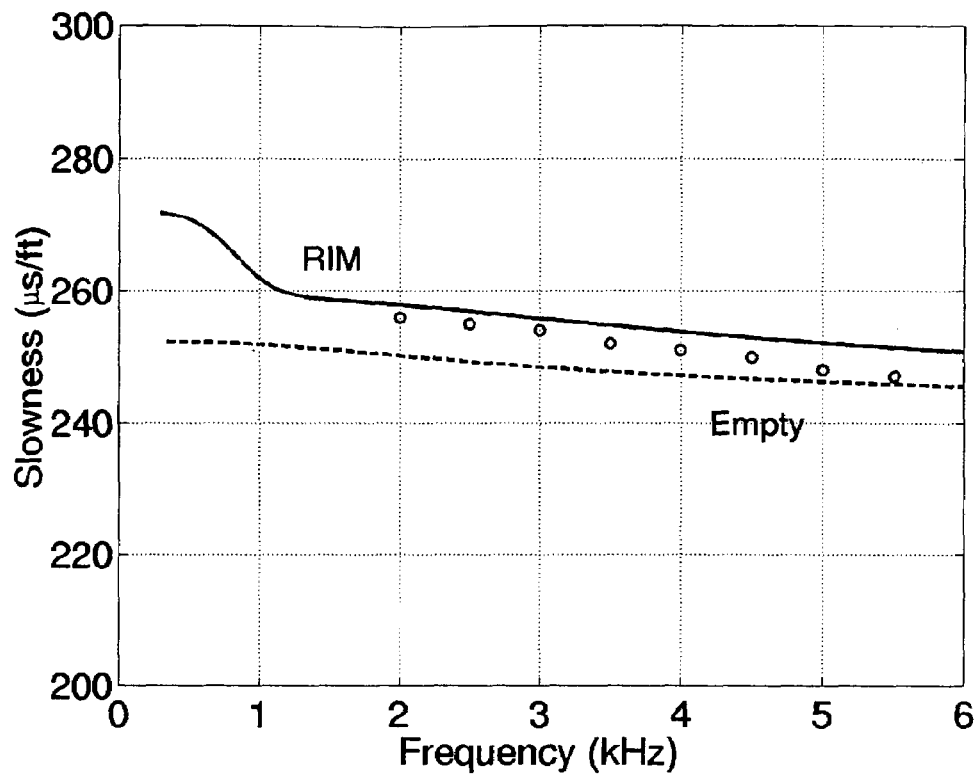
FIGS. 20a-20d illustrate a sequence of data acquisition and processing results to obtain a Stoneley radial profile of horizontal shear slowness using an empty borehole model for an acoustic tool in a well of known parameters at a depth of 590 feet.
Figure 20B:
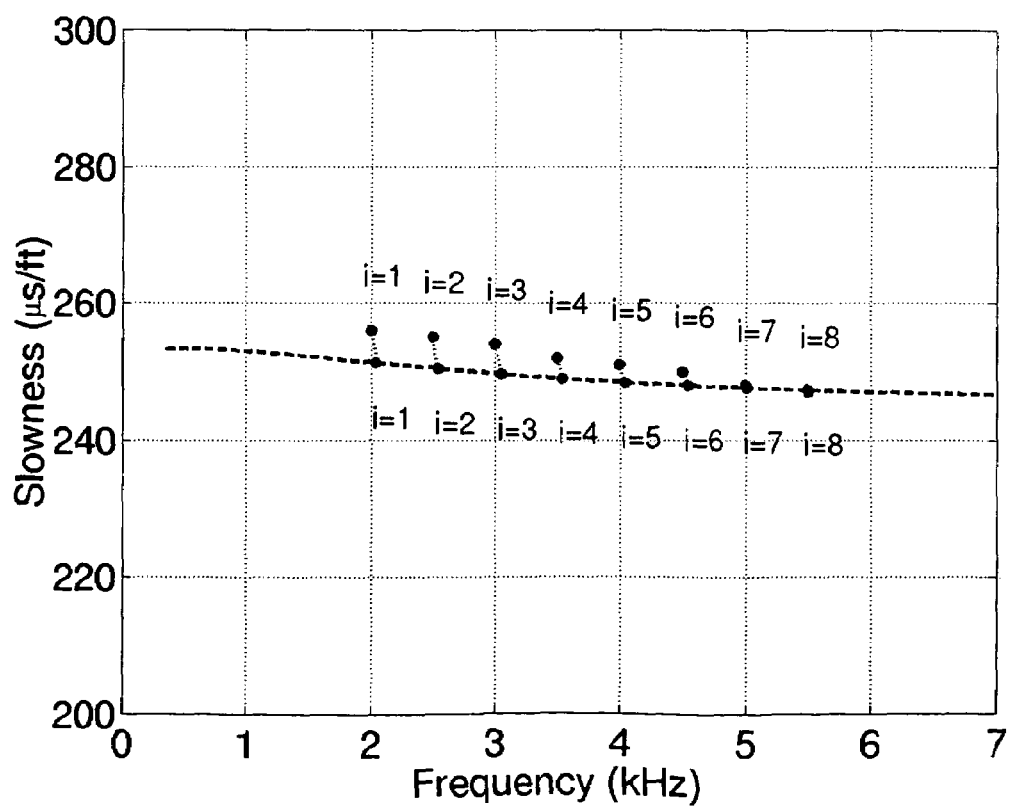
Figure 20C:
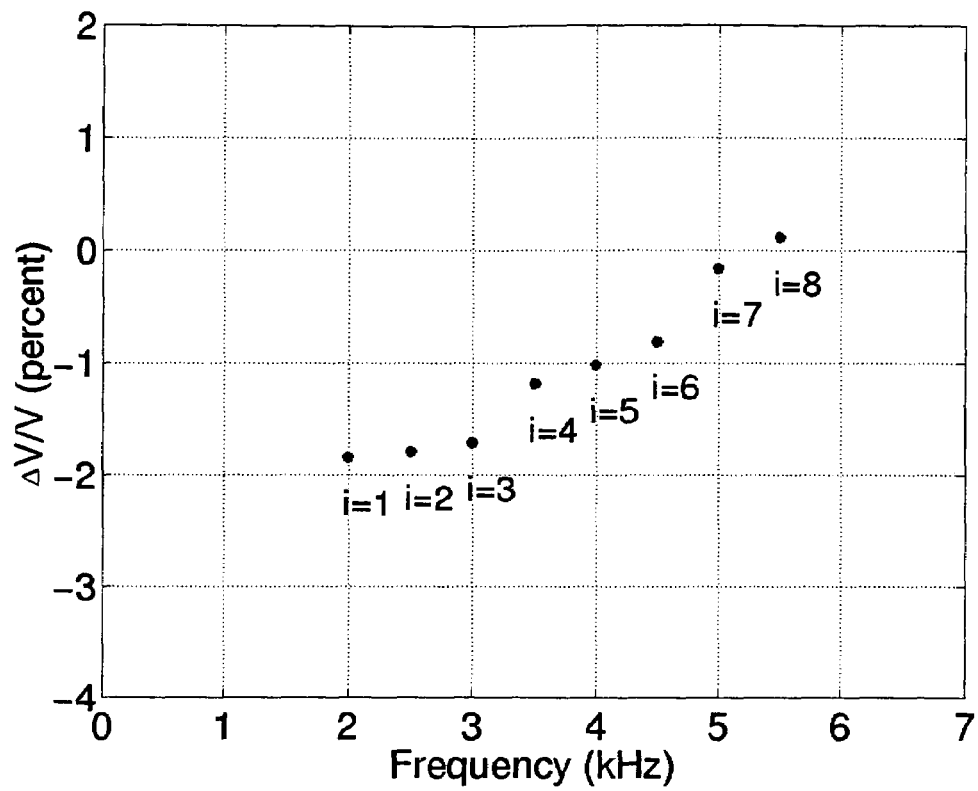
Figure 20D:
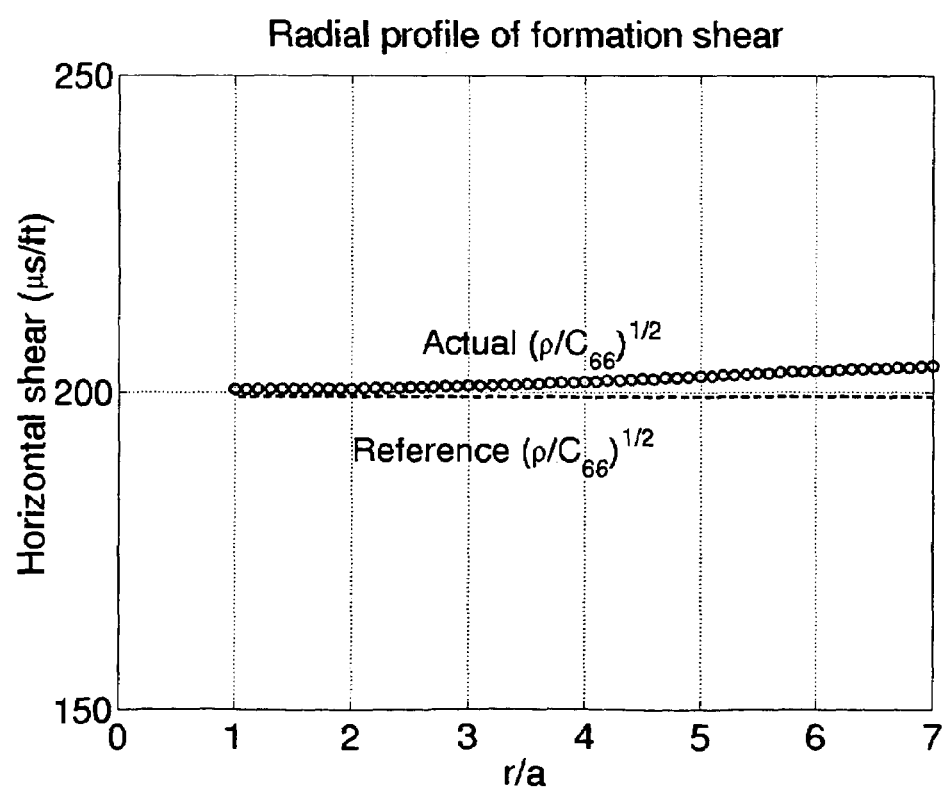

FIGS. 20*a*-20*d* summarize results for an empty borehole obtained from the same known well Stoneley data and depth as those shown in FIGS. 19*a*-19*d*. In view of the known tool bias in the data, results based on an empty borehole model may be unreliable. However, the goal of this comparison is simply to study differences in the radial profiles using the two different models. FIG. 20*a* is similar to FIG. 19*a* where we compare borehole Stoneley dispersions for the resonance-impedance model with that of an empty borehole surrounded by a formation with the same parameters. FIG. 20*b* displays the measured Stoneley dispersion by discrete points and the dashed curve denotes the empty borehole Stoneley dispersion in the reference state. FIG. 20*c* shows fractional changes in the measured dispersion from the reference empty borehole Stoneley dispersion. FIG. 20*d* displays the inverted radial profile of shear slowness obtained using the empty borehole model at a depth of 590 ft in the known well. Comparing shear slowness radial profiles in FIGS. 19*d* and 20*d*, it is clear that the radial profile in FIG. 19*d* indicates a different radial profile than that shown in FIG. 20*d*.

Figure 21A:
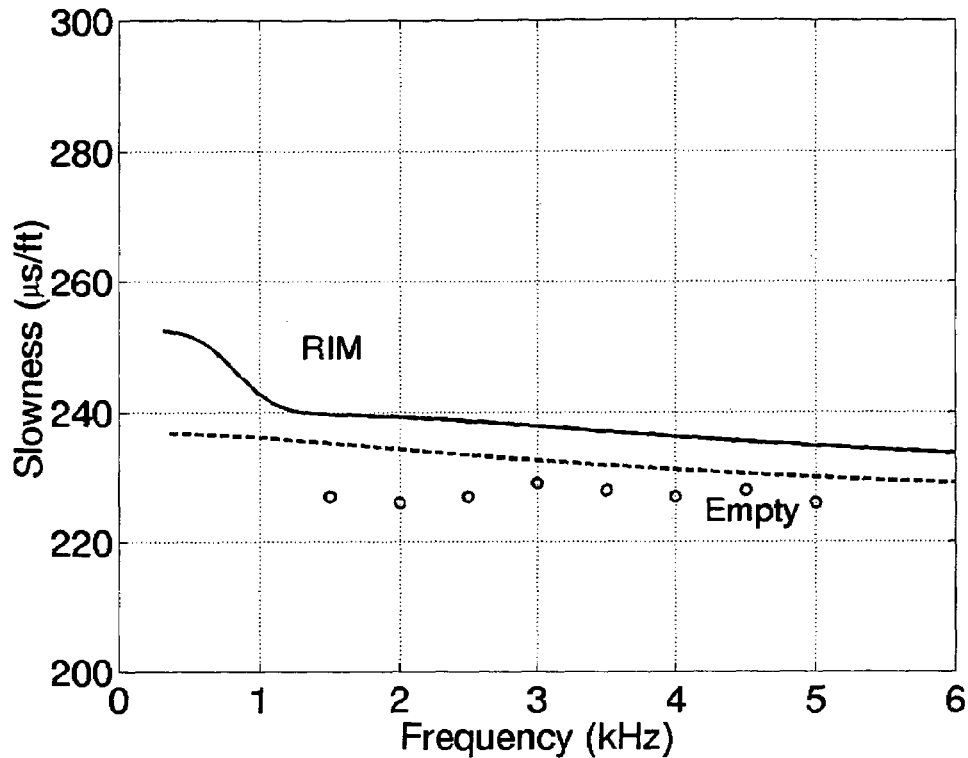
FIGS. 21a-21d illustrate a sequence of data acquisition and processing results to obtain a Stoneley radial profile of horizontal shear slowness using the RIM model for an acoustic tool in a well of known parameters at a depth of 724.5 feet.
Figure 21B:
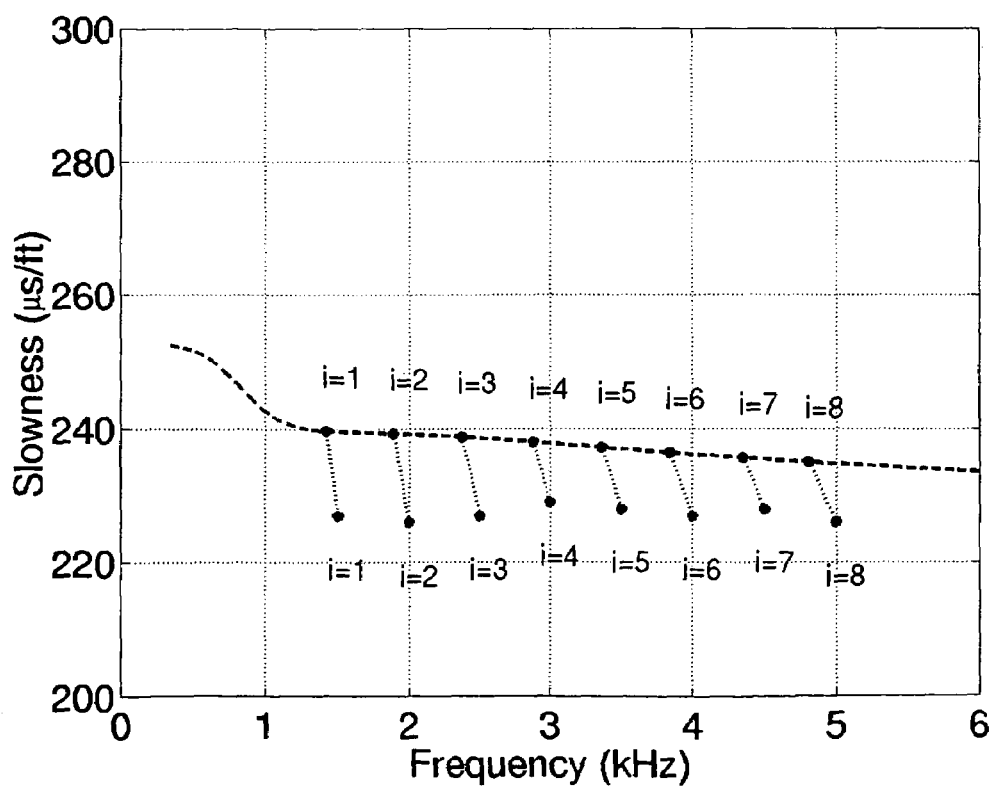
Figure 21C:
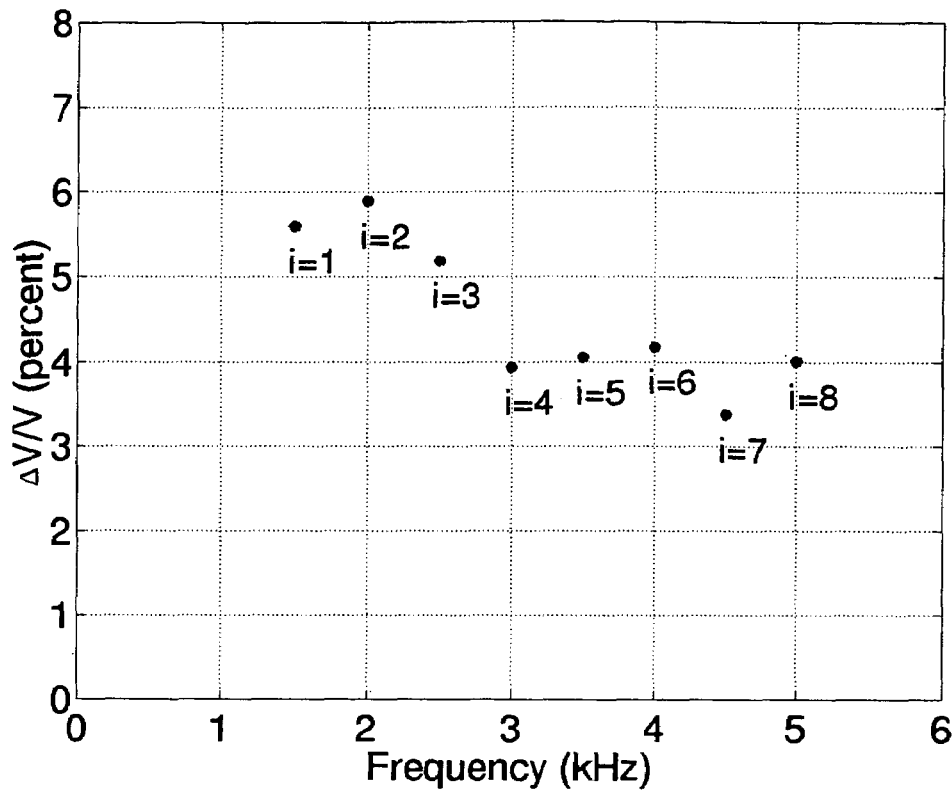
Figure 21D:
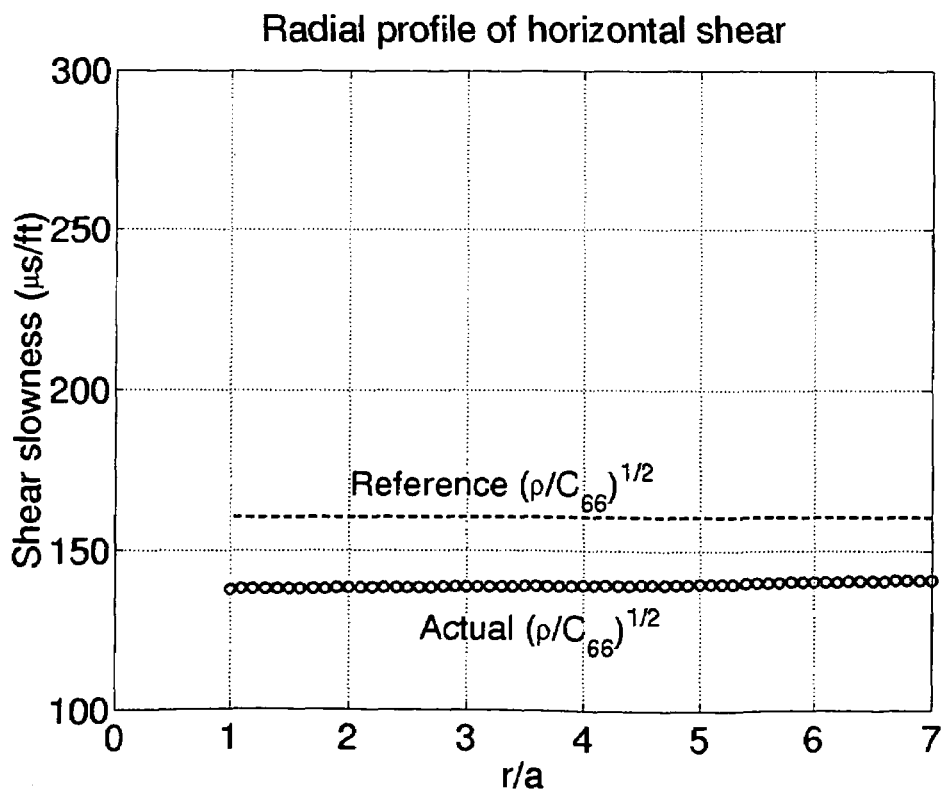
Figure 22A:
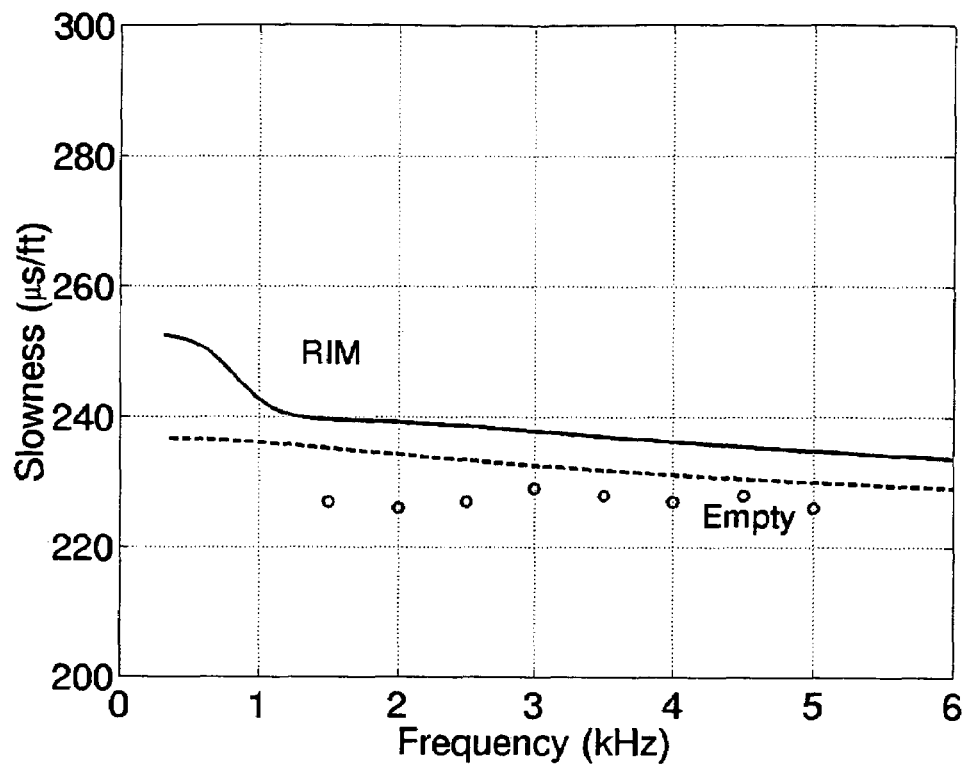
FIGS. 22a-22d illustrate a sequence of data acquisition and processing results to obtain a Stoneley radial profile of horizontal shear slowness using an empty borehole model for an acoustic tool in a well of known parameters at a depth of 724.5 feet.
Figure 22B:
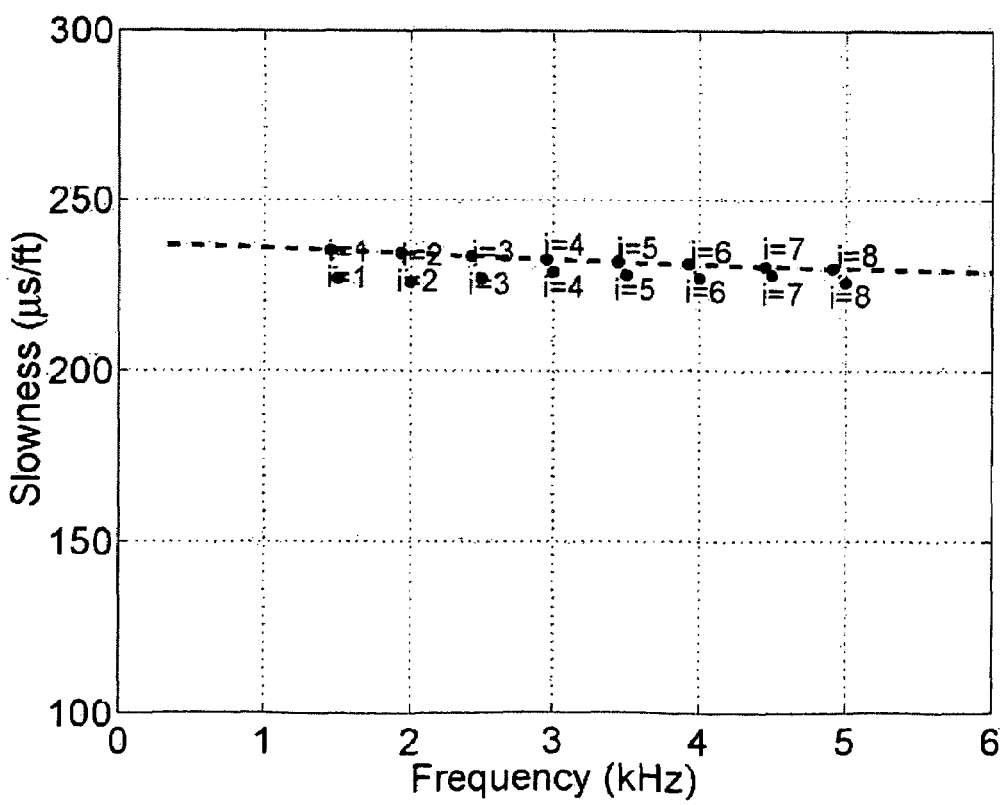
Figure 22C:
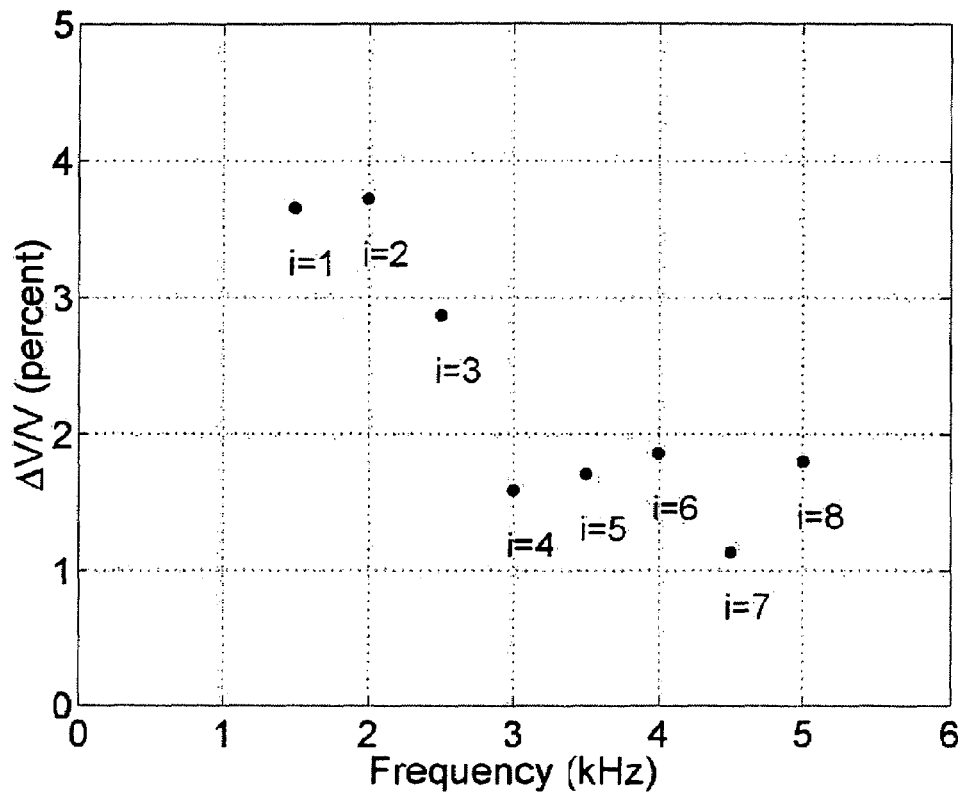
Figure 22D:
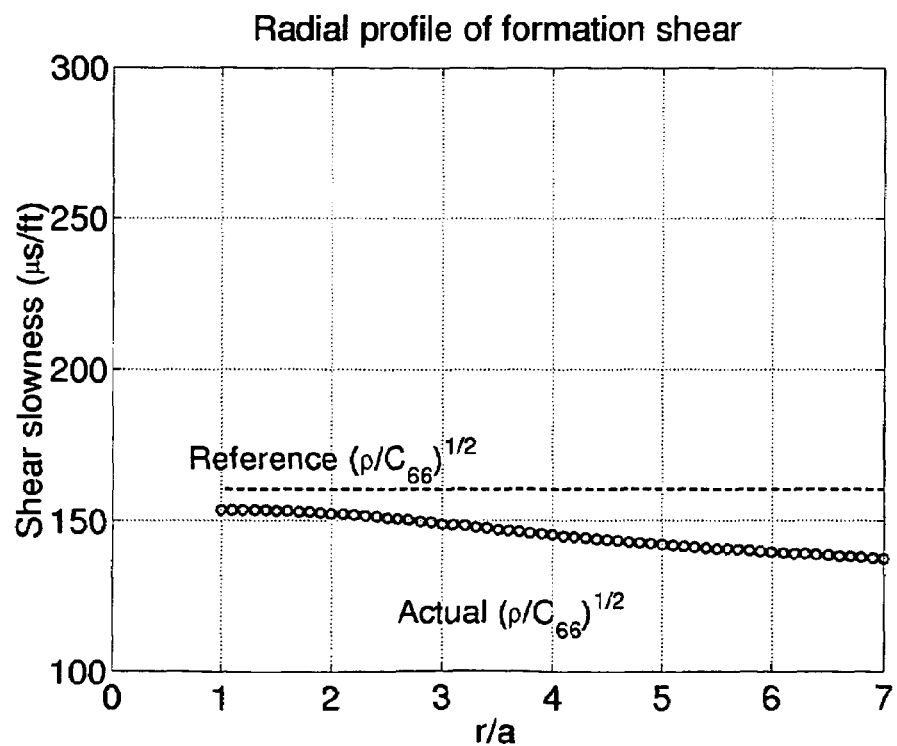
Figure 23A:
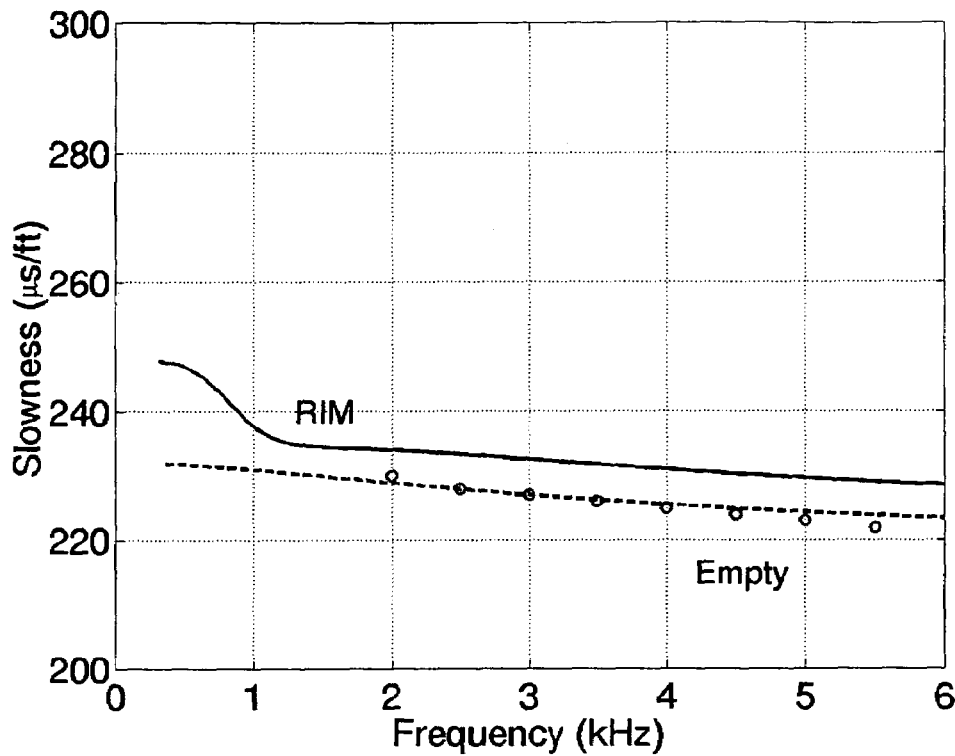
FIGS. 23a-23d illustrate a sequence of data acquisition and processing results to obtain a Stoneley radial profile of horizontal shear slowness using the RIM model for an acoustic tool in a well of known parameters at a depth of 792 feet.
Figure 23B:
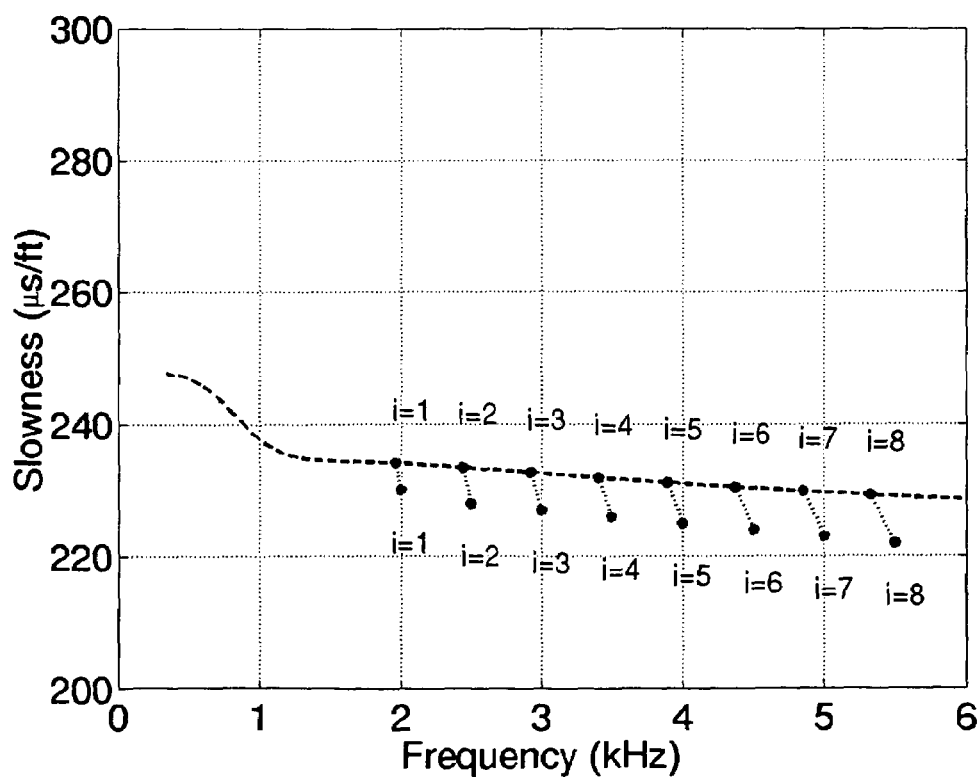
Figure 23C:
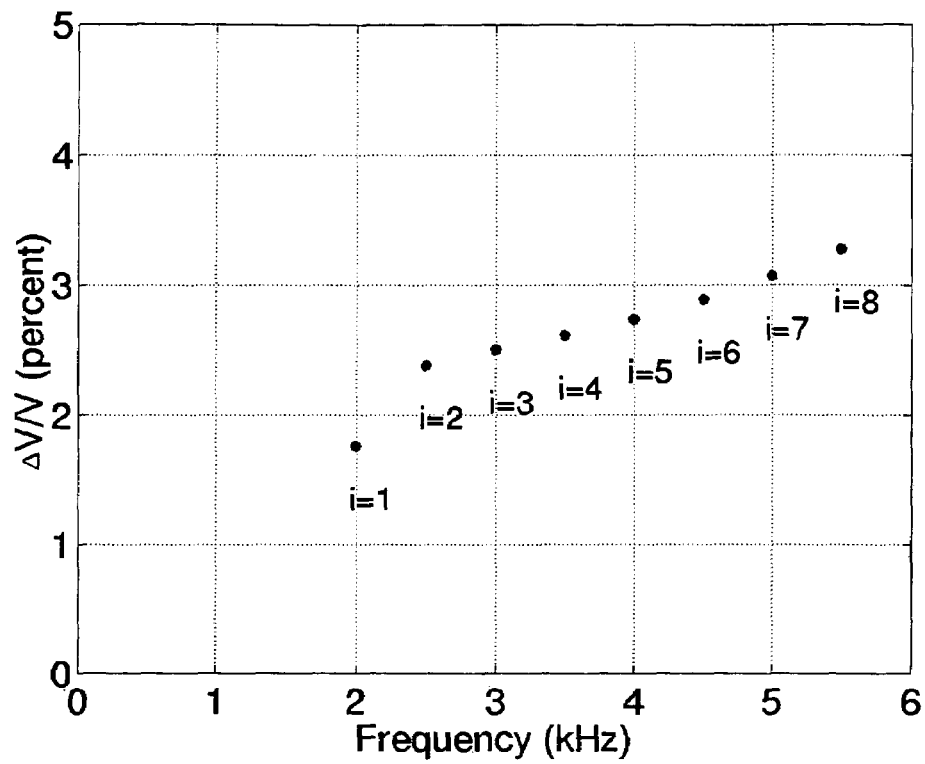
Figure 23D:
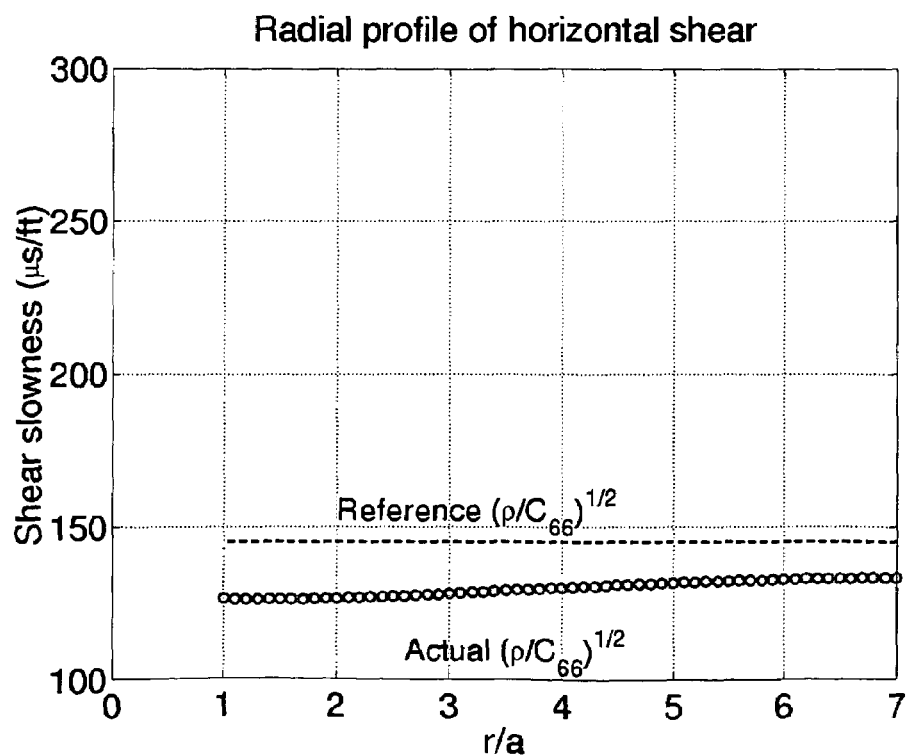
Figure 24A:
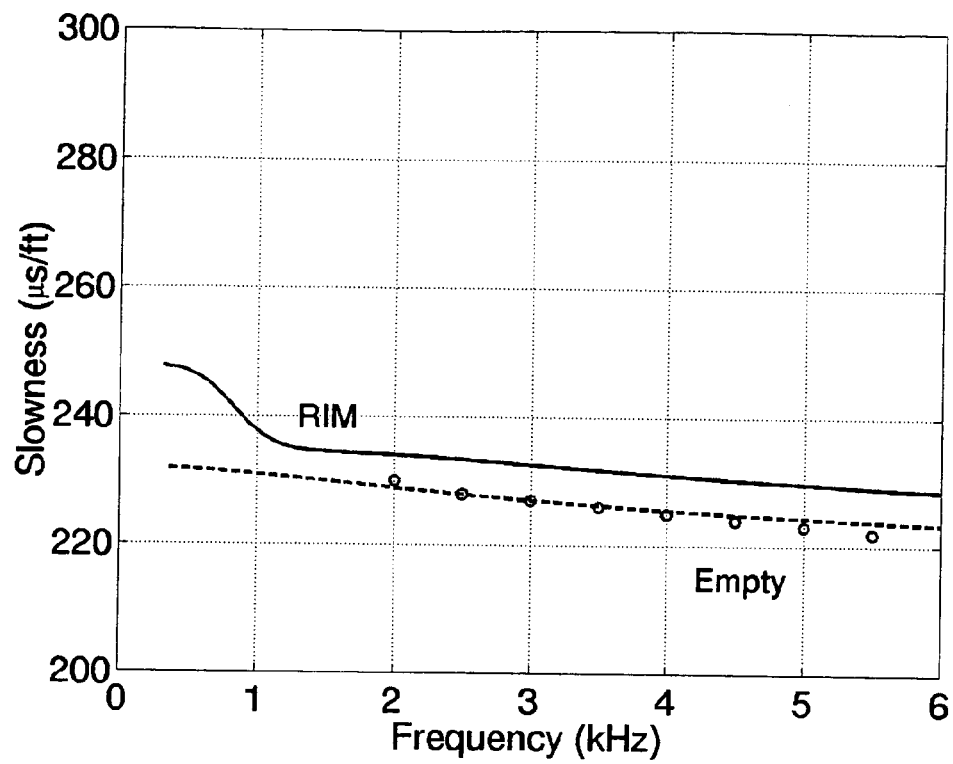
FIGS. 24a-24d illustrate a Stoneley radial profile of horizontal shear slowness using an empty borehole model for an acoustic tool in a well of known parameters at a depth of 792 feet.
Figure 24B:
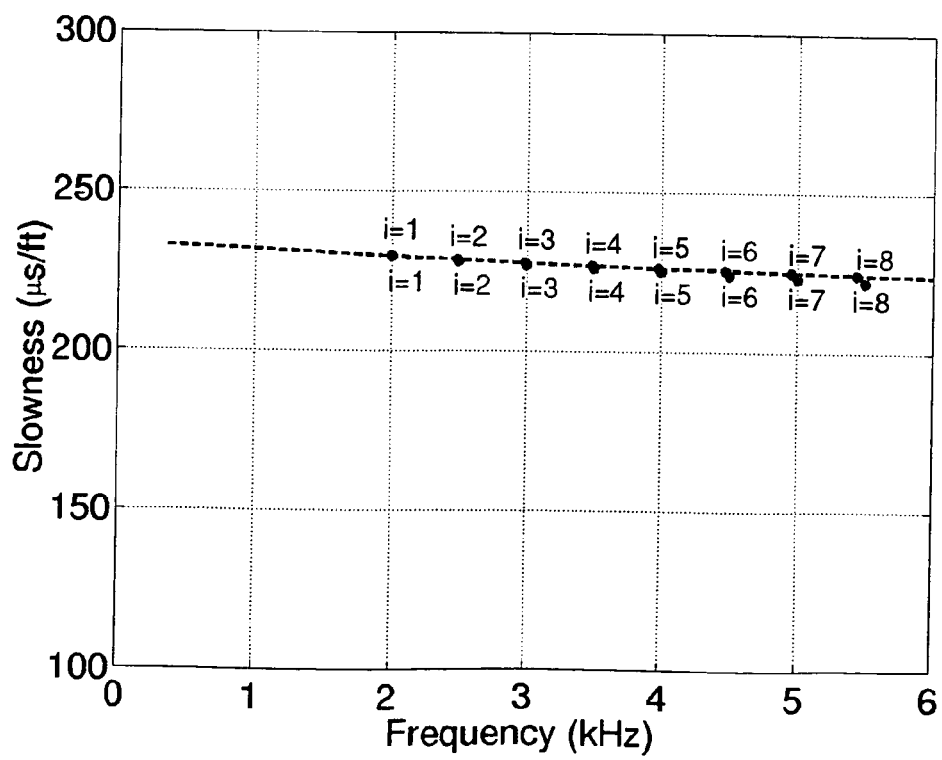
Figure 24C:
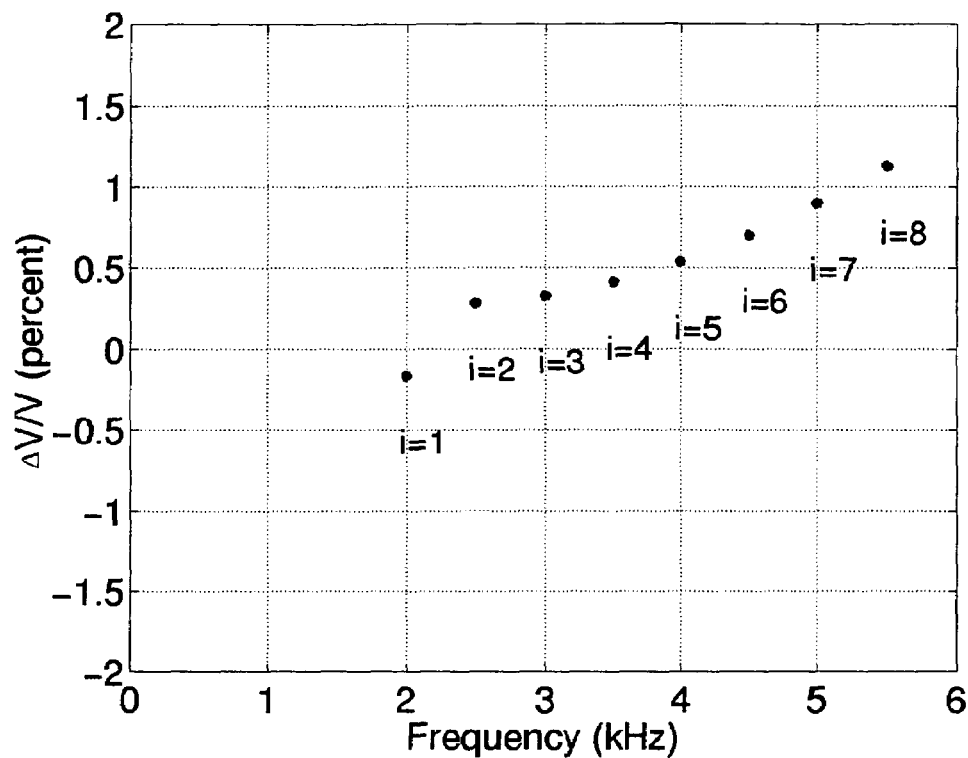
Figure 24D:
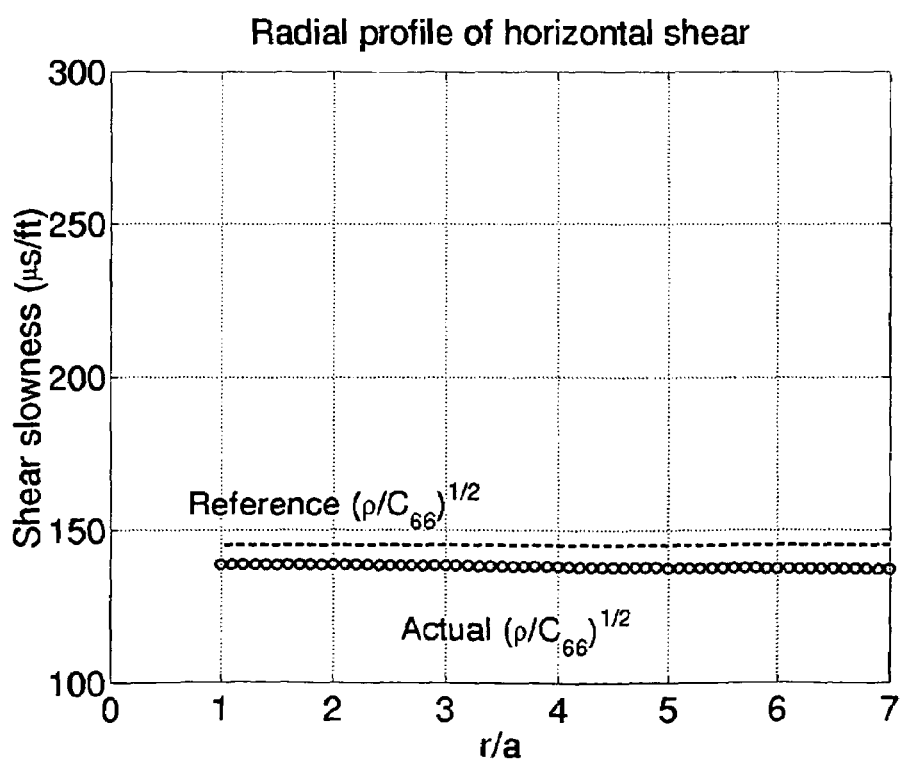
Figure 25A:
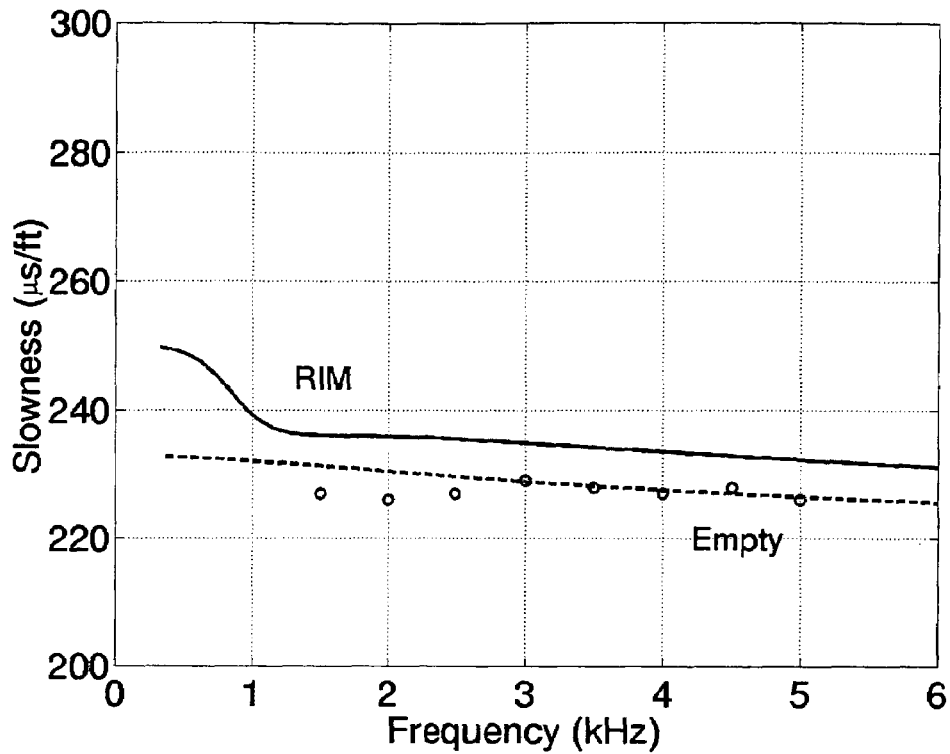
FIGS. 25a-25d illustrate a Stoneley radial profile of horizontal shear slowness using the RIM model for an acoustic tool in a well of known parameters at a depth of 920 feet.
Figure 25B:
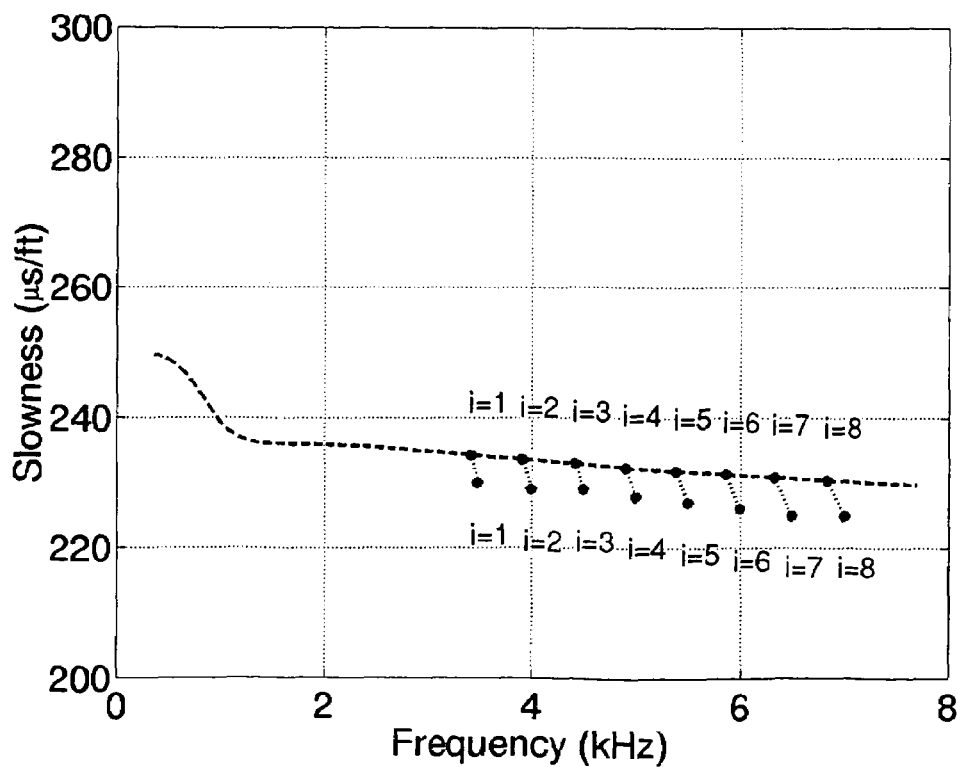
Figure 25C:
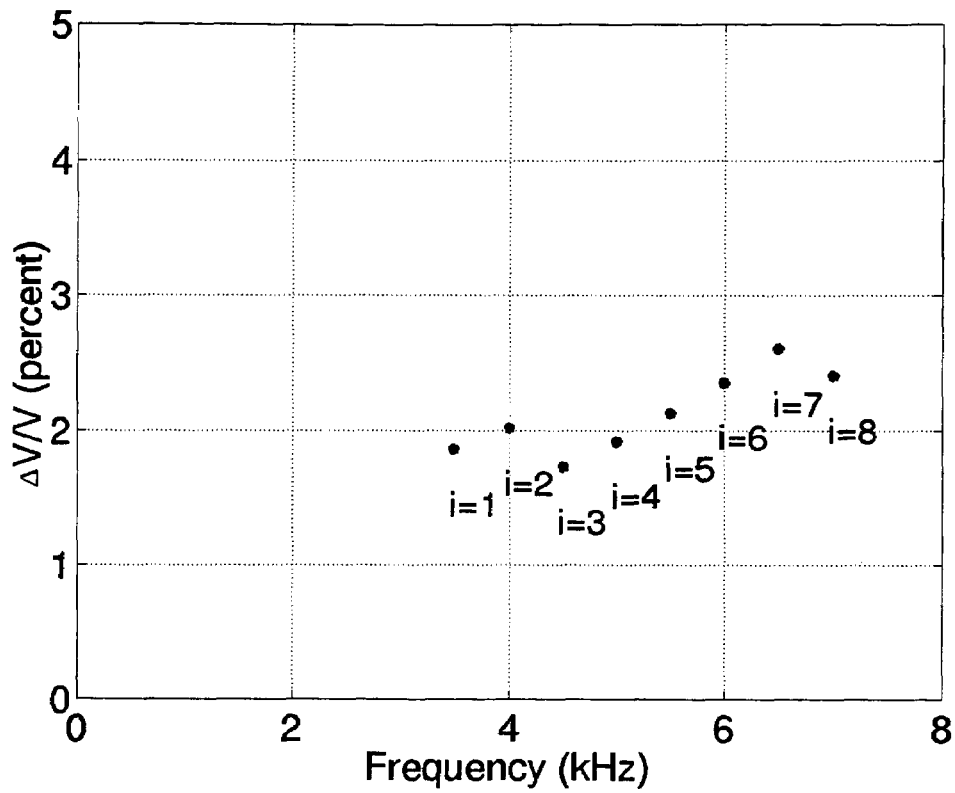
Figure 25D:
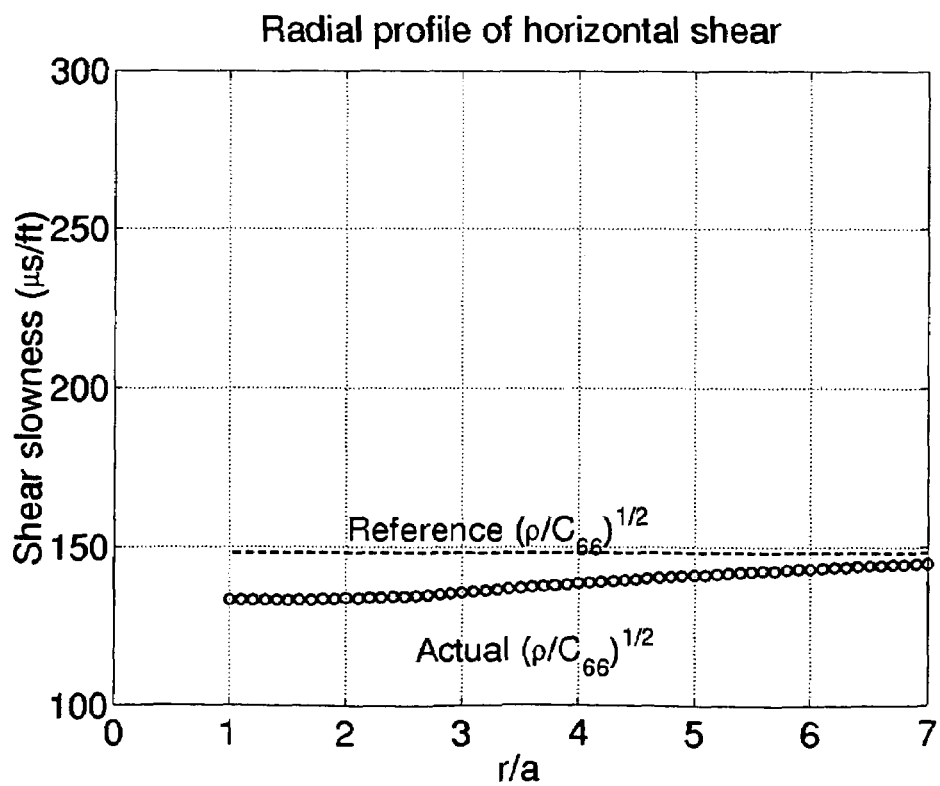
Figure 26A:
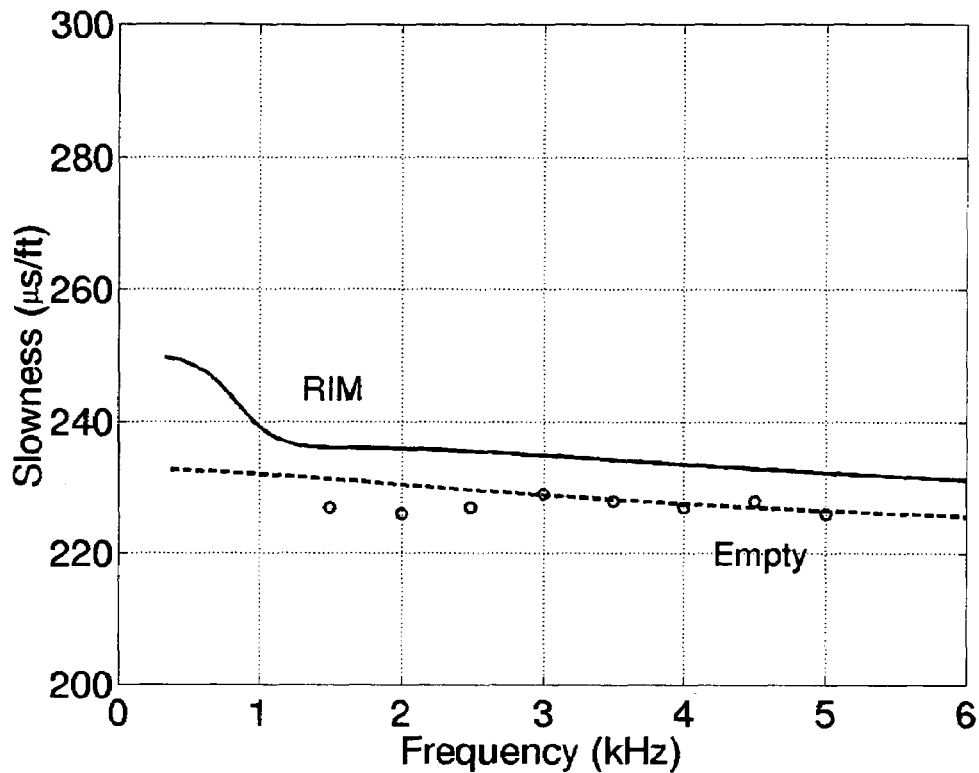
FIGS. 26a-26d illustrate a Stoneley radial profile of horizontal shear slowness using an empty borehole model for an acoustic tool in a well of known parameters at a depth of 920 feet.
Figure 26B:
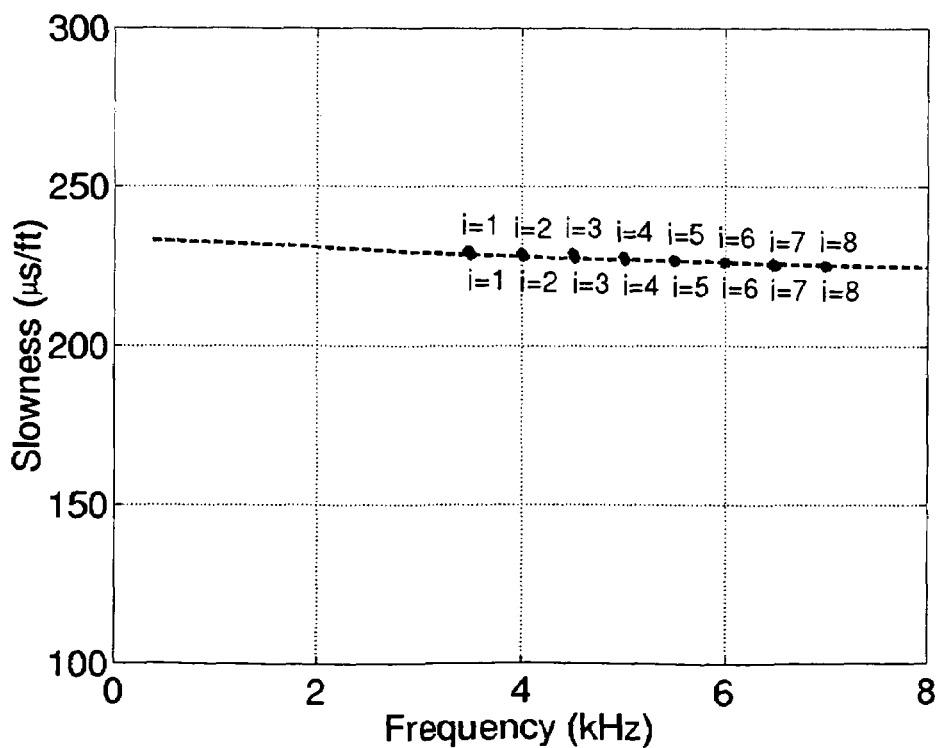
Figure 26C:
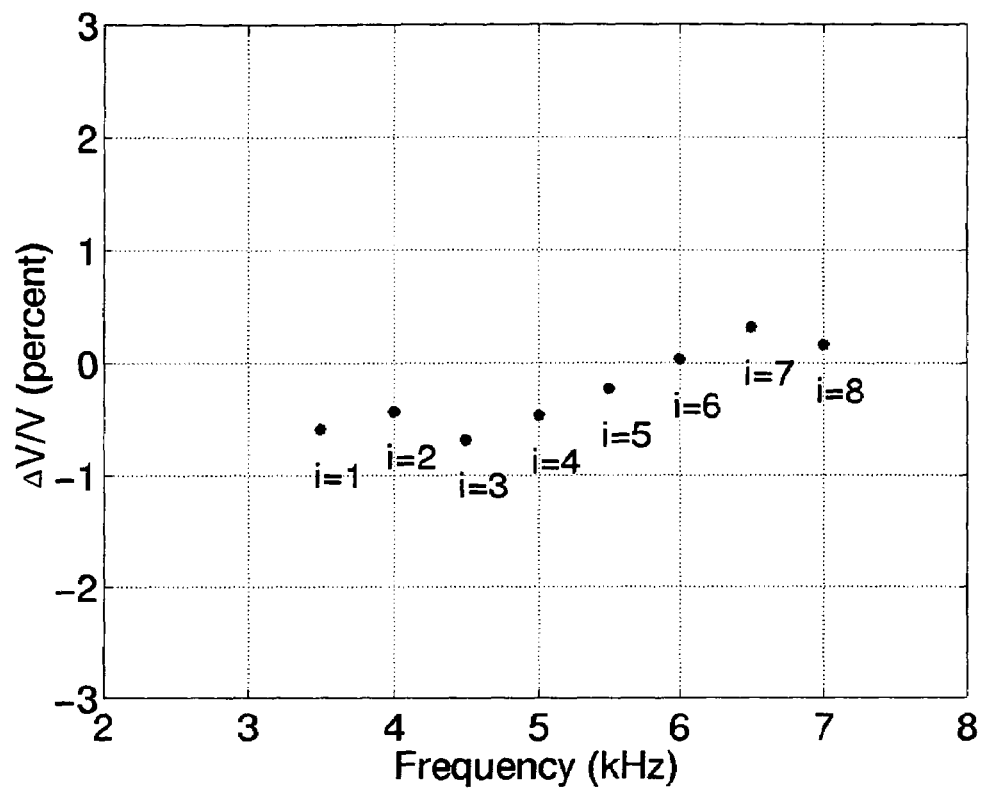
Figure 26D:
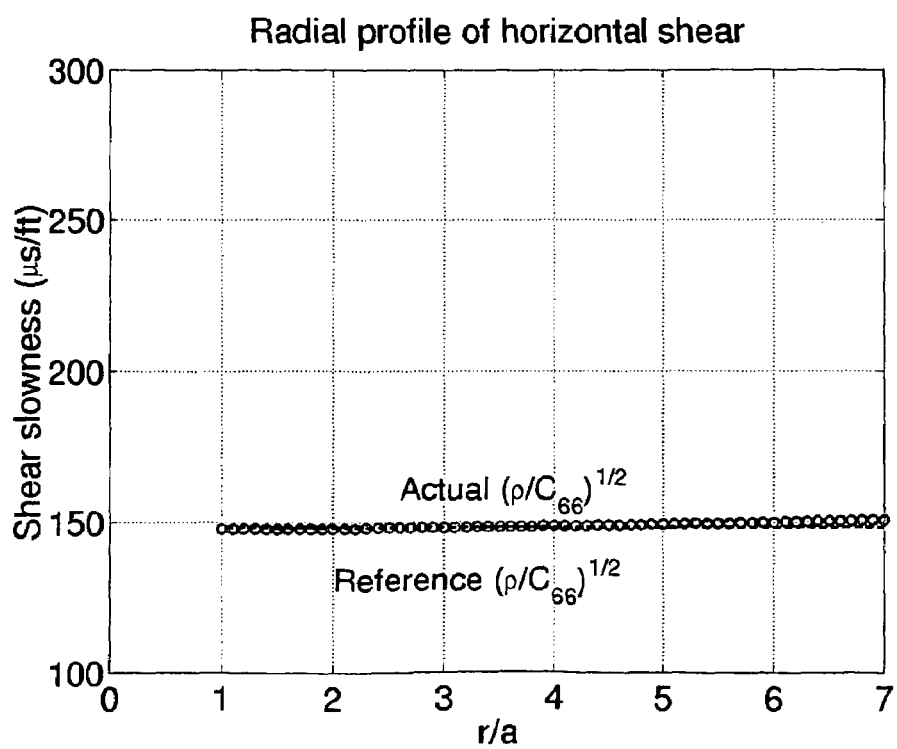
Figure 27A:
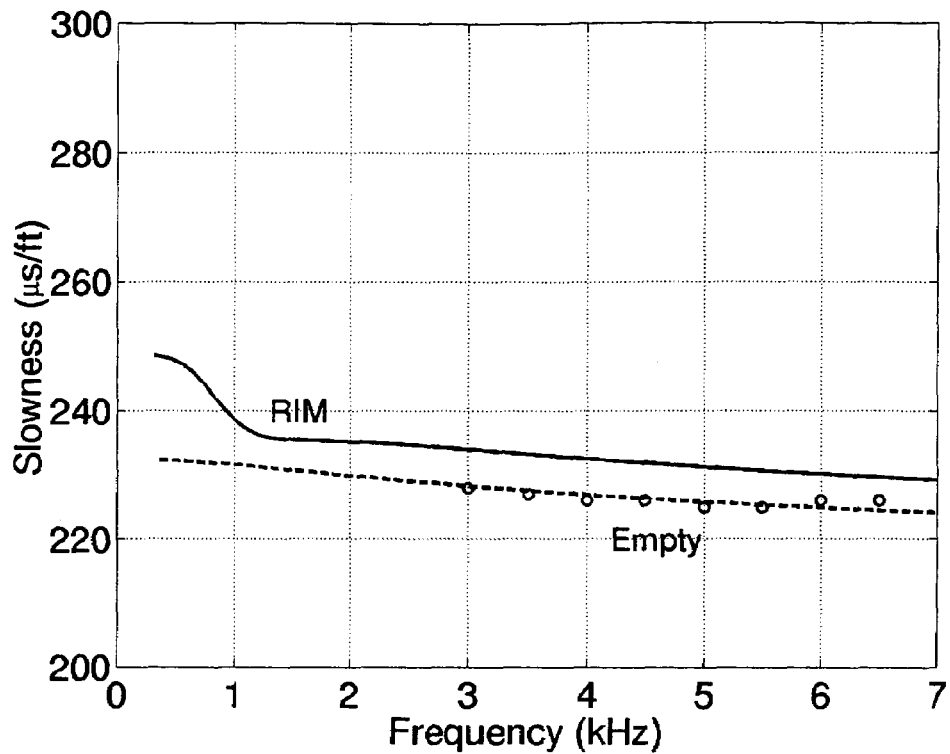
FIGS. 27a-27d illustrate a Stoneley radial profile of horizontal shear slowness using the RIM model for an acoustic tool in a well of known parameters at a depth of 1108.5 feet.
Figure 27B:
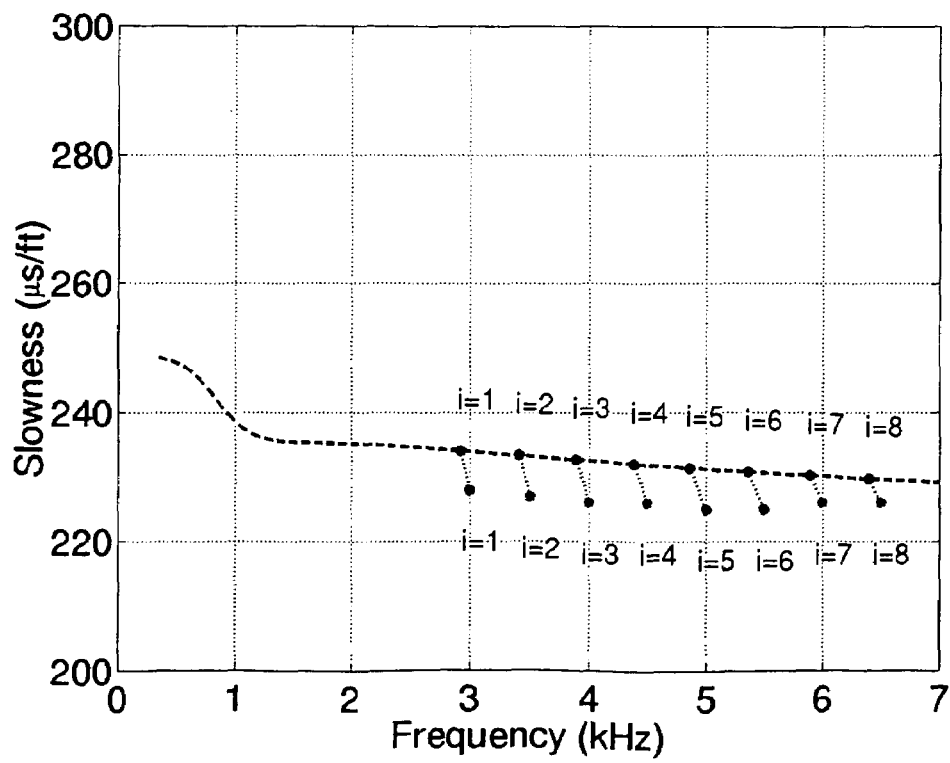
Figure 27C:
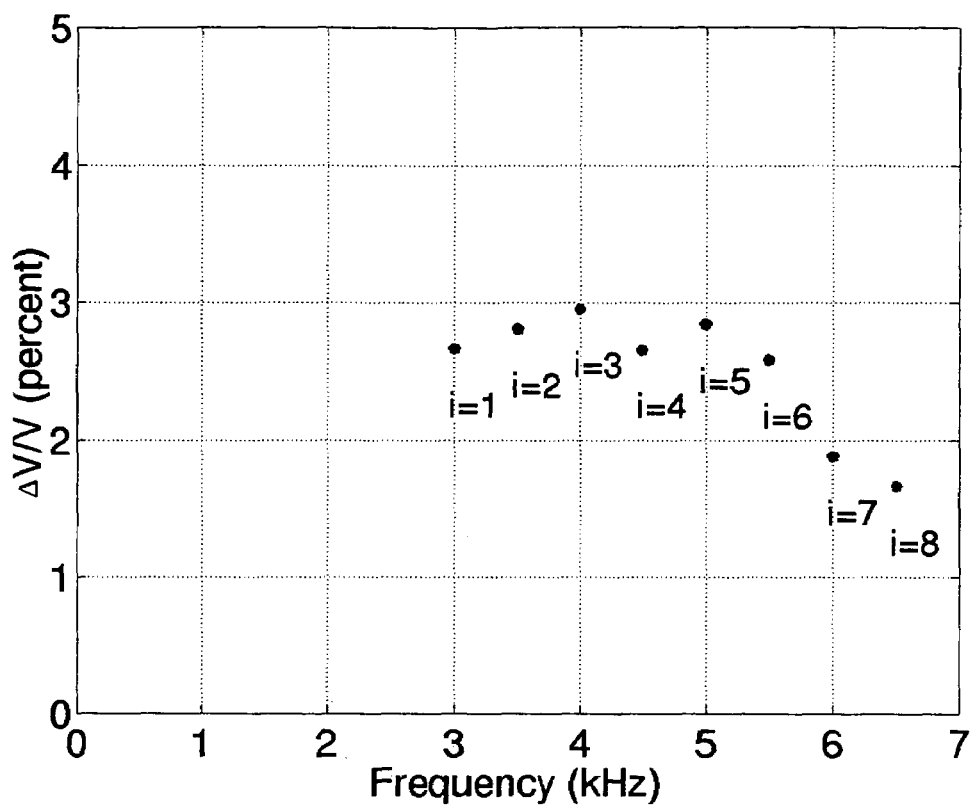
Figure 27D:
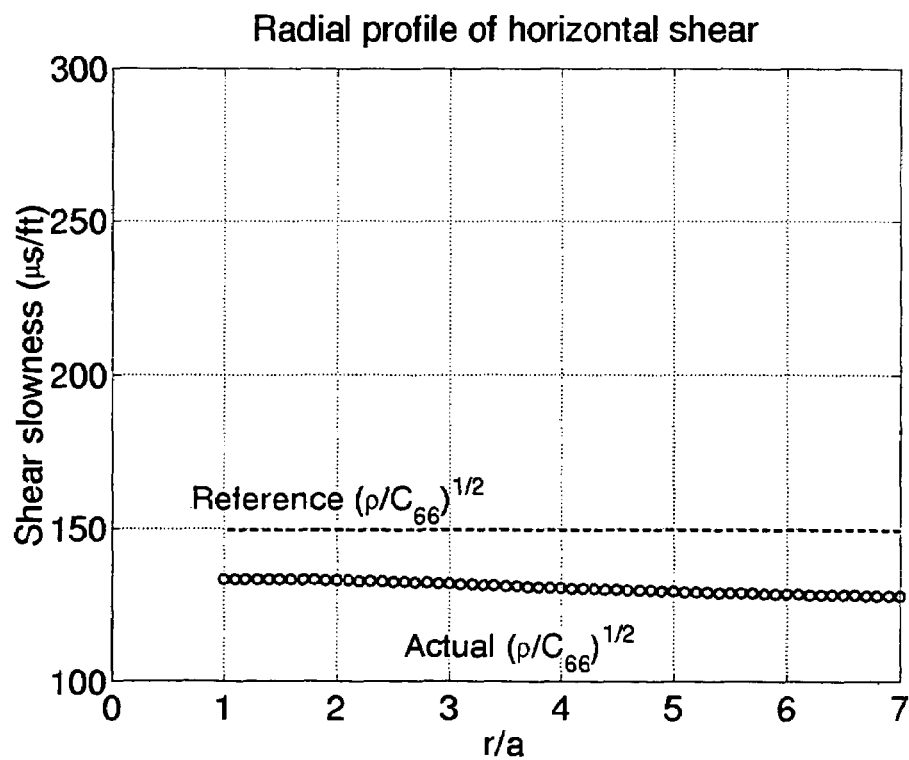
Figure 28A:
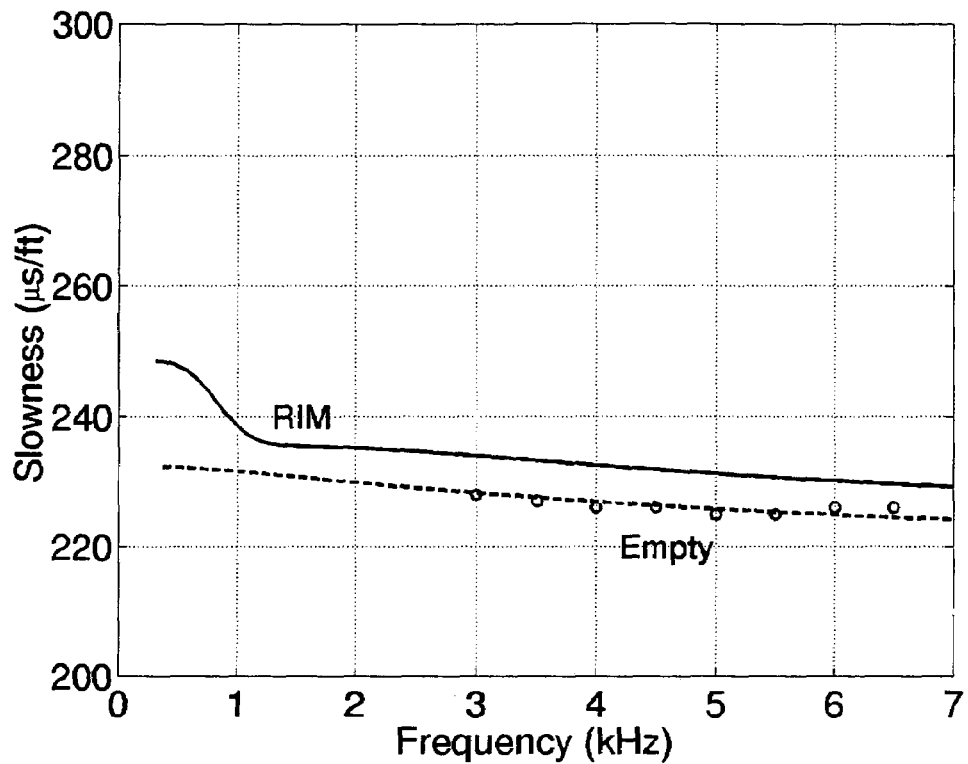
FIGS. 28a-28d illustrate a Stoneley radial profile of horizontal shear slowness using an empty borehole model for an acoustic tool in a well of known parameters at a depth of 1108.5 feet.
Figure 28B:
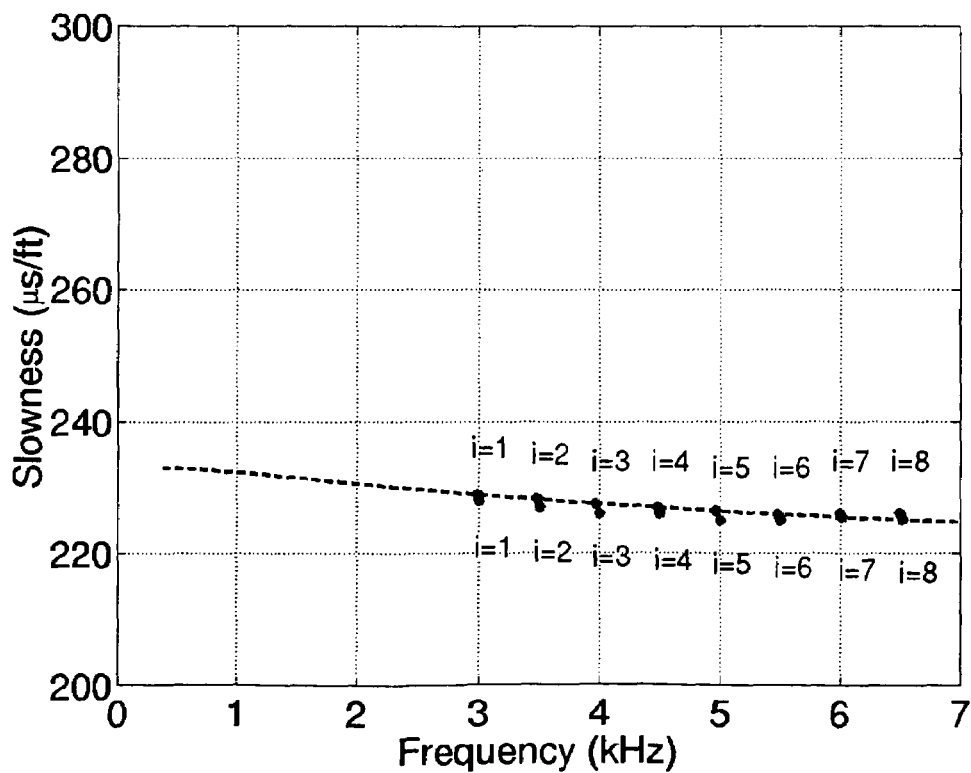
Figure 28C:
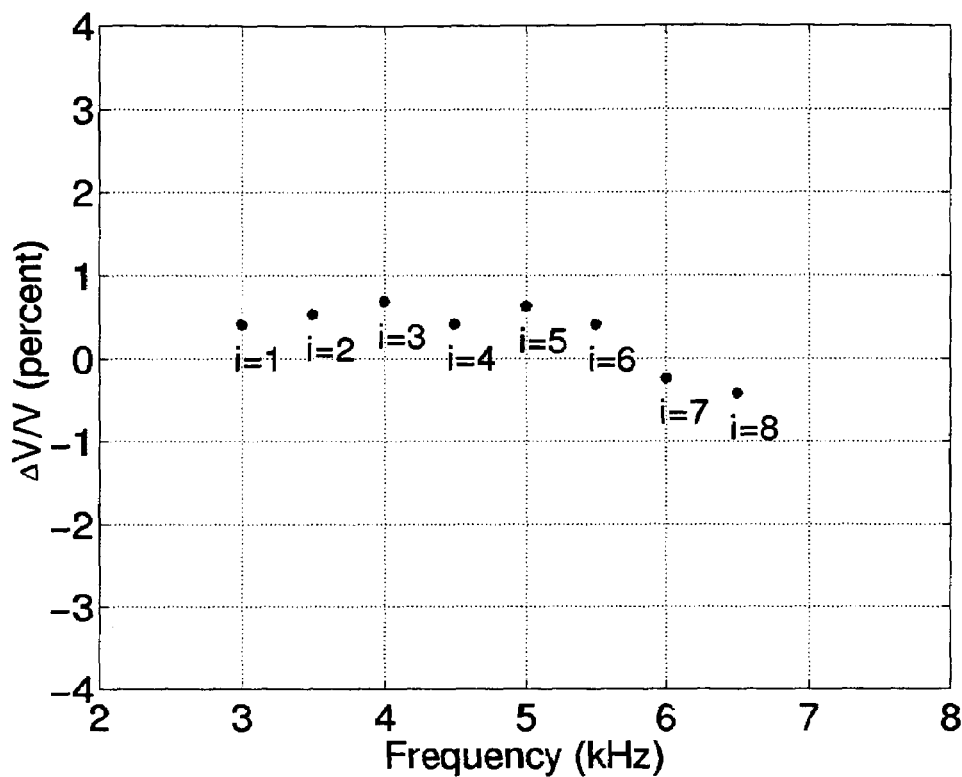
Figure 28D:
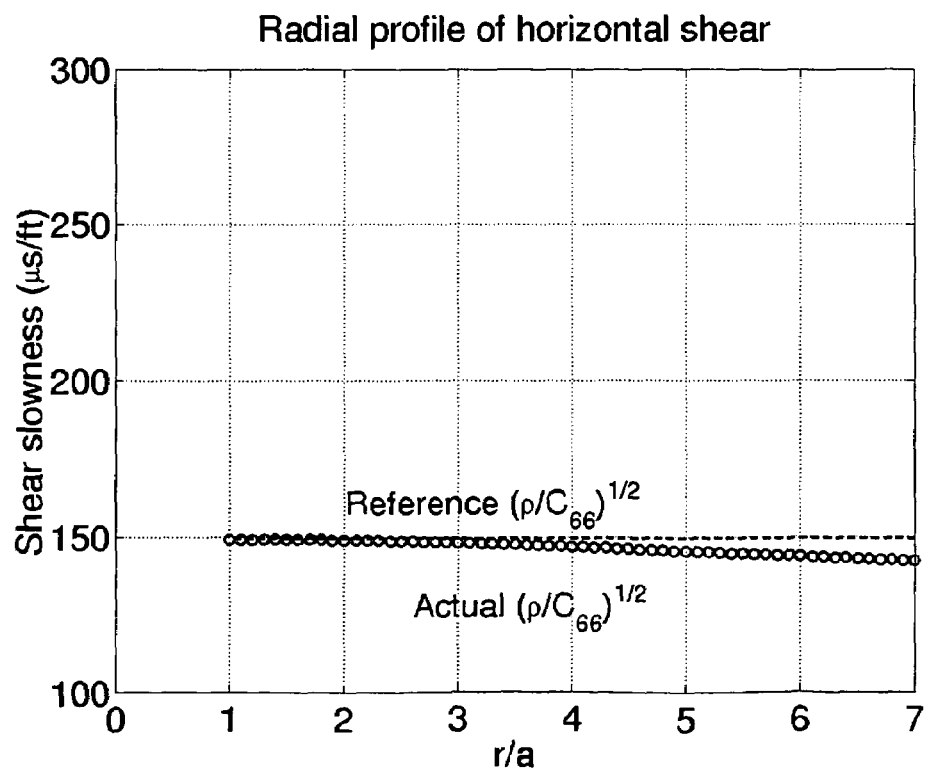

FIGS. 21*a*-21*d* and 22*a*-22*d* show results obtained from the Stoneley data at a depth of 724.5 ft. The layout and notation in these Figures are the same as that found in FIGS. 19*a*-19*d* and 20*a*-20*d*, respectively. While the radial profile of horizontal shear slowness obtained using the resonance-impedance model in FIG. 21*d* is essentially uniform, results obtained using an empty borehole model show a significant near-wellbore alteration in FIG. 22*d*. Results shown in FIGS. 21*a*-21*d* using the resonance-impedance model are more meaningful than those in FIGS. 22*a*-22*d*.

Similarly, FIGS. 23*a*-23*d* and 24*a*-24*d* show results obtained from the Stoneley data at depth 792 ft using the RIM and empty borehole models, respectively. Again the layout and notation in these figures are the same as in FIGS. 19*a*-19*d* and 20*a*-20*d*. The resonance-impedance model shows some degree of near-wellbore stiffening in FIG. 23*d*, whereas the empty borehole model shows a significantly lesser amount of near-wellbore stiffening of the formation. The far-field horizontal shear slowness estimates are about the same in the two cases.

FIGS. 25*a*-25*d* and 26*a*-26*d*, respectively, show similar results obtained from the Stoneley data at depth 920 ft using the RIM and empty borehole model. Since the Stoneley data at the lowest frequency of 3.5 kHz is somewhat high, we do not observe a steady-state far-field shear slowness in FIG. 25*d*. There is an evidence of near-wellbore stiffening that extends up to about three times borehole diameter. In contrast, radial profile of the horizontal shear slowness obtained from the empty borehole model exhibits almost no radial variation in FIG. 26*d*.

Continuing with additional illustrative examples, results are obtained from the Stoneley data at a depth of 1108.5 ft in FIGS. 27*a*-27*d* and 28*a*-28*d*, respectively, using the RIM and empty borehole model. Similar to the results at depth 920 ft, we observe that the radial profile of horizontal shear slowness obtained from the resonance-impedance model shows some degree of near-wellbore stiffening, whereas the radial profile obtained from an empty borehole model is essentially uniform.

Sensitivity and Radial Depth of Investigation

The sensitivity and radial depth of investigation of data kernels $G_i(r)$ associated with the Stoneley mode vary significantly with formation parameters and borehole diameters for the resonance-impedance and empty borehole models. The magnitude of data kernel shows sensitivity of fractional changes in the Stoneley dispersion to fractional changes in shear modulus at various radial positions.

Figure 29A:
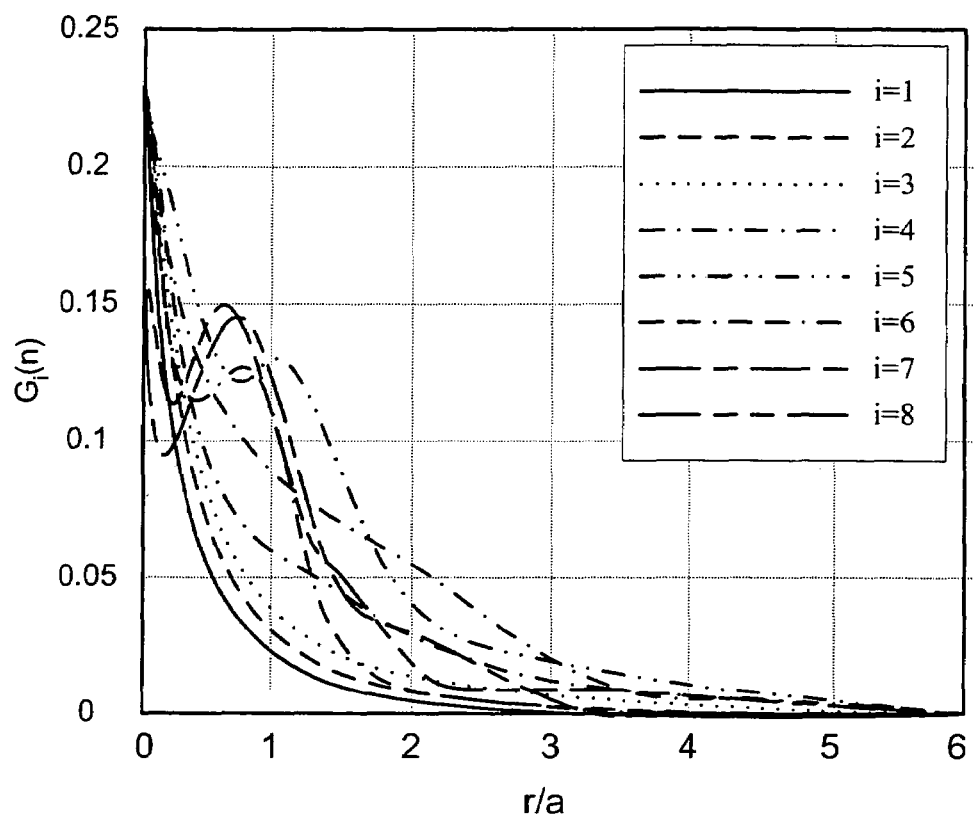
FIGS. 29a-29d illustrate data kernels and an averaging weight function at a depth of 590 feet according to one embodiment of the present invention.
Figure 29B:
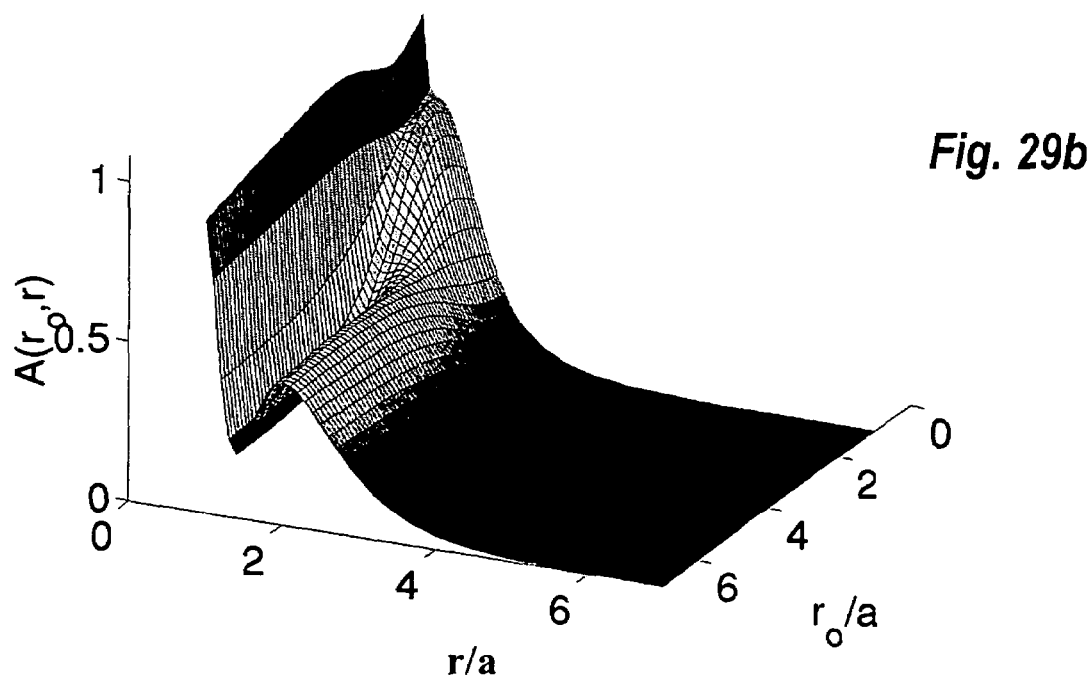
Figure 29C:
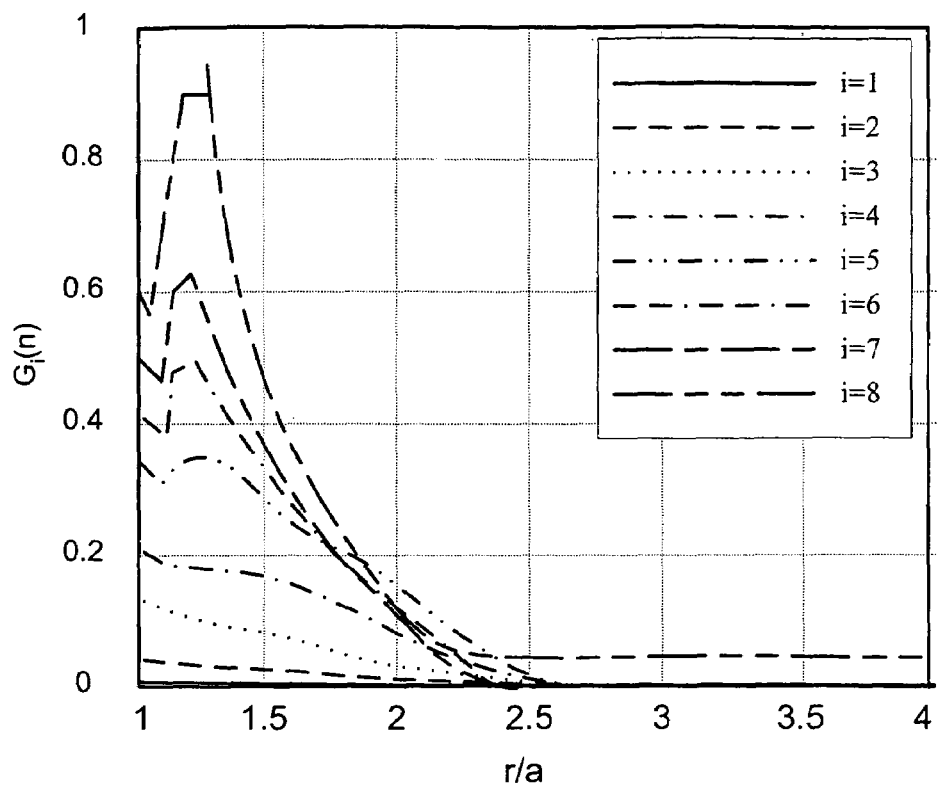
Figure 29D:
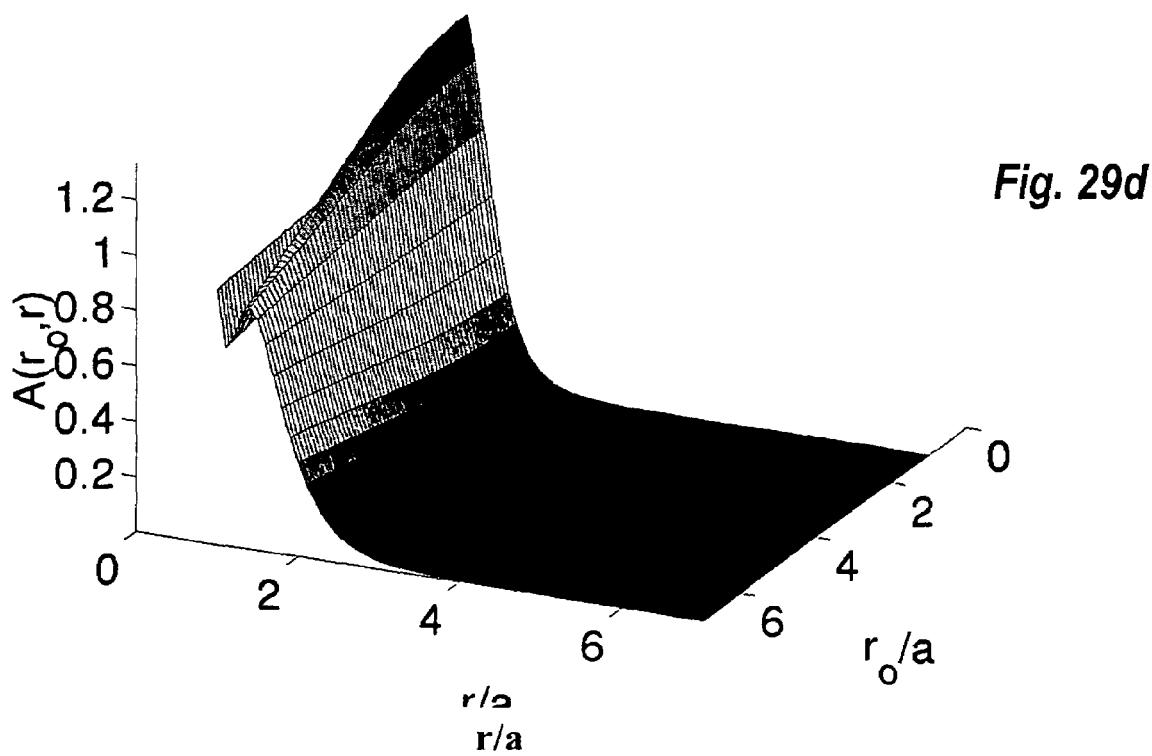
Figure 30A:
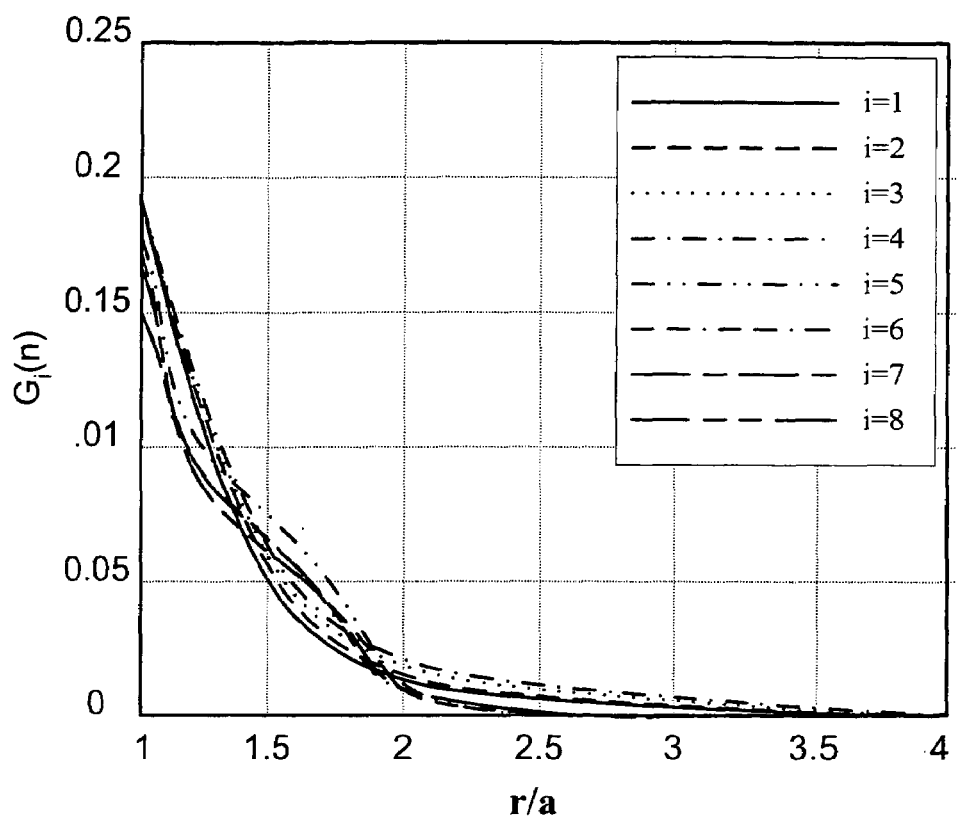
FIGS. 30a-30d illustrate data kernels and an averaging weight function at a depth of 920 feet according to one embodiment of the present invention.
Figure 30B:
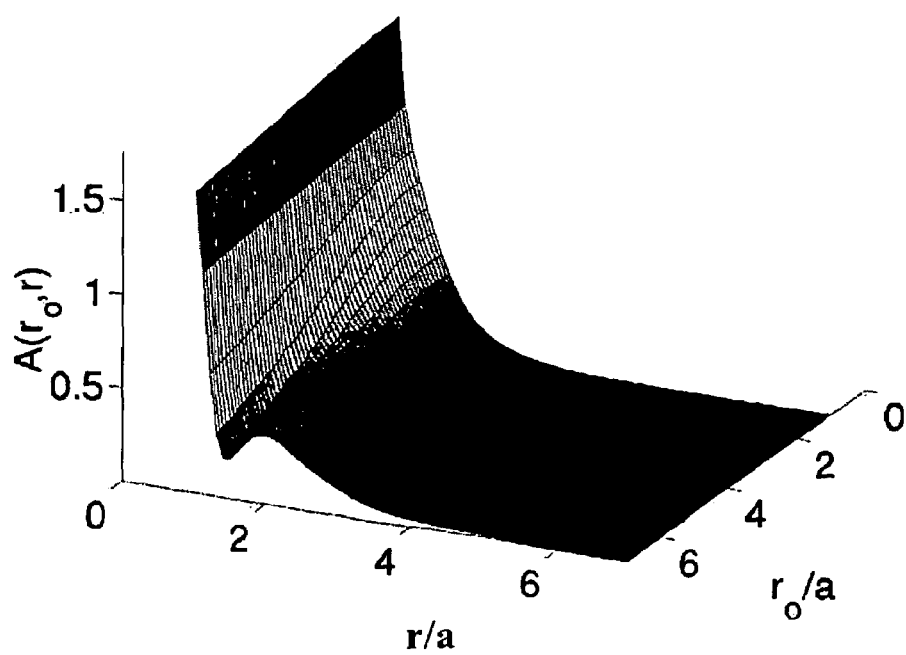
Figure 30C:
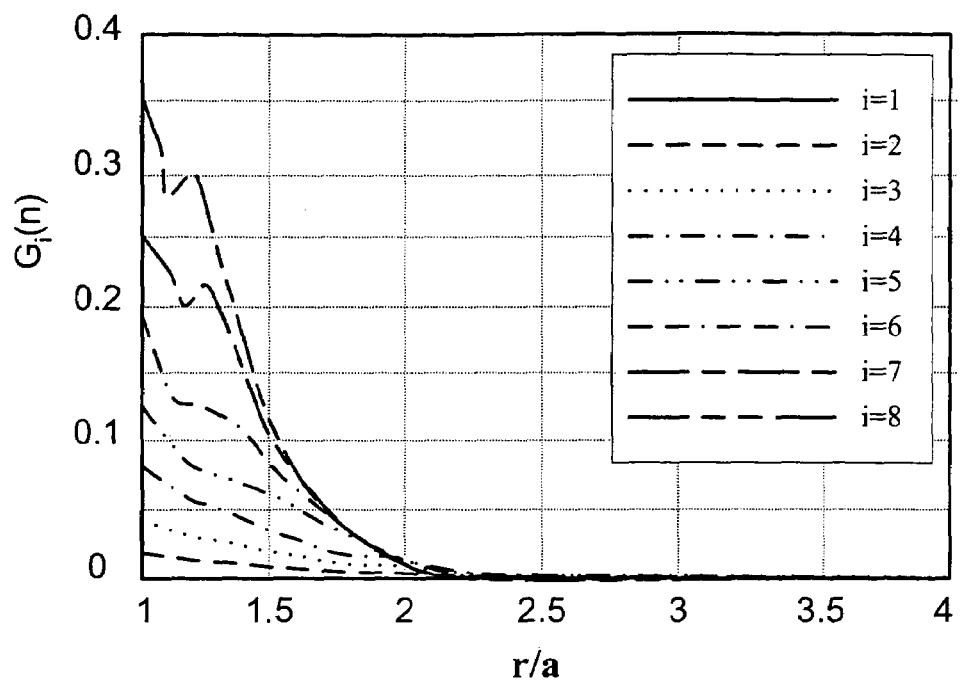
Figure 30D:
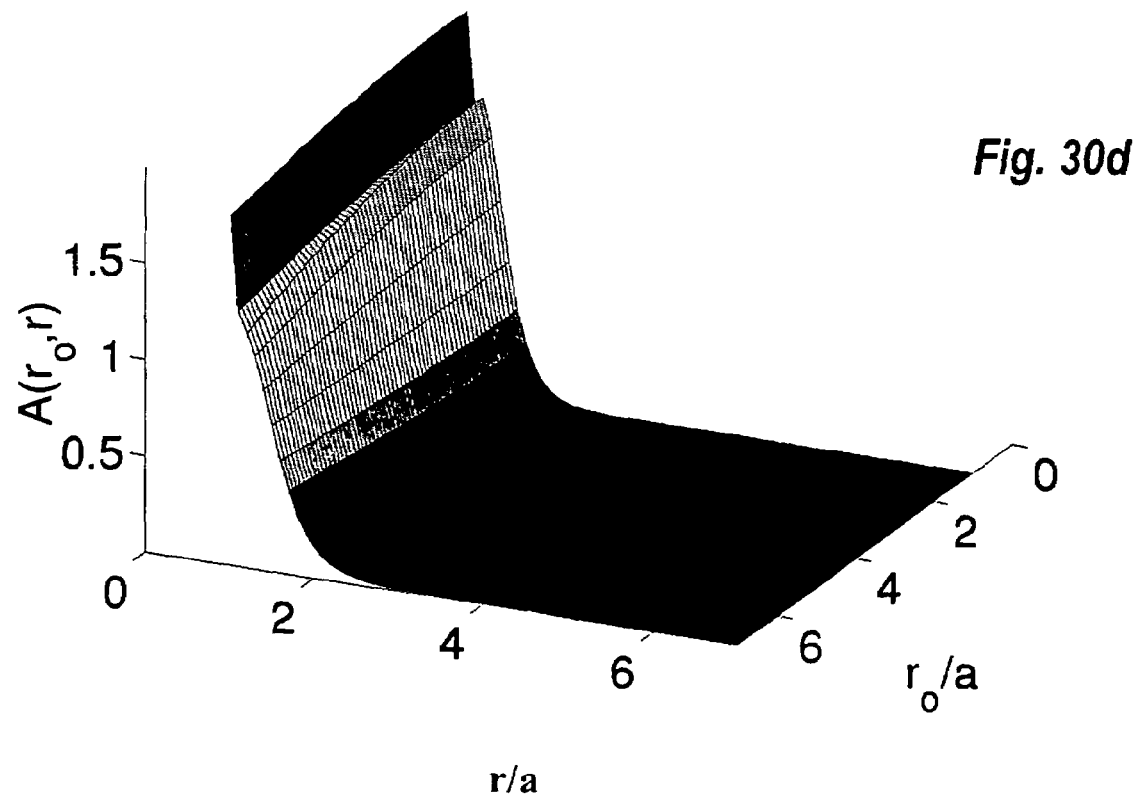
Figure 31A:
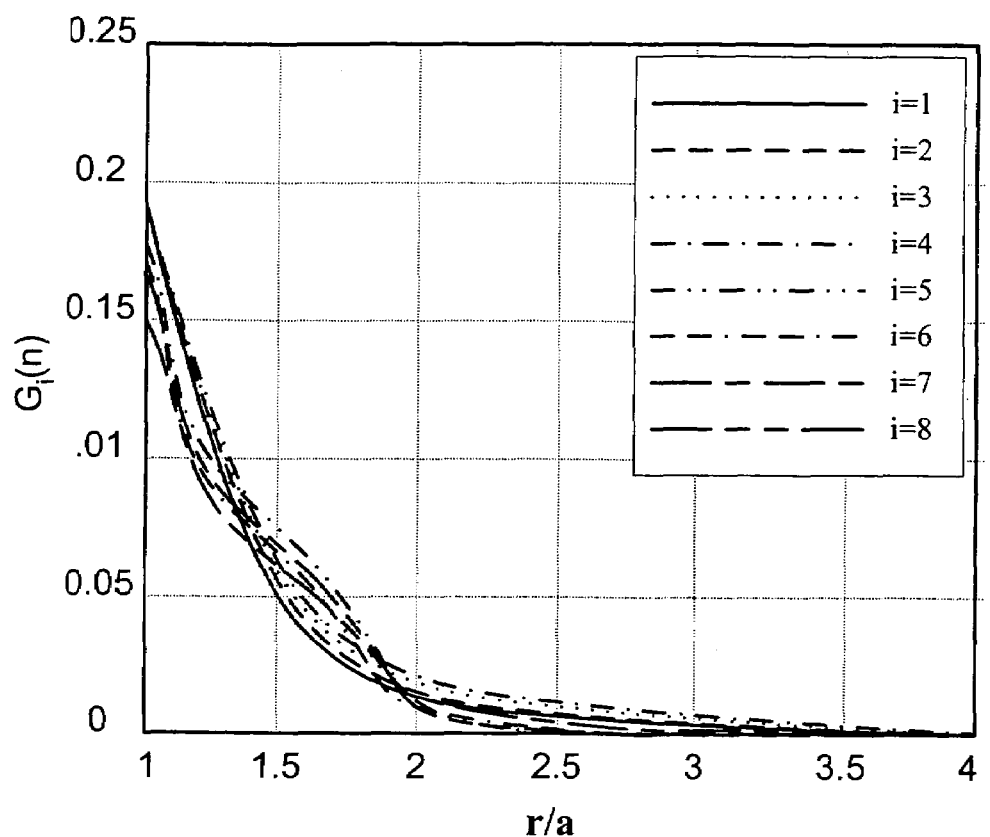
FIGS. 31a-31d illustrate data kernels and an averaging weight function at a depth of 1108.5 feet according to one embodiment of the present invention.
Figure 31B:
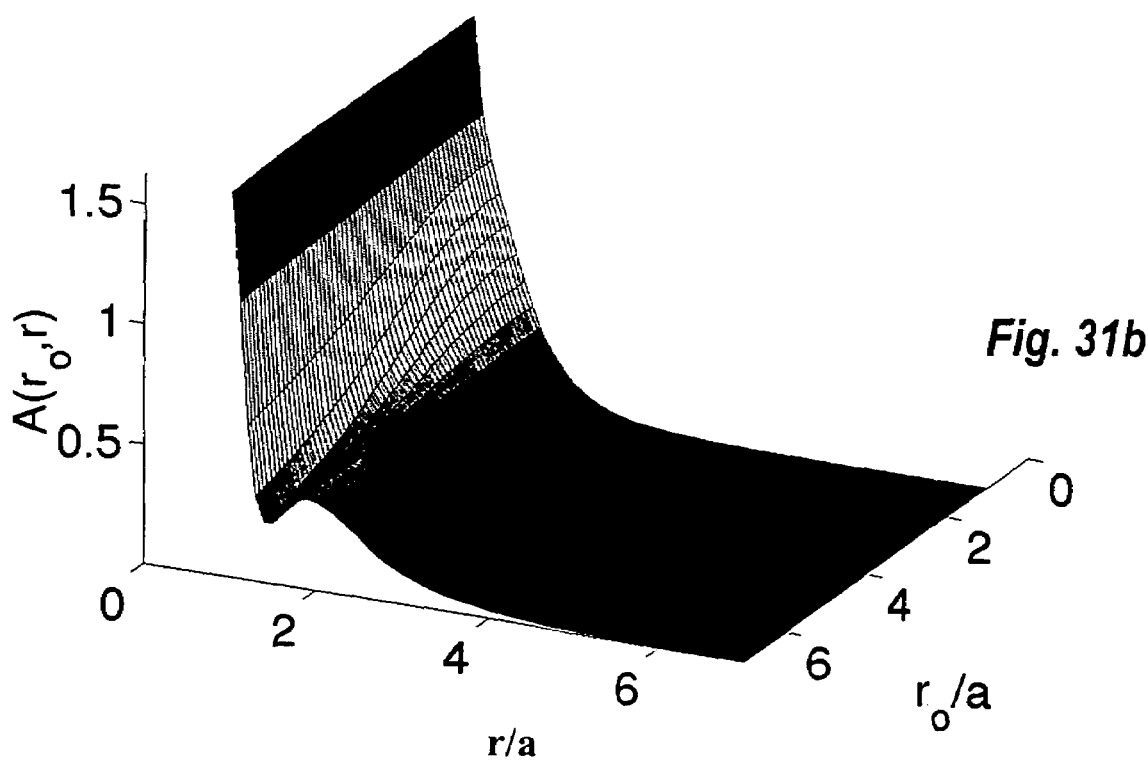
Figure 31C:
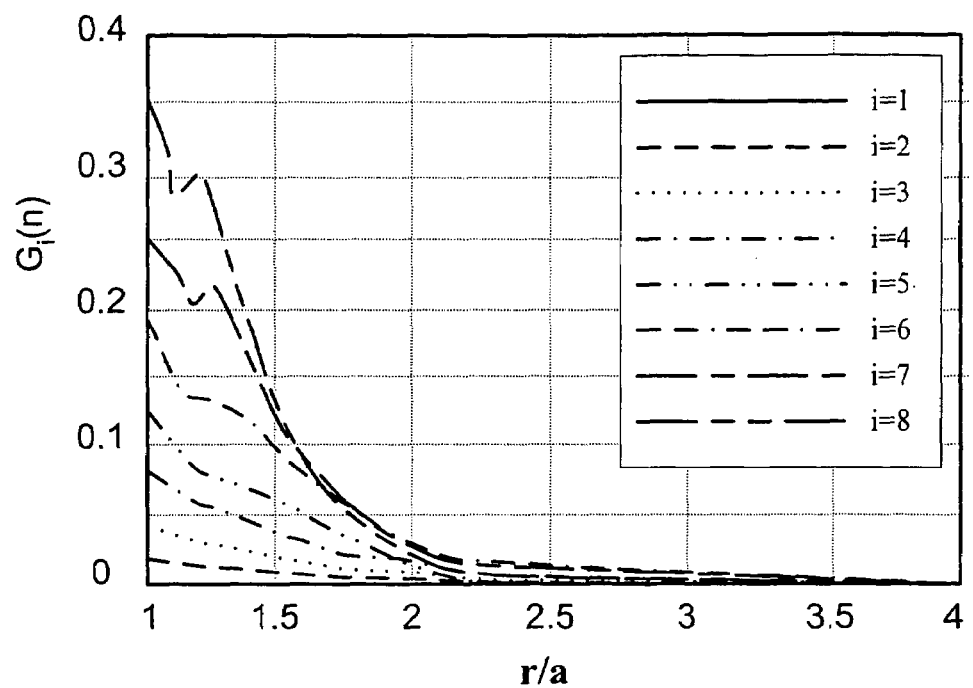
Figure 31D:
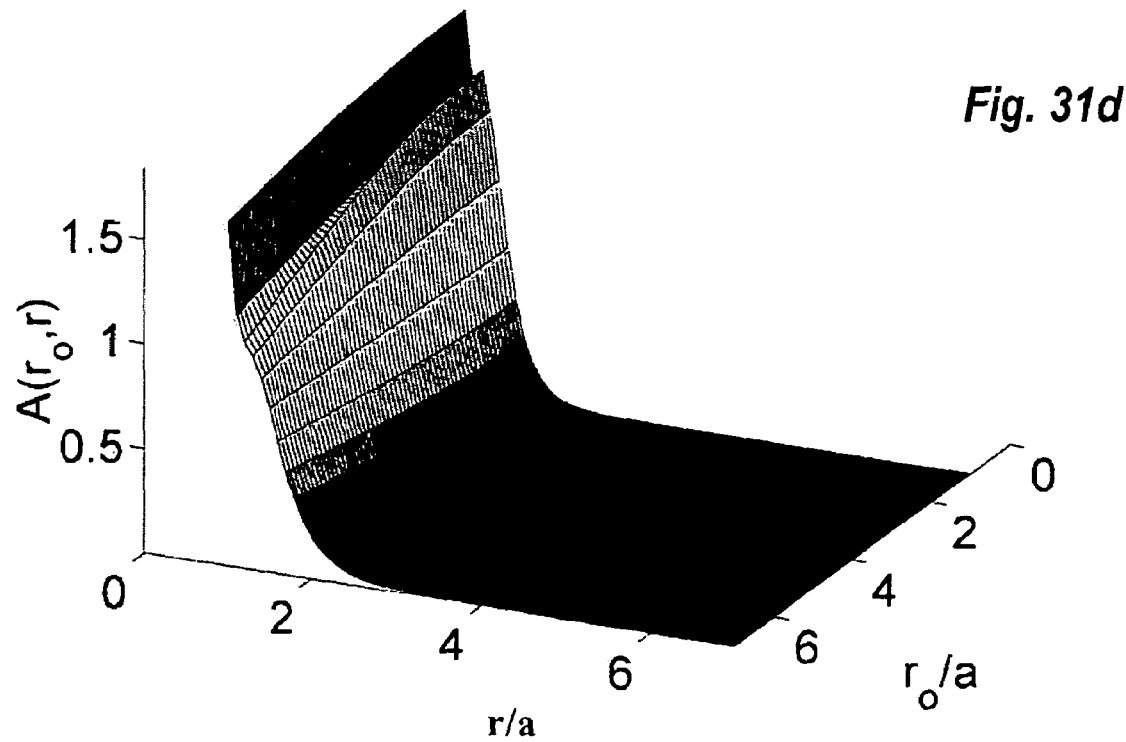
Figure 32A:
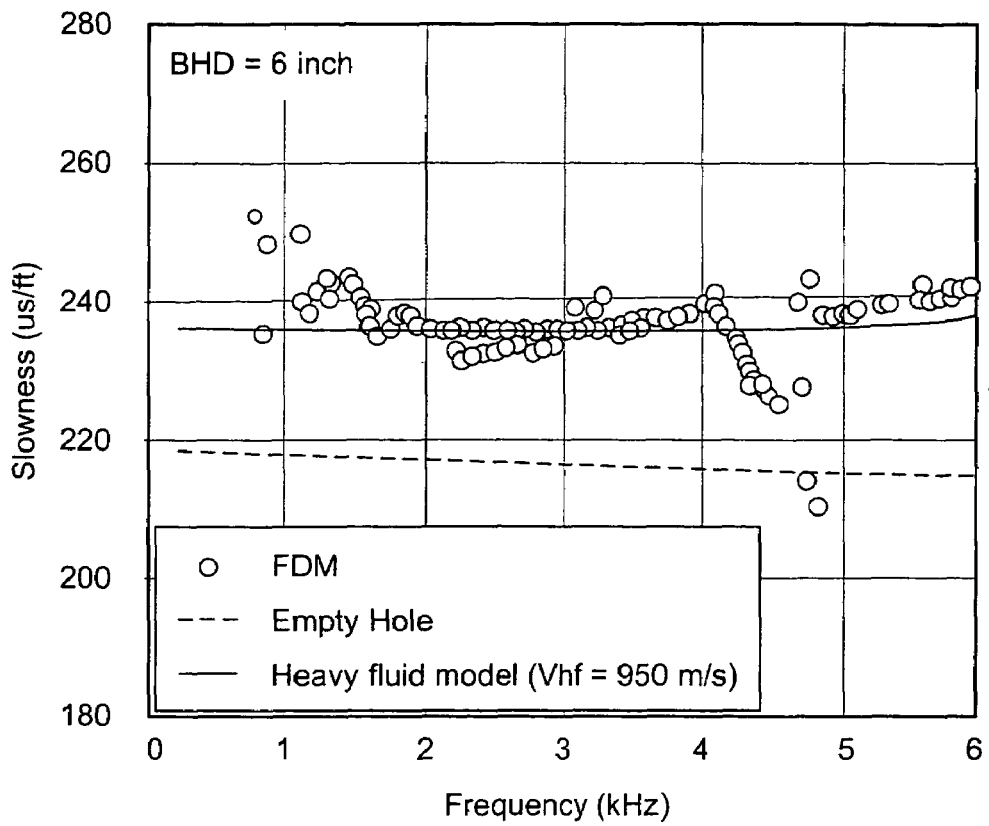
FIGS. 32a-32d illustrate a comparison of predictions of Stoneley dispersions for various formation parameters of a fast formation, using an empty borehole, a heavy-fluid, and a finite-difference model of a sonic tool.
Figure 32B:
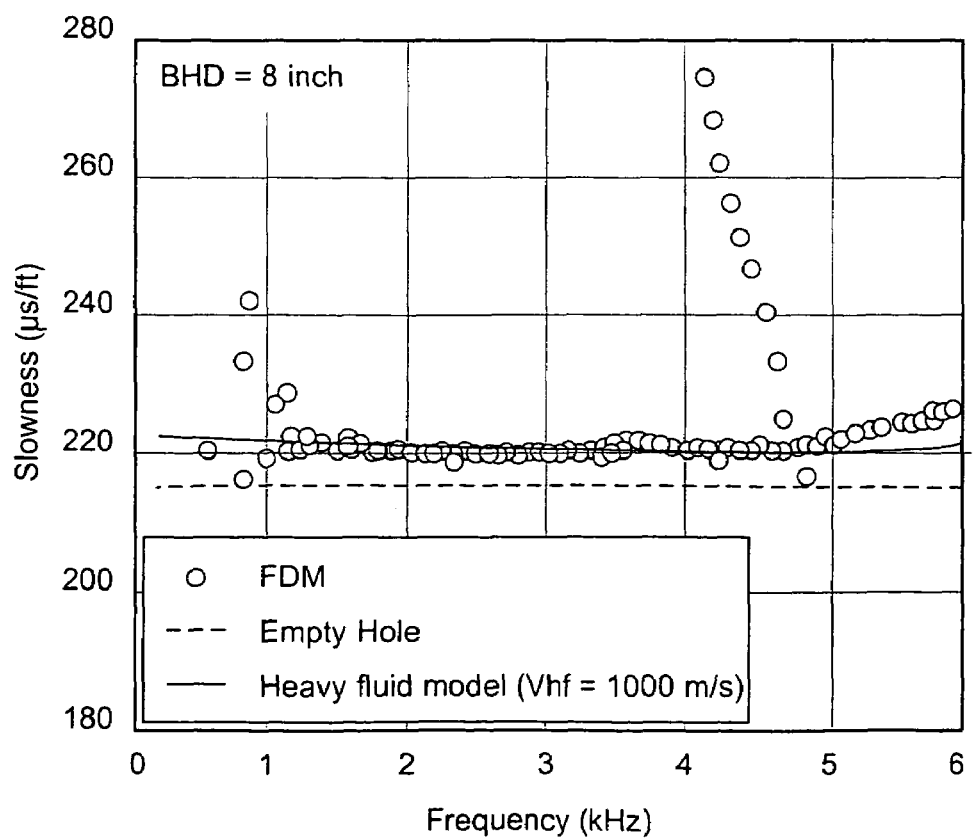
Figure 32C:
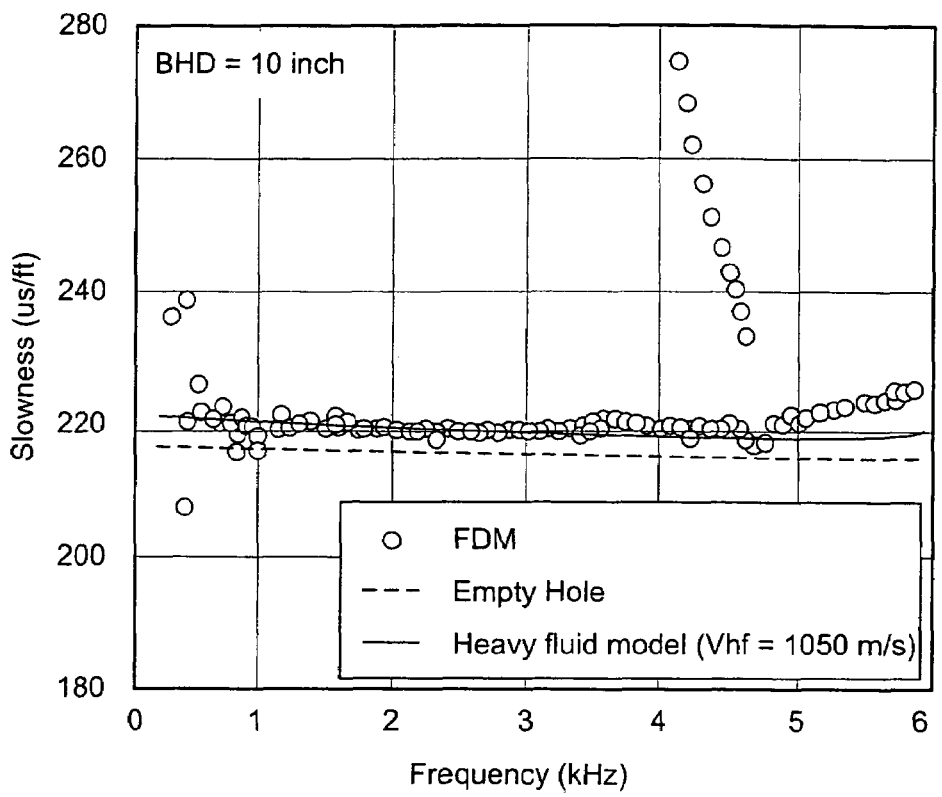
Figure 32D:
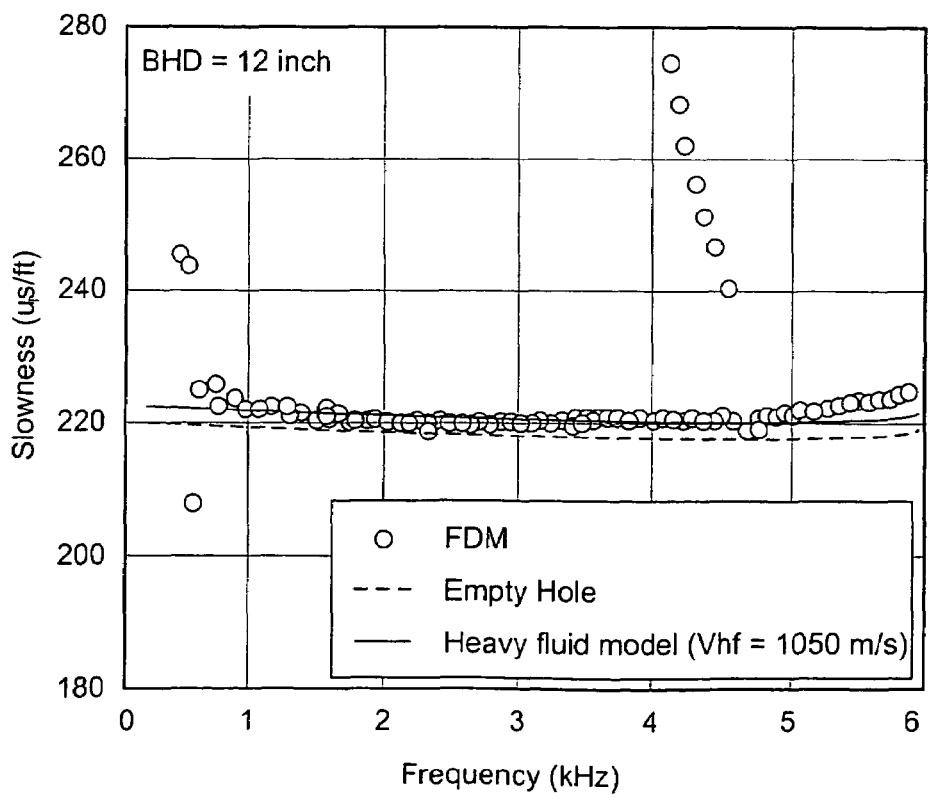
Figure 33A:
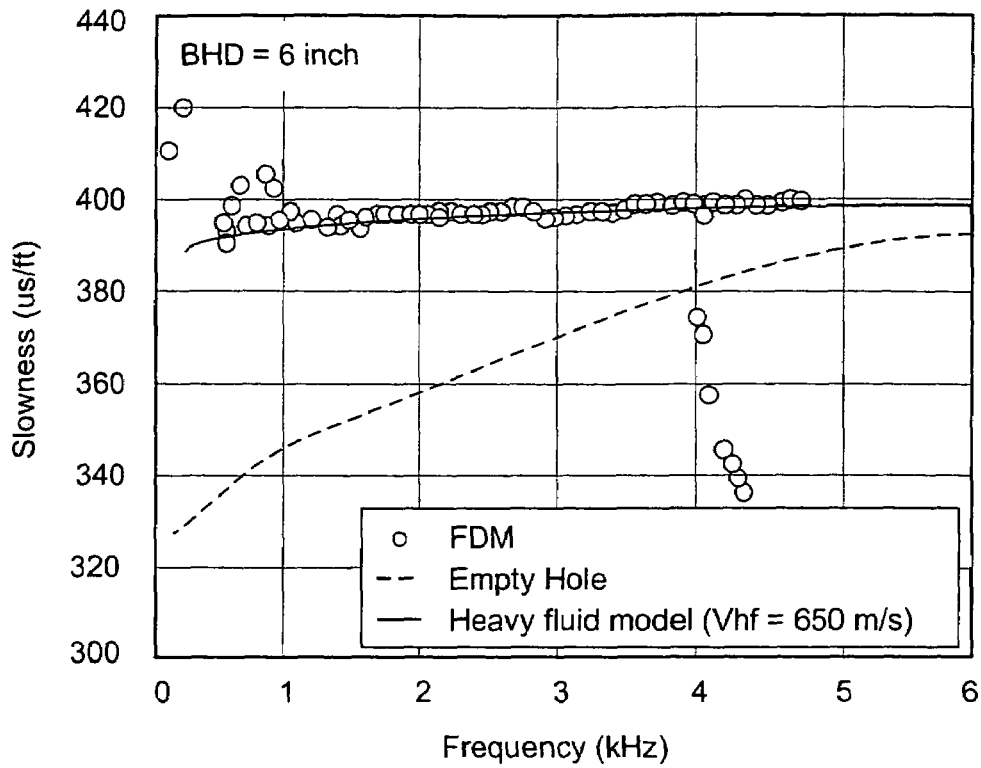
FIGS. 33a-33d illustrate a comparison of predictions of Stoneley dispersions for various formation parameters of a slow formation, using an empty borehole, a heavy-fluid, and a finite-difference model of a sonic tool.
Figure 33B:
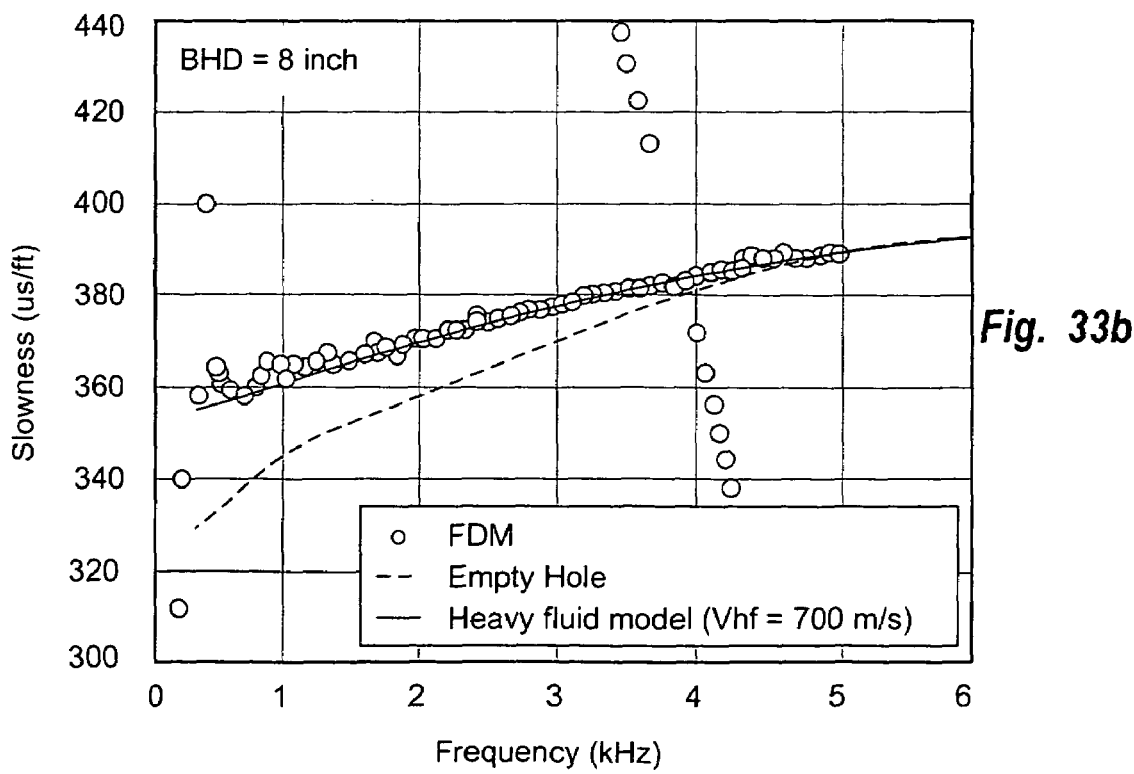
Figure 33C:
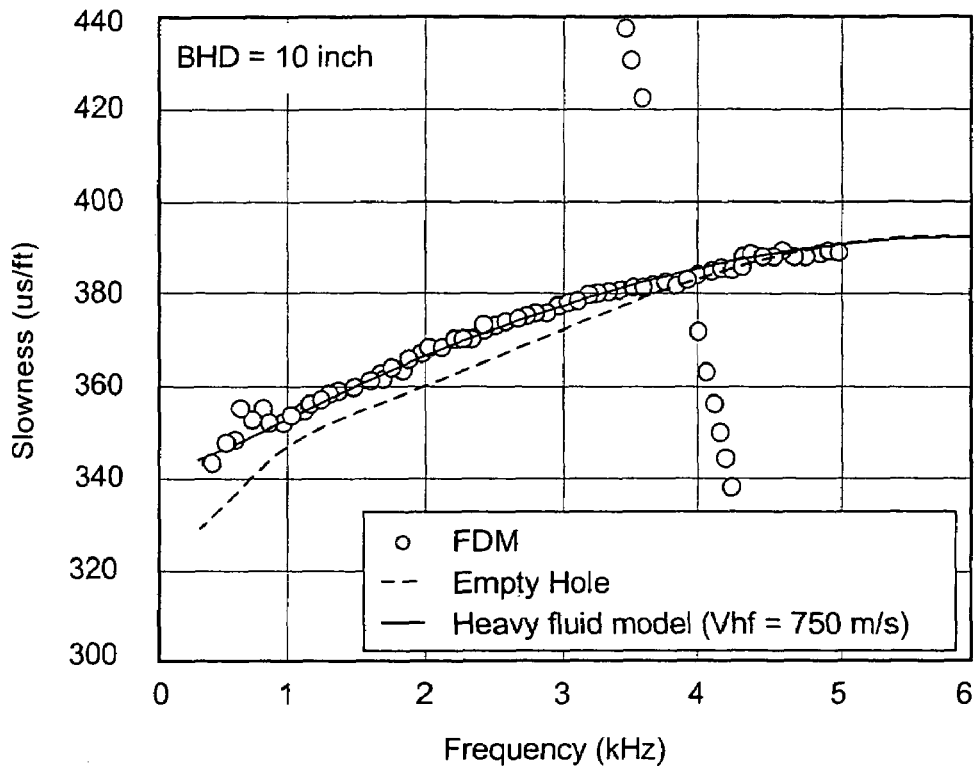
Figure 33D:
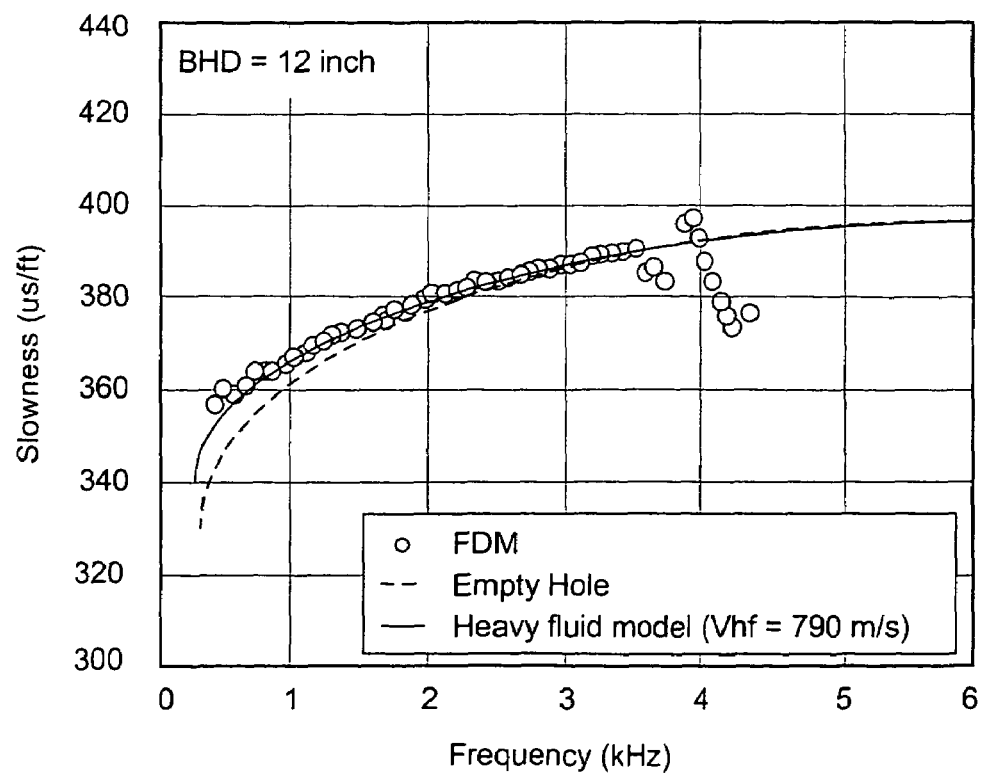

FIG. 29a shows a radial variation of data kernels $G_i$ for the Stoneley mode at eight different frequencies (i=1, 2, 3, ... 8) in the presence of an acoustic (MSIP) tool simulated by the RIM. Results for the formation parameters are at depth 590 ft. FIG. 29b shows the averaging weight function $A(r_o,r)$ that was been used for estimating the horizontal shear slowness at various radial positions. In contrast, FIG. 29c displays radial variation of data kernels $G_i$ for the Stoneley mode at the same eight frequencies for the empty borehole model. Similar to FIG. 29b, the averaging weight function $A(r_o,r)$ for the empty borehole model is shown in FIG. 29d.

FIGS. 30a-30d and 31a-31d, respectively, show similar plots for the data kernel and averaging function associated with the radial profile of horizontal shear slowness as a function of radial position for depths 920 and 1108.5 ft, respectively.

Generally speaking, one observes that the low-frequency data kernels for the resonance-impedance model possess larger magnitude and radial depth of investigation than those for the empty borehole model. In contrast, the high-frequency data kernels exhibit larger magnitude for the empty borehole model than those for the resonance-impedance model. In addition, the radial depth of investigation of the data kernel for the resonance-impedance model is larger than that for the empty borehole model.

SRP of Horizontal Shear Slowness

One procedure for the detection and estimation of mechanical alteration caused by radial variation of horizontal shear slowness around a borehole comprises: selecting a depth interval; measuring or estimating borehole diameter d with, for example, a standard 4- or 6-arm caliper; measuring or estimating mud compressional velocity $V_f$, from, for example, the mud composition, mass density, in-situ pressure and temperature; measuring or estimating formation mass bulk density $\rho_b$ and mud mass density $\rho_f$ from, for example the drilling mud weight used in the depth interval of interest; determining the formation compressional velocity $V_p$ in the (far-field) region outside any mechanically altered annulus from a standard sonic log; and estimating an initial guess of formation shear modulus $c_{66}$ using the measured Stoneley velocity at the lowest frequency from the equation:

$$c_{66} = \frac{V_T^2 \rho_f V_f^2}{(V_f^2 - V_T^2)}, \tag{98}$$

where $V_T$ is the measured Stoneley velocity at frequency $f_1$. $\rho_f$ is the borehole fluid (mud) mass density, and $V_f$ is the borehole fluid compressional velocity.

According to some aspects of the invention, however, the tube wave velocity expression for the acoustic tool resonance-impedance model can be used, which yields:

$$\frac{1}{c_{66}} = \frac{(1-\phi)}{\rho_f}\left(\frac{1}{V_T^2} - \frac{1}{V_f^2}\right) - \phi \text{Real}(C_{tool}), \tag{99}$$

where $$\phi = \frac{b^2}{a^2}. \tag{100}$$

and real part of $C_{tool}$ is defined in Eq. (84) at the chosen frequency $f_1$, corresponding to the measured Stoneley velocity $V_T$.

An initial guess of the formation shear velocity (or slowness) may be selected using either Eq. (98) or Eq. (99) so that the reference Stoneley dispersion for an equivalent homogeneous and isotropic formation is rather close to the measured dispersion. Consequently, Eq. (99) may be used to account for the acoustic tool effects that can be quite large in fast formations and small borehole diameters.

A reference shear velocity $V_S$ is calculated for an equivalent isotropic formation using the equation:

$$V_s = \left(\frac{c_{66}}{\rho_b}\right)^{\frac{1}{2}} \tag{101}$$

The method may further include determining four acoustic tool parameters, C, $C_{inf}$, $\omega_o$, and $\gamma$ for the resonance-impedance model from a calibration experiment; calculating a reference Stoneley dispersion for an assumed homogeneous, isotropic formation with the five parameters (d, $V_f$, $V_p$, $V_S$ and $\rho_b/\rho_f$) obtained from steps described above together with the four resonance-impedance model parameters; comparing the measured Stoneley dispersion at a chosen depth with the reference Stoneley dispersion in the previous step.

Any observed difference between the measured and reference borehole Stoneley dispersions is a potential indicator of radially varying formation properties. Therefore, in the presence of a difference between the measured and reference borehole Stoneley dispersions, a number of Stoneley velocity data sets at several frequencies is selected from the measured Stoneley dispersion. These velocity data sets may be sufficiently separated in frequency so that they are uncorrelated. A frequency separation of about 200 Hz is generally adequate. Corresponding axial wave numbers $k_i$ are calculated by:

$$k_i = \frac{2\pi f_i}{V_i} \tag{102}$$

where $V_i$ is the measured Stoneley velocity at frequency $f_i$.

Fractional changes in the measured Stoneley velocities from those in the reference dispersion calculated above for selected axial wave numbers obtained from Eq. (102) are calculated. A fractional change in the Stoneley velocity is given by:

$$\frac{\Delta V_i}{V_i} = \frac{(V_i^{measured} - V_i^{reference})}{V_i^{reference}} \tag{103}$$

where i=1, 2, ..., n, and n denotes the number of axial wavenumbers calculated according to Eq. (102).

The kernel $G_i(r)$ at a selected wave number $k_i$ is calculated in terms of the Stoneley wave eigenfunction in the reference state defined above. The borehole axis is assumed to be parallel to the $X_3$-axis. The kernel $G_i(r)$ relates a fractional change in the Stoneley velocity at a given axial wavenumber $k_i$ from that in the isotropic, homogeneous reference state to a corresponding fractional change in the horizontal shear modulus $c_{66}$:

$$\frac{\Delta V_i}{V_i} = \int_a^\infty G_i \frac{\Delta c_{66}(r)}{c_{66}} r dr, \qquad (104)$$

where $a=d/2$, is the borehole radius, and $i=1, 2, \ldots, n$.

A description of a procedure for determining the kernel $G_i$ is given by Sinha (Sinha, B. K., *Sensitivity and inversion of borehole flexural dispersions for formation parameters*, GEOPHYSICAL JOURNAL INTERNATIONAL. Vol. 128 No. 1, pp. 84-96 (January 1997); Hsu, C. J. and Sinha, B. K., *Mandrel effects on the dipole flexural mode in a borehole*, J. Acoust. Soc. Am., Vol. 104 No. 4, pp. 2025-2039 (October 1998)) and is known to those of skill in the art having the benefit of this disclosure.

The integrals below are calculated according to:

$$u_i = \int_a^\infty G_i(r) dr, \qquad (105)$$

$$S_{ij}(r_0) = \int_a^\infty (r - r_0) G_i(r) G_j(r) dr \qquad (106)$$

where $r_o$ denotes the radial position in the formation; $i, j=1, 2, \ldots, n$, and $a$ is the borehole radius.

$$a_i(r_o) = \frac{S_{ij}^{-1}(r_o) u_j}{u_i S_{ij}^{-1}(r_o) u_j}, \qquad (107)$$

where $a_i$ is the weighting coefficient of the data kernel $G_i(r)$, and $u_i$ is the integral of the data kernel $G_i(r)$ as shown above and denotes the sensitivity of the measured shear velocity $V_i^{measured}$ to radial variations in the shear modulus $c_{66}$.

A fractional change in the horizontal shear modulus $c_{66}$ can then be calculated from the relation:

$$\frac{\Delta c_{66}(r_0)}{c_{66}} = a_i(r_0) \frac{\Delta V_i}{V_i}, \qquad (108)$$

where $\Delta V_i / V_i$ are known at selected axial wavenumbers $k_i$, from Eq. (102).

Radial variation in the formation horizontal shear modulus can then be calculated from the relation:

$$c_{66}(r_0) = \left(1 + \frac{\Delta c_{66}(r_0)}{c_{66}}\right) c_{66}, \qquad (109)$$

Radial variation in the formation horizontal shear velocity $V_{hs}$ is then calculated from:

$$V_S(r_0) = \left[\left(1 + \frac{\Delta c_{66}(r_0)}{c_{66}}\right) \frac{c_{66}}{\rho_b}\right]^{\frac{1}{2}}, \qquad (110)$$

Following Backus and Gilbert inverse theory (Burridge and Sinha, *Inversion for formation shear modulus and radial depth of investigation using borehole flexural waves*, 66th Annual International Meeting, Society of Exploration Geophysicists, Expanded Abstracts, pp. 158-161, (1996)) known to those of skill in the art having the benefit of this disclosure, a trade-off between the error e, defined by Eq. (114) (below); and radial spread S, defined by Eq. (99), in the inverted shear modulus can be expressed in terms of $a$ and the new spread function. W can then be expressed as:

$$W_{ij}(\alpha, r_o) = E_{ij} + \alpha S_{ij}(r_o), \qquad (111)$$

where $$a_i(\alpha, r_0) = \frac{W_{ij}^{-1}(r_0) u_j}{u_i W_{ij}^{-1}(r_0) u_j}, \qquad (112)$$

$$S(\alpha, r_0) = a_i(\alpha, r_0) S_{ij}(r_0) a_j(\alpha, r_0), \qquad (113)$$

$$e_2 = a_i(\alpha, r_0) E_{ij} a_j(\alpha, r_0). \qquad (114)$$

In the presence of error in the measured Stoneley velocity at various axial wavenumbers $k_i$, expressed in terms of the error covariance matrix $E_{ij}$, and an assumed value of the trade-off parameter $\alpha$, one can use the spread function $W_{ij}$ instead of $S_{ij}(r_o)$, and follow the same method described above for estimating the radial variation in the formation horizontal shear velocity.

Therefore, according to principles described herein, there are methods and apparatus for Stoneley radial profiling (SRP) of horizontal shear slowness in the presence of acoustic tool (e.g. an MSIP tool) structure. The MSIP tool structure is described by an equivalent structure with a prescribed surface impedance at the acoustic tool radius in contact with the borehole fluid. The equivalent structure placed concentric with the borehole axis has been shown to adequately describe the acoustic tool bias on measured Stoneley dispersions in a wide range of formations and hole diameters.

The radial depth of investigation of data kernel $G_i$ associated with the Stoneley dispersion for the resonance-impedance model is larger than that for the empty borehole model. In addition, the sensitivity of Stoneley dispersion to changes in the horizontal shear modulus $c_{66}$ at low frequencies is larger in the presence of an acoustic tool simulated by a resonance-impedance model than in an empty borehole.

The methods and apparatus in accordance with principles of the present invention for SRP of horizontal shear slowness algorithm has been validated against synthetic data for formations exhibiting (a) radially homogeneous; (b) radially decreasing; and (c) radially increasing compressional and shear slownesses away from the borehole surface. Synthetic Stoneley dispersions have been obtained using the Resonance-Impedance Model (RIM) of the acoustic logging tool. It has been demonstrated that the SRP algorithm yields verifiable far-field shear slowness (or the shear modulus $c_{66}$) in the presence of near-wellbore alteration and accounts for the acoustic logging tool effects on measured Stoneley dispersions. However, according to the principles described herein, an acoustic tool effects model is appropriately embedded into an appropriate point in the inversion algorithm so that the inversion produces the appropriate answer product result (e.g. Stoneley permeability) in a way that is not biased by the presence of a non-transparent tool in the borehole. In this way, tool bias or effects are "removed" from the data processing method.

The principles of the present invention may be applied to any acoustic data processing technique to improve the ultimate results when a tool, drill string, or other apparatus is positioned in a wellbore. For example, the principles of the present invention may be incorporated into methods of processing data using a significantly acoustically non-transparent apparatus, including, but not limited to, methods taught in U.S. Pat. Nos. 5,278,805; 5,398,215; 5,475,650; 5,687,138; 5,838,633; 5,999,484; 6,351,991; 6,526,354; 6,611,761; 6,614,716; 6,631,327; 6,714,480; and 6,718,266, among many others.

Formation Stresses and Radial Profiling of Reservoir Mobility

Acoustoelastic theory relates changes in the effective shear moduli to incremental changes in the biasing stresses and strains from a reference state of the material (see, e.g. U.S. Pat. No. 6,351,991, hereby incorporated by reference). As discussed above, the three shear moduli ($c_{44}$, $c_{55}$, and $c_{66}$) can be estimated from borehole sonic data. With the introductions of the methods above for the Stoneley radial profiling of horizontal shear slowness and dipole radial profiling of vertical shear slowness, the virgin formation shear moduli $c_{44}$, $c_{55}$, and $c_{66}$ can be unambiguously estimated. The methods described above account for the sonic tool bias and possible near-wellbore alteration effects on the measured sonic data.

Differences in the effective shear moduli are related to differences in the principal stress magnitudes through an acoustoelastic coefficient defined in terms of formation nonlinear constants. The nonlinear constants refer to a chosen reference state for a given formation lithology. The following three equations relate changes in the shear moduli to corresponding changes in the effective principal stresses:

$$\Delta c_{44} - \Delta c_{66} = A_E(\Delta \sigma_V - \Delta \sigma_H), \quad (115)$$

$$\Delta c_{55} - \Delta c_{66} = A_E(\Delta \sigma_V - \Delta \sigma_h), \quad (116)$$

$$\Delta c_{55} - \Delta c_{44} = A_E(\Delta \sigma_H - \Delta \sigma_h), \quad (117)$$

where:

$$A_E = 2 + \frac{c_{456}}{\mu},$$

is the acoustoelastic coefficient, $c_{55}$ and $c_{44}$ denote the shear moduli for the fast and slow shear waves, respectively; $c_{456}=(c_{155}-c_{144})/2$ is a formation nonlinear parameter that defines the acoustoelastic coefficient; and $\mu$ represents the shear modulus in a chosen reference state.

There are at least two ways to estimate the acoustoelastic parameter $A_E$ for a given sand reservoir. The first is a multi-frequency inversion of cross-dipole dispersions at a given depth, which yields the acoustoelastic parameter together with the maximum and minimum horizontal stress magnitudes. The acoustoelastic parameter $A_E$ is given by:

$$A_E = \frac{\Delta c_{55} - \Delta c_{44}}{\Delta \sigma_H - \Delta \sigma_h}, \quad (118)$$

where $\Delta c_{55}$ and $\Delta c_{44}$ denote the fast and slow dipole shear moduli, respectively; and $\Delta \sigma_H$ and $\Delta \sigma_h$ represent the maximum and minimum horizontal stress magnitudes, respectively.

The second acoustoelastic estimation method is available when estimates of the minimum horizontal and overburden stress magnitudes at a given depth are known. One can determine the acoustoelastic parameter $A_E$ in terms of the far-field shear moduli $c_{55}$ and $c_{66}$ using the relation:

$$A_E = \frac{\Delta c_{55} - \Delta c_{66}}{\Delta \sigma_V - \Delta \sigma_h}, \quad (119)$$

where the effects of permeability on the shear moduli are assumed to be essentially similar and small enough to be negligible.

Once the acoustoelastic parameter for a given reservoir interval is determined, the maximum horizontal stress $\Delta S_H$ magnitude can be calculated as a function of depth from the following equation:

$$\Delta \sigma_H = \Delta \sigma_h + \frac{(\Delta c_{55} - \Delta c_{44})}{A_E}, \quad (120)$$

where $\Delta c_{55}$ and $\Delta c_{44}$ denote the fast and slow dipole shear moduli, respectively.

Similarly, the minimum horizontal stress $\Delta S_h$ magnitude as a function of depth is calculated from the following equation:

$$\Delta \sigma_h = \Delta \sigma_V - \frac{(\Delta c_{55} - \Delta c_{66})}{A_E}. \quad (121)$$

Hence, formation horizontal stress magnitudes can be estimated as a function of depth in terms of the three shear moduli $\Delta c_{44}$, $\Delta c_{55}$, and $\Delta c_{66}$, and the acoustoelastic coefficient $A_E$.

Estimation of Reservoir Mobility in the Presence of Formation Stresses

Further, as mentioned above, it is known that cross-dipole dispersions controlled by shear moduli $c_{44}$ and $c_{55}$ are only marginally affected by fluid mobility (Paillet, F. L., ACOUSTIC WAVES IN BOREHOLES pp. 203-212 (1991)). However, the presence of fluid mobility causes a discernible decrease in the effective shear modulus $c_{66}$ and an associated increase in the Stoneley slowness at all frequencies. In contrast, formation compressive stresses are likely to cause an increase in the effective shear modulus $c_{66}$ and an associated decrease in the Stoneley slowness.

Therefore, according to some aspects of the invention we estimate stress-induced changes in the effective shear modulus $c_{66}$ in accordance with the following procedure to obtain a reliable estimate of the fluid mobility in the presence of formation stresses. First, the acoustoelastic parameter $A_E$ is estimated from the multi-frequency inversion of cross-dipole dispersions in a reservoir interval. Note that dipole dispersions are not significantly affected by the fluid mobility. Next, the estimated overburden, minimum, and maximum horizontal stress magnitudes at a given depth (where the fluid mobility is negligibly small) is used to calculate a corresponding change in the shear modulus $\Delta c_{66}$ from the equations shown below:

$$\Delta c_{66} = \Delta c_{55} - A_E(\Delta\sigma_v - \Delta\sigma_h), \tag{122}$$

$$\Delta c_{66} = \Delta c_{44} - A_E(\Delta\sigma_v - \Delta\sigma_H). \tag{123}$$

The presence of fluid mobility causes additional changes in the horizontal shear modulus $c_{66}$. The measured Stoneley dispersion is controlled by the effective shear modulus $c_{66}$ that represents both the stress and mobility induced changes in the horizontal shear modulus.

The presence of a borehole in a prestressed formation causes near-wellbore stress concentrations that exhibit both radial and azimuthal variations. Stresses larger than the rock yield stress can lead to plastic deformation or mechanical damage. Radial variations in formation stresses cause corresponding changes in the effective elastic stiffnesses (and mass density) that results in corresponding changes in the effective elastic shear moduli and can be estimated in terms of changes in the Stoneley slownesses at various frequencies. Asymptotic analysis of the Stoneley wave propagation in a fluid-filled borehole provides equations that relate changes in the Stoneley slownesses in the low-frequency range to changes in the effective shear modulus $c_{66}$. The effective shear modulus $c_{66}$ changes as a function of reservoir mobility changes as described below.

A low-frequency approximation of the Stoneley wave propagation in a fluid-filled borehole yields the following expression for the tube wave slowness $S_e$:

$$S_e^2 = \rho_m \left[ \frac{1}{K_m} + \frac{1}{G} \right], \tag{124}$$

where $\rho_m$ and $K_m$ denote the borehole fluid (mud) mass density and bulk modulus, respectively; and G represents the shear modulus of an isotropic formation in the absence of fluid mobility.

Subsequently, the tube wave slowness in the presence of fluid mobility is given by the following equation:

$$S^2 = \rho_m \left[ \frac{1}{K_m} + \frac{1}{G} + \frac{2}{a(W_0 + W_{mc})} \right], \tag{125}$$

where "a" denotes the borehole radius, $W_0$ and $W_{mc}$ represent the frequency-dependent fluid-mobility and mud-cake effects on the measured tube wave slowness S. The low-frequency asymptotic analysis of the Stoneley wave propagation in a typical fluid-filled borehole is valid up to about 2 kHz.

In the absence of formation structural anisotropy, stresses, and formation mobility, the three shear moduli are the same implying:

$$c_{44} = c_{55} = c_{66} = G. \tag{126}$$

Therefore, Eqs. (124) and (125) can be written as:

$$S_e^2 = \rho_m \left[ \frac{1}{K_m} + \frac{1}{c_{55}} \right], \tag{127}$$

$$S^2 = \rho_m \left[ \frac{1}{K_m} + \frac{1}{c_{66}} \right], \tag{128}$$

Subtracting Eq. (126) from (127) yields:

$$S^2(r/a) - S_e^2(r/a) = \frac{\rho_m}{\rho_b} \left[ \frac{\rho_b}{c_{66}(r/a)} - \frac{\rho_b}{c_{55}(r/a)} \right], \tag{129}$$

where $\rho_b$ denotes the formation bulk mass density.

It is clear from Eq. (129) that mobility added slowness of the Stoneley wave ($S^2 - S_e^2$) can also be expressed in terms of differences between the horizontal shear and vertical shear slownesses that can be estimated from the Stoneley Radial Profiling (SRP) of horizontal shear slowness and Dipole Radial Profiling (DRP) of vertical shear slownesses.

Eq. (129) can be re-written in the form:

$$S^2(r/a) - S_e^2(r/a) = A_m M(r/a), \tag{130}$$

where $A_m$ is the mobility coefficient defined by:

$$A_m = -\frac{2\rho_m H_1^{(1)}(k_{c2}a)}{aC_D k_{c2} H_0^{(1)}(k_{c2}a)}, \text{ and} \tag{131}$$

$$M(r/a) = \frac{K_h(r/a)}{\eta_{fluid}}, \tag{132}$$

where the fluid mobility M(r/a) is defined as a ratio of the fluid horizontal permeability $K_h$ to pore fluid viscosity $\eta_{fluid}$.

As described earlier, the presence of formation stresses also affects measured differences between the horizontal (SRP) and vertical (DRP) shear slowness profiles. The three shear moduli are essentially the same in the absence any differential stress. The presence of a differential stress causes a difference in the effective shear moduli and associated shear slownesses as shown in Eq. (116). A fractional change in the dipole fast-shear velocity ($V_{DFS}$) (or equivalently, dipole fast-shear slowness) caused by a difference in the overburden and minimum horizontal stress can be expressed as:

$$\frac{\Delta V_{DFS}}{V_{DFS}} = -\frac{A_E(\Delta\sigma_V - \Delta\sigma_h)}{2C_{55}} = -\frac{\Delta S_{DFS}}{S_{DFS}}, \tag{133}$$

where the subscript "DFS" denotes dipole fast shear velocity or slowness. The stress-induced changes in the dipole fast-shear slowness $\delta$ can then be given by:

$$\delta = S_{DFS} \frac{A_E(\Delta\sigma_V - \Delta\sigma_h)}{2C_{55}}. \tag{134}$$

Therefore, the difference between the measured horizontal shear slowness (estimated from the SRP algorithm) and dipole vertical shear slowness (estimated from the DRP algorithm) can be decomposed into two parts: (1) stress-induced, and (2) mobility-induced. The mobility-induced difference between the shear moduli $c_{66}$ and $c_{55}$ (or equivalently, difference between the square of horizontal and vertical shear slownesses) can then be expressed as:

$$M = \frac{[S_{SHS}^2 - (S_{DFS} + \delta)^2]}{A_{mobility}}, \quad (135)$$

where the subscript 'SHS' denotes Stoneley horizontal shear slowness, and $A_{mobility}$ represents the mobility coefficient that transforms the measured slowness differences to formation mobility.

Formation Mobility Profiling Using Near-Wellbore Data

Noting that the Stoneley radial profile of horizontal shear slowness and dipole radial profile of vertical shear slowness, respectively, provide radial variations of $(\rho_b/c_{66})^{1/2}$ and $(\rho_b/c_{55})^{1/2}$, Eq. (129) can be estimated from these slowness profiles. If measured formation mobility at a given radial position determined from one of the known techniques is input, one can estimate the mobility coefficient $A_{calib}$ from the equation given below:

$$A_{calib} = \frac{S_{SRP}^2(r/a) - S_{DRP}^2(r/a)}{M(r/a)}, \quad (136)$$

where $S_{SRP}$ and $S_{DRP}$ denote the horizontal and vertical shear slowness profiles from the SRP and DRP algorithms, respectively.

Further, once the mobility coefficient at a given depth is obtained, we can estimate radial variation in the mobility $M(r/a)$ according to the equation given below:

$$\log M(r/a) = \log[(S_{SRP}^2(r/a) - S_{DRP}^2(r/a))/A_{calib}]. \quad (137)$$

As mentioned above, the sonic tool structure may also replaced by a simple model, for example a heavy-fluid column model, to account for sonic tool bias. Detailed three-dimensional finite-difference modeling of the sonic tool structure effect on the borehole Stoneley dispersions in a variety of formations may be done to verify the accuracy of replacing of the sonic tool structure with a simple heavy-fluid column model. The heavy-fluid model parameters may be obtained by comparing predictions from the heavy-fluid model with those from a detailed finite-difference model for a range of borehole diameters and formation slownesses. FIGS. 32a-32d and 33a-33d illustrate a comparison of predictions for the Stoneley dispersions for various formation parameters using an empty borehole model and a heavy-fluid with a variable velocity, $V_{hf}$, with that of a finite difference model of a sonic tool. FIGS. 32a-32d represents the results in a fast formation (DT$_c$=50 μs/ft, DT$_s$=95 μs/ft, various borehole diameters (BHD) and $V_{hf}$), and FIGS. 33a-33d represent the results in a slow formation (DT$_c$=130 μs/ft, DT$_s$=350 μs/ft, various borehole diameters (BHD) and $V_{hf}$).

Figure 34:
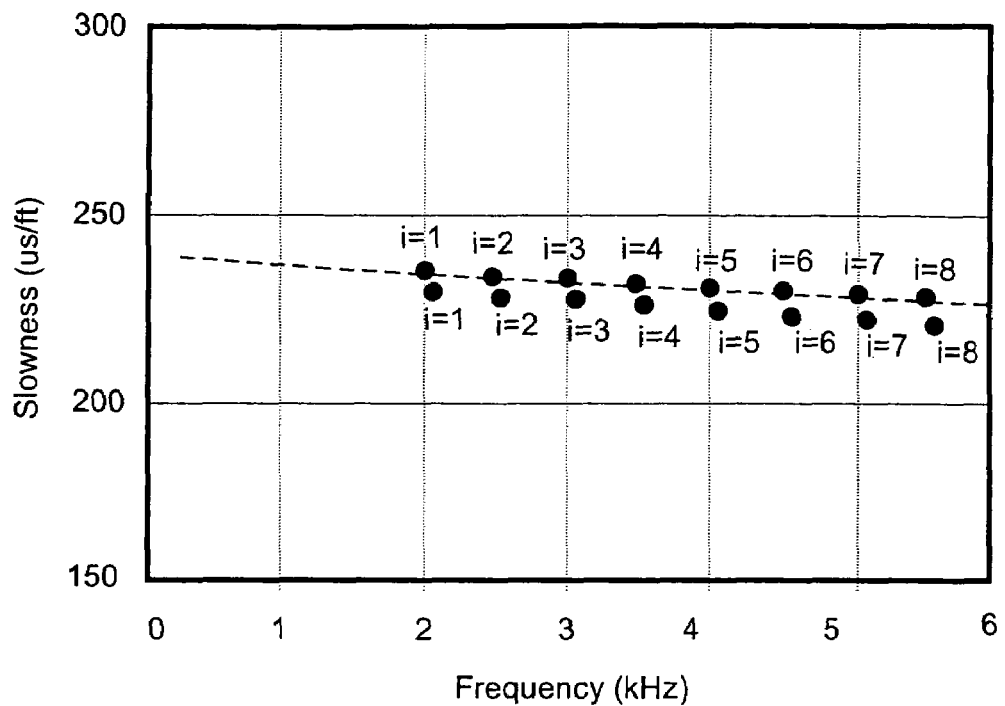
FIG. 34 illustrates a reference Stoneley dispersion using the heavy-fluid model to account for sonic tool presence according to principles of the present invention.
Figure 35:
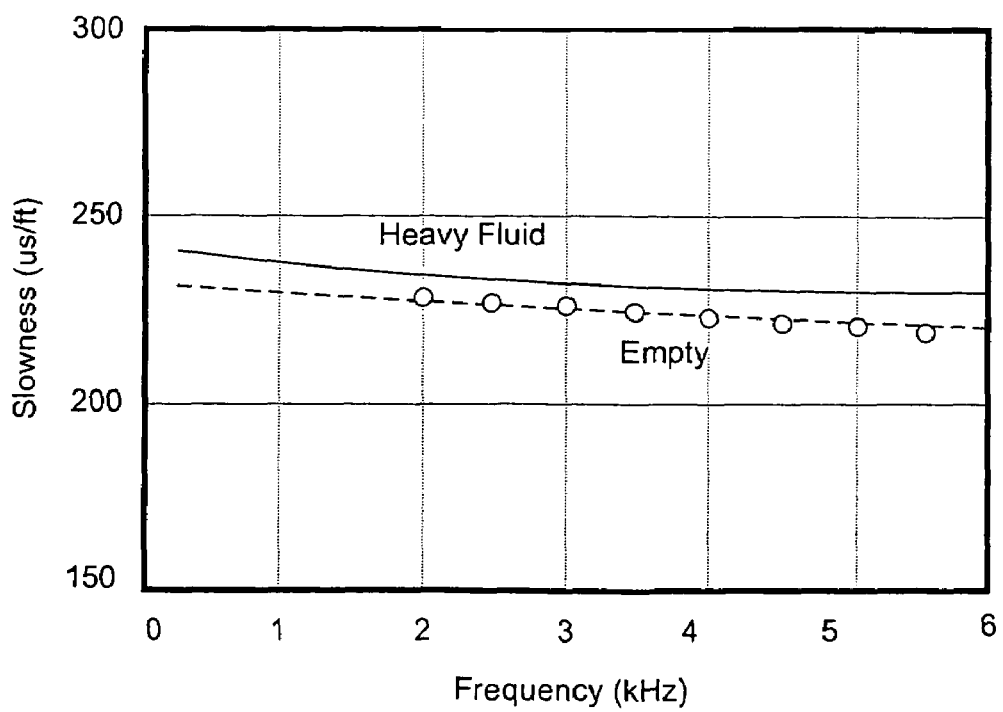
FIG. 35 illustrates a comparison of the Stoneley dispersions for a fluid-filled borehole in the absence of any tool (labeled "empty") with that of a heavy-fluid model to account for tool bias.
Figure 36:
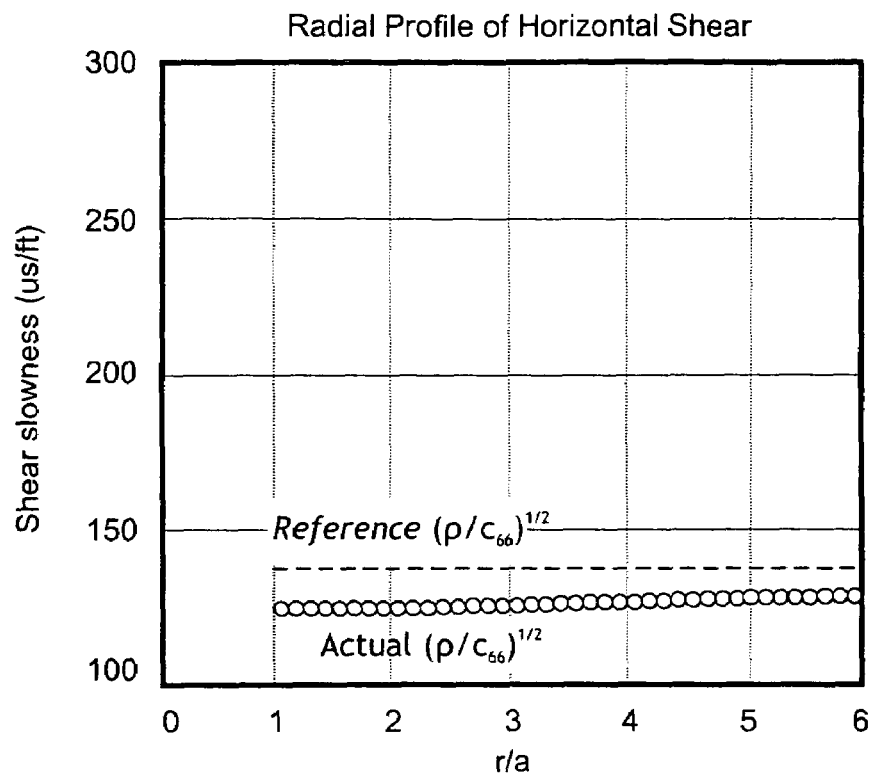
FIG. 36 is a radial profile of horizontal shear slowness illustrating reference shear slowness used to define the reference Stoneley dispersion in the presence of a heavy-fluid column.
Figure 37:
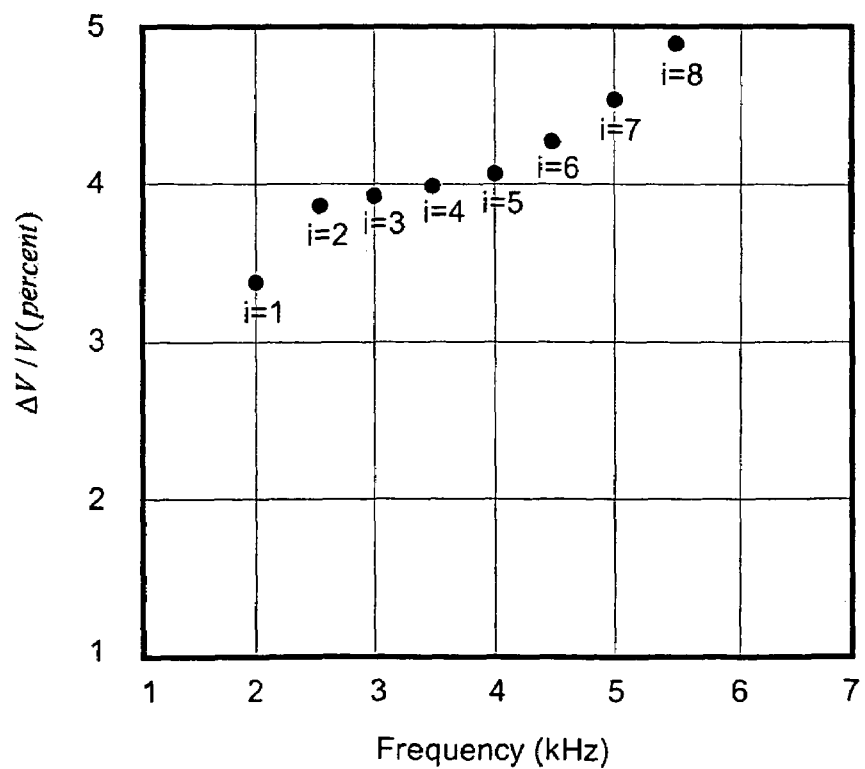
FIG. 37 illustrates fractional differences between measured and reference Stoneley velocities at eight selected frequencies.

The Backus-Gilbert technique for obtaining radial profiles of horizontal shear slowness or equivalently, horizontal shear modulus $c_{66}$ in an anisotropic formation with the vertical $X_3$-axis, comprises a perturbation model that relates corresponding changes in the Stoneley slowness dispersion caused by perturbations in formation properties. From measured Stoneley wave slownesses at a few discrete frequencies, one makes a reasonable initial guess of the formation parameters in the reference state. The initial parameters for an assumed homogeneous and equivalent isotropic formation, together with the heavy-fluid model for the sonic tool, yield the Stoneley dispersion in the reference state as shown by the dashed line in FIG. 34. The measured Stoneley slowness data is denoted at eight frequencies by discrete points in FIG. 34. The differences between the measured and reference slownesses at the axial wave numbers corresponding to each of the eight data points constitute the input to the B-G procedure. In addition, kernels are calculated from the reference Stoneley mode eigenfunctions that are required in the inversion technique. The sum of the inverted perturbation and the background profile yield the actual profile (see Burridge R. and Sinha, B. K., *Inversion For Formation Shear Modulus And Radial Depth Of Investigation Using Borehole Flexural Waves*, 66$^{TH}$ ANN. INTERNAT. MTG., SOC. EXPL. GEOPHYS., Expanded Abstracts 158-161, (1996)). FIG. 35 illustrates a comparison of the Stoneley dispersions for a fluid-filled borehole in the absence of any tool (labeled "empty" and represented by the dashed line) with the Stoneley dispersions for a heavy-fluid model (solid line) to account for sonic tool bias. The open circles indicate the measured slownesses at eight frequencies in a shale interval. FIG. 36 shows the radial variation of inverted formation shear slowness from the eight slowness data points shown in FIG. 37.

The discussion below illustrates a procedure, according to principles of the present invention, for the detection and estimation of mechanical alteration caused by radial variations of horizontal shear slownesses or equivalently, the horizontal shear modulus $c_{66}$ in an anisotropic formation with the vertical $X_3$-axis, surrounding a borehole. One selects a depth interval of interest. Borehole diameter d is measured with, for example, a standard four or six-arm caliper. The annulus mud compressional velocity, $V_f$, is measured or estimated from the mud composition, mass density, in-situ pressure and temperature. Formation mass bulk density $\rho_b$ and mud mass density is measured or estimated from the drilling mud weight used in the depth interval of interest. The formation compressional velocity $V_p$ in the (far-field) region is determined, outside any mechanically altered annulus from a standard sonic log. An initial guess or estimate of formation shear modulus $c_{66}$ is made using the measured Stoneley velocity at the lowest frequency from the equation:

$$c_{66} = \frac{V_T^2 \rho_f V_f^2}{(V_f^2 - V_T^2)} \quad (138)$$

where $V_T$ is the measured Stoneley velocity at the lowest measured frequency $f_1$; $\rho_f$ is the borehole fluid mass density; and $V_f$ is the borehole fluid compressional velocity.

A reference shear velocity $V_s$ for an equivalent isotropic formation is calculated using the equation:

$$V_s = \sqrt{\frac{c_{66}}{\rho_b}}. \quad (139)$$

Figure 38:
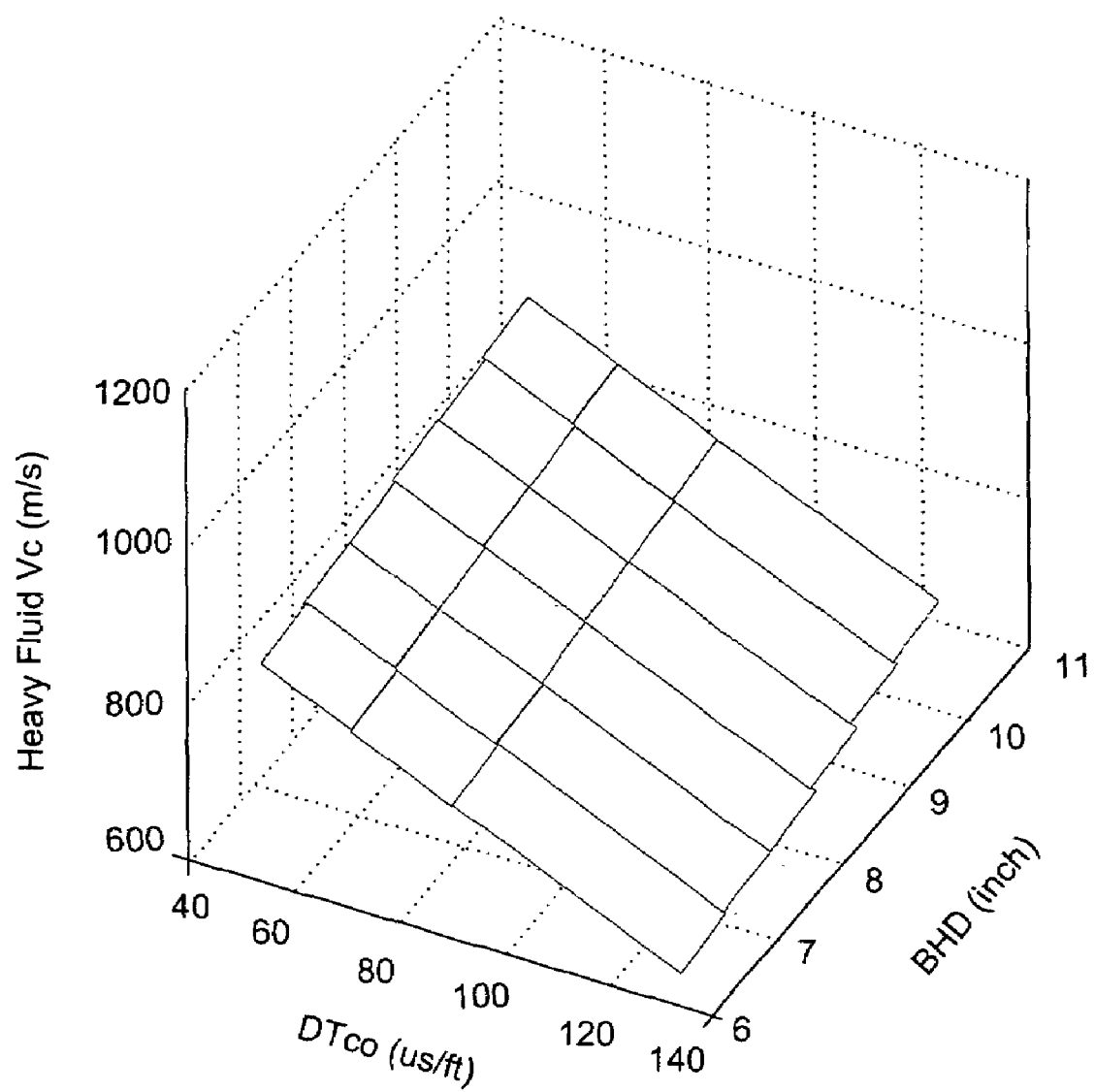
FIG. 38 illustrates a look-up table of heavy-fluid compressional velocity as a function of borehole diameter (BHD) and formation compressional slowness (DTco).

The heavy-fluid compressional velocity $V_{hf}$ is determined as a function of borehole diameter and formation compressional velocity $V_p$ from a "look-up" table (e.g. the look-up table illustrated in FIG. 38). A reference Stoneley dispersion and associated eigenfunctions are calculated for an assumed homogeneous and equivalent isotropic formation with the five parameters obtained from the previous steps, together with the three heavy-fluid column parameters $d_{hf}$, $\rho_{hf}$, and $V_{hf}$.

The five borehole and formation parameters are d, $V_f$, $V_p$, $V_s$, and $\rho_b/\rho_f$. A procedure is described, for example, by C. J. Hsu and B. K. Sinha. (Hsu, C. J. and Sinha, B. K., *Mandrel effects on the dipole flexural mode in a borehole*, J. ACOUST. SOC. OF AM., Vol. 104 No. 4, pp. 2025-2039 (October 1998)) for obtaining the borehole Stoneley dispersion and associated eigenfunctions in the presence of a multi-layer cylindrical structure such as that shown in FIG. 14. The described procedures or others known to those of skill in the art having the benefit of this disclosure may be used. The measured Stoneley dispersion at a chosen depth is compared with the reference Stoneley dispersion calculated above. A exemplary procedure is described in by Ekstrom (Ekstrom, M. P., *Dispersion Estimation from Borehole Acoustic Arrays Using a Modified Matrix Pencil Algorithm*, presented at the 29th Asilomar Conference on Signals, Systems, and Computers (1995)) for determining the measured borehole Stoneley dispersion from recorded monopole waveforms at an array of receivers placed in a fluid-filled borehole. Other procedures known to those of skill in the art may also be used. Any observed difference between the measured and reference borehole Stoneley dispersions is a potential indicator of radial variation of formation properties. In the presence of a difference between the measured and reference borehole Stoneley dispersions, a number of Stoneley velocity data at several frequencies from the measured Stoneley dispersion is selected. The Stoneley velocity data is preferably sufficiently separated in frequency to ensure that each is uncorrelated. A frequency separation of approximately 200 Hz is generally adequate. Corresponding axial wave numbers $k_i$ are calculated by:

$$k_i = \frac{2\pi f_i}{V_i} \tag{140}$$

where $V_i$ is the measured Stoneley velocity at frequency $f_i$.

Fractional changes in the measured Stoneley velocities from those in the reference dispersion calculated above for selected axial wave numbers obtained from Eq. (140) are calculated. A fractional change in the Stoneley velocity is given by:

$$\frac{\Delta V_i}{V_i} = \frac{(V_i^{measured} - V_i^{reference})}{V_i^{reference}} \tag{141}$$

where $i=1, 2, \ldots, n$, and n denotes the number of axial wavenumbers calculated according to Eq. (140).

The kernel $G_i(r)$ at a selected wave number $k_i$ is calculated in terms of the Stoneley wave eigenfunction in the reference state defined above. The borehole axis is assumed to be parallel to the $X_3$-axis. The kernel $G_i(r)$ relates a fractional change in the Stoneley velocity at a given axial wavenumber $k_i$ from that in the isotropic, homogeneous reference state to a corresponding fractional change in the horizontal shear modulus $c_{66}$:

$$\frac{\Delta V_i}{V_i} = \int_a^\infty G_i \frac{\Delta c_{66}(r)}{c_{66}} r\,dr, \tag{142}$$

where $a=d/2$, is the borehole radius, and $i=1, 2, \ldots, n$. A description of a procedure for determining the kernel $G_i$ is given by B. K. Sinha (Sinha, B. K., *Sensitivity and Inversion of Borehole Flexural Dispersions for Formation Parameters*, GEOPHYSICAL JOURNAL INTERNATIONAL, Vol. 128 No. 1, pp. 84-96, (January 1997); see also Hsu, C. J. and Sinha, B. K., *Mandrel effects on the dipole flexural mode in a borehole*, J. ACOUST. SOC. OF AM., Vol. 104 No. 4, pp. 2025-2039 (October 1998)) and is known to those of skill in the art having the benefit of this disclosure.

The integrals below are calculated according to:

$$u_i = \int_a^\infty G_i(r)\,dr, \tag{143}$$

$$S_{ij}(r_0) = \int_a^\infty (r - r_0)^2 G_i(r) G_j(r)\,dr, \tag{144}$$

where $r_o$ denotes the radial position in the formation; $ij=1, 2, \ldots, n$, and a is the borehole radius.

$$a_i(r_o) = \frac{S_{ij}^{-1}(r_o) u_j}{u_i S_{ij}^{-1}(r_o) u_j}. \tag{145}$$

where $a_i$ is the weighting coefficient of the data kernel $G_i(r)$, and $u_i$ is the integral of the data kernel $G_i(r)$ as shown above and denotes the sensitivity of the measured shear velocity $V_i^{measured}$ to radial variations in the shear modulus $c_{66}$.

A fractional change in the horizontal shear modulus $c_{66}$ can then be calculated from the relation:

$$\frac{\Delta c_{66}(r_0)}{c_{66}} = a_i(r_0) \frac{\Delta V_i}{V_i}, \tag{146}$$

where $\Delta V_i/V_i$ are known at selected axial wavenumbers $k_i$, from Eq. (117).

Radial variation in the formation horizontal shear modulus can then be calculated from the relation:

$$c_{66}(r_0) = \left(1 + \frac{\Delta c_{66}(r_0)}{c_{66}}\right) c_{66}, \tag{147}$$

Radial variation in the formation horizontal shear velocity $V_{hs}$ is then calculated from:

$$V_{hs}(r_0) = \left[\left(1 + \frac{\Delta c_{66}(r_0)}{c_{66}}\right) \frac{c_{66}}{\rho_b}\right]^{\frac{1}{2}}, \tag{148}$$

Following Backus and Gilbert inverse theory (Burridge and Sinha, "Inversion for formation shear modulus and radial depth of investigation using borehole flexural waves", 66th Annual International Meeting, Society of Exploration Geophysicists Expanded Abstracts, pp. 158-161, 1996) known to those of skill in the art having the benefit of this disclosure, a trade-off between the error e, defined by Eq. (128) (below); and radial spread S, defined by Eq. (150) (below), in the inverted shear modulus can be expressed in terms of $\alpha$ and the new spread function. W can then be expressed as:

$$W_{i,j}(\alpha, r_o) = E_{ij} + \alpha S_{ij}(r_o), \tag{149}$$

where $$a_i = (\alpha, r_0) = \frac{W_{ij}^{-1}(r_0)u_i}{u_i W_{ij}^{-1}(r_0)u_i},$$

$$S(\alpha, r_0) = a_i(\alpha, r_0)S_{ij}(r_0)a_j(\alpha, r_0), \tag{150}$$

$$e^2 = a_i(\alpha, r_0)E_{ij}a_j(\alpha, r_0). \tag{151}$$

In the presence of error in the measured Stoneley velocity at various axial wavenumbers $k_j$, expressed in terms of the error covariance matrix $E_{ij}$, and an assumed value of the trade-off parameter $\alpha$, one can use the spread function $W_{ij}$ instead of $S_{ij}(r_o)$, and follow the same method described above for estimating the radial variation in the formation horizontal shear velocity.

Accordingly a procedure is described below in accordance with principles of the invention. A depth interval of reasonably uniform lithology is selected. The borehole diameter, d, is measured, for example with a caliper tool. The borehole fluid (e.g. mud) compressional velocity, $V_f$, is measured, or it may be estimated from the mud composition, mass density, in-situ pressure and temperature. The formation mass bulk density, $\rho_b$, and the mud mass density, $\rho_f$, are measured or estimated, according to well-known techniques. The formation mass bulk density may be obtained from neutron-density logging measurements, and the mud mass density can be derived using mud weight information from the drilling fluid supplier.

The compressional velocity $V_p$ of a substantially undisturbed formation (that is, the relatively far-field region outside any mechanically altered annulus) is obtained, for example, from a standard sonic log (see, e.g. Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data," Society of Petroleum Engineers, SPE 20557, 1990). The reference shear velocity $V_s$ for an equivalent isotropic formation may be obtained from Eq. (139).

Up to this point, the parameters d, $V_f$, $\rho_f$, $\rho_b$, $V_p$ and $V_s$ have been obtained (measured and/or derived and input). Therefore, a reference Stoneley dispersion for a reference formation that is assumed to be homogeneous and isotropic may be computed using these formation parameters and selected heavy-fluid parameters to account for the tool presence applying known techniques. Reference can be made, for example, to B. K. Sinha, "Sensitivity and Inversion of Borehole Flexural Dispersions for Formation Parameters", Geophysical Journal international, Vol. 128(1), pp. 84-96, January 1997.

As above described, a sonic logging device is utilized to establish Stoneley waves in the formation, and Stoneley wave velocity is determined at a number of frequencies to develop a measured dispersion curve at each depth level of interest. A known technique can be employed, for example as described be Ekstrom. Ekstrom, M. P., *Dispersion Estimation From Borehole Acoustic Arrays Using A Modified Matrix Pencil Algorithm*. Presented at the 29$^{th}$ Asilomar Conference on Signals, Systems, and Computers (1995). At the depth level being processed, the measured Stoneley dispersion is compared with the previously computed reference Stoneley dispersion. Any observed difference (for example, greater than four percent) between the measured and reference borehole Stoneley dispersions is an indicator of radially varying formation properties. The uncertainty in the measured Stoneley dispersion may range from about two to four percent (see e.g. Backus, G. et al., *Uniqueness In The Inversion Of Inaccurate Gross Earth Data*,PHIL. TRANS. ROY. SOC. A266, pp. 123-192, (1970)).

In the presence of a difference between the measured and reference borehole Stoneley dispersions, a number of Stoneley velocity data at several frequencies are selected from the measured Stoneley dispersion. These velocity data should preferably be sufficiently separated in frequency so that they are uncorrelated. A frequency separation of about 200 Hz is generally found to be adequate. Following the methodology described above, one can obtain the radial profile of the horizontal shear slowness, or equivalently, the radial profile of the horizontal shear modulus $c_{66}$, from the Stoneley data in a borehole parallel to the $X_3$-axis accounting for and/or removing tool bias. However, according to the principles described herein, an acoustic tool effects model is appropriately embedded into an appropriate point in the inversion algorithm so that the inversion produces the appropriate answer product result (e.g. Stoneley permeability) in a way that is not biased by the presence of a non-transparent tool in the borehole. In this way, tool bias or effects are "removed" from the data processing method.

The preceding description has been presented only to illustrate and describe the invention and some examples of its implementation. It is not intended to be exhaustive or to limit the invention to any precise form disclosed. Many modifications and variations are possible in light of the above teaching. The principles described herein may be used for radial profiling, particularly radial profiling of formation mobility.

The preceding description is also intended to enable others skilled in the art to best utilize the invention in various embodiments and aspects and with various modifications as are suited to the particular use contemplated. It is intended that the scope of the invention be defined by the following claims.

Appendix: Elements of the Boundary Condition Determinant

The boundary equations for the case of a prescribed surface impedance at the tool radius b placed in a fluid-filled borehole of radius a surrounded by an infinite formation are presented below. The surface-impedance at the interface between the tool and borehole fluid (r=b) is given by:

$$\frac{u_r^f}{T_{rr}^f} = \frac{b}{2}\, \text{real}\,(C_{tool}), \tag{A.1}$$

where the frequency-dependent tool compressibility $C_{tool}$ is given by:

$$C_{tool} = C\left[1 + \left(1 - \frac{1}{C_{inf}}\right)\frac{\omega_0^2}{\omega^2 - \omega_0^2 + 2i\omega\gamma}\right] \tag{A.2}$$

and $$C = 1.1 \times 10^{-10},\ (1/Pa), \tag{A.3}$$

$$C_{inf} = 0.315, \tag{A.4}$$

$$\omega_o = 2\pi \times 960,\ (\text{radians/sec}), \tag{A.5}$$

$$\gamma = 2990,\ (\text{radians/sec}, \tag{A.6}$$

and $\omega$ is the Stoneley wave frequency in radians/sec.

The boundary condition matrix is obtained by the substitution of appropriate solutions for the lowest-order axi-symmetric waves (where n=0, and $u_{74}$ =0) given by Eqs. (57)-(59), (61)-(63), and (65)-(67) into the relevant boundary conditions at the fluid-fluid, and fluid-solid interfaces. These equations are summarized below:

$$Lc=0, \quad (A.7)$$

where L is a 4×4 matrix and c is a 4×1 column vector of unknown amplitude coefficients. The elements of L are given by:

$$L(1, 1) = 0.5\lambda^{(1)}b \text{ real}(C_{tool})(\alpha_{(1)}^2 + \xi^2)J_o(\alpha_{(1)}b) - \alpha_{(1)}J_o(\alpha_{(1)}b), \quad (A.8)$$

$$L(1, 2) = 0.5\lambda^{(1)}b \text{ real}(C_{tool})(\alpha_{(1)}^2 + \xi^2)Y_o(\alpha_{(1)}b) - \alpha_{(1)}Y_o(\alpha_{(1)}b), \quad (A.9)$$

$$L(2, 1) = \alpha_{(1)}J_1(\alpha_{(1)}a), \quad (A.10)$$

$$L(2, 2) = \alpha_{(1)}Y_{(1)}(\alpha_{(1)}a), \quad (A.11)$$

$$L(2, 3) = \alpha_{(1)}H_{(1)}(\alpha_{(1)}a), \quad (A.12)$$

$$L(2, 4) = i\xi H_{(1)}(\beta_{(1)}a), \quad (A.13)$$

$$L(3, 1) = \lambda^{(1)}(\alpha_{(1)}^2 + \xi^2 J_{(0)}(\alpha_{(1)}a), \quad (A.14)$$

$$L(3, 2) = \lambda^{(1)}(\alpha_{(1)}^2 + \xi^2 Y_{(0)}(\alpha_{(1)}a), \quad (A.15)$$

$$L(3, 3) = \{\lambda^{(2)}(\alpha_{(2)}^2 + \xi^2) + 2\mu^{(2)}\alpha_{(2)}^2\}H_{(0)}(\alpha_{(2)}a) + 2\mu^{(2)}\alpha_{(2)}H_{(1)}(\alpha_{(2)}a)/a, \quad (A.16)$$

$$L(3, 4) = 2i\mu^{(2)}\xi\beta_{(2)}\{H_{(0)}(\beta_{(2)}a) - H_{(1)}(\beta_{(2)}a)\} \quad (A.17)$$

$$L(4, 3) = -2i\xi\alpha_{(2)}H_1(\alpha_{(2)}a), \quad (A.18)$$

$$L(4, 4) = (\beta_{(2)}^2 - \xi^2)H_{(1)}(\beta_{(2)}a). \quad (A.19)$$

where $\lambda$ and $\mu$ denote the Lamé constants, and superscripts 1, and 2 refer to the borehole mud, and formation, respectively. The elements of L not defined above are zero. The column vector c is given by $$c=(A^{(1)}, B^{(1)}, A^{(2)}, A_1^{(2)})^T. \quad (A.20)$$

Eqs. (A.2) constitutes a system of 4 linear homogeneous algebraic equations in the wave amplitudes {c}, which yields nontrivial solutions when the determinant of the coefficients of the wave amplitudes c vanishes, i.e., when:

$$\det(L)=0. \quad (A.22)$$

Eq. (A.21) is a complex algebraic equation, both the real and imaginary parts of which vanish simultaneously. A solution, i.e., values of $\zeta$ and $\omega$ satisfying the appropriate differential equations of motion and Eq. (A.21) must be found numerically. Once the solution is obtained, the amplitude ratios can be solved for from Eqs. (A.2).

It should be noted that Eq. (A.21) can be transformed into a real algebraic equation by redefining some of the amplitude coefficients in the following manner: $(A_1^{(1)}, B_1^{(1)}) \rightarrow (iA_1^{(1)}, iB_1^{(1)})$; and keeping the other coefficients the same in Eq. (A.20). However, in the case of leaky modes, Esq. (A.21) becomes a complex algebraic equation in spite of the aforementioned transformation.

What is claimed is:

1. A method of evaluating a subterranean formation, comprising:
   estimating a radial profile of reservoir mobility by:
     combining near wellbore log data with radial profiling of shear modulus data by;
       calculating a Stoneley radial profile of horizontal shear slowness in a reservoir interval;
       calculating a dipole radial profile of vertical shear slowness in the reservoir interval;
       inverting differences between the Stoneley radial profile of horizontal shear slowness and the dipole radial profile of vertical shear slowness;
       generating a calibration coefficient relating the difference between the Stoneley horizontal shear slowness and dipole vertical shear slowness, and formation mobility at a given radial position and depth based on near field mobility from a pretest; and
   storing the estimated radial profile of reservoir mobility.

2. A method of evaluating the subterranean formation according to claim 1, wherein the combining further comprises:
   estimating near field mobility;
   extrapolating far field mobility from the near field mobility estimate based on the radial profile of shear modulus.

3. A method of evaluating the subterranean formation according to claim 1, wherein the pretest comprises: a NMR permeability test, a coring and uphole flow test, or a downhole modular dynamic testing drawdown test.

4. A method of evaluating the subterranean formation according to claim 1, wherein the radial profiling of shear modulus data comprises estimating two vertical shear moduli from cross-dipole dispersion data.

5. A method of evaluating the subterranean formation according to claim 1, wherein the radial profiling of shear modulus data comprises estimating a horizontal shear modulus from borehole Stoneley data and accounting for near-borehole alteration effects on horizontal shear slowness.

6. A method of evaluating the subterranean formation according to claim 5, wherein estimating the horizontal shear modulus comprises:
   measuring Stoneley dispersion with an acoustic tool;
   calculating the horizontal shear modulus from the measured Stoneley dispersion using a process that accounts for the presence of the acoustic tool in the borehole.

7. A method of evaluating the subterranean formation according to claim 6, wherein the process that accounts for the presence of the acoustic tool comprises modeling the acoustic tool as a heavy-fluid.

8. A method of evaluating the subterranean formation according to claim 6, wherein the process that accounts for the presence of the acoustic tool comprises modeling the acoustic tool with a resonance-impedance model.

9. An apparatus for evaluating a subterranean formation, comprising:
   a device that generates a radial profile of formation mobility surrounding a borehole, wherein the device estimates a radial profile of reservoir mobility by utilizing a first transmitter to obtain near wellbore log data, utilizing a second transmitter to obtain radial profiling of shear modulus data, and combining near wellbore log data with radial profiling of shear modulus data wherein the combining of the device comprises a processing circuitry operable to:

calculate a Stoneley radial profile of horizontal shear slowness in a reservoir interval;

calculate a dipole radial profile of vertical shear slowness in the reservoir interval;

invert differences between the Stoneley radial profile of horizontal shear slowness and the dipole radial profile of vertical shear slowness;

generate a calibration coefficient relating the difference between the Stoneley horizontal shear slowness and dipole vertical shear slowness, and formation mobility at a given radial position and depth based on near field mobility from a pretest.

* * * * *